US012626216B1

(12) United States Patent (10) Patent No.: US 12,626,216 B1
Carlevato et al. (45) Date of Patent: May 12, 2026

(54) PRODUCT DELIVERY SYSTEM AND METHOD

(71) Applicant: The Chamberlain Group LLC, Oak Brook, IL (US)

(72) Inventors: Steven Carlevato, Woodridge, IL (US); Casparus Cate, Murfreesboro, TN (US); Edward Thomas Laird, Lombard, IL (US); James Scott Murray, West Chicago, IL (US); Robert John Olmsted, Wood Dale, IL (US); Herman Ji-Heng Yau, Sunnyvale, CA (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 309 days.

(21) Appl. No.: 17/741,620

(22) Filed: May 11, 2022

Related U.S. Application Data

(60) Provisional application No. 63/188,853, filed on May 14, 2021, provisional application No. 63/187,815, filed on May 12, 2021.

(51) Int. Cl.
*G06Q 10/087* (2023.01)
*G06Q 10/0832* (2023.01)
*G06Q 30/0601* (2023.01)

(52) U.S. Cl.
CPC ....... *G06Q 10/087* (2013.01); *G06Q 10/0832* (2013.01); *G06Q 30/0627* (2013.01)

(58) Field of Classification Search
None
See application file for complete search history.

(56) References Cited

U.S. PATENT DOCUMENTS

| | | | |
|---|---|---|---|
| 4,881,148 | A | 11/1989 | Lambropoulos |
| 5,285,205 | A | 2/1994 | White |

(Continued)

FOREIGN PATENT DOCUMENTS

| | | |
|---|---|---|
| AT | 501039 | 5/2006 |
| AT | 008482 | 8/2006 |

(Continued)

OTHER PUBLICATIONS

Network-enabled Secure Unsupervised Parcel Storage, Mar. 6, 2009, The IP.com Prior Art Database (Year: 2009).*

(Continued)

*Primary Examiner* — Marissa Thein
*Assistant Examiner* — Timothy J Kang
(74) *Attorney, Agent, or Firm* — Dority & Manning, P.A.

(57) ABSTRACT

In one aspect, a method associated with delivery of a product to a container. The method comprising, at a server computer, receiving container information from the container. The container information includes a capacity of the container detected by a sensor of the container. The method further includes receiving, from a user device, a request to order a product for delivery to the container and denying the request to order the product in response to a determination of inadequate capacity of the container. The determination of inadequate capacity of the container is based at least in part upon the container information and information indicative of the product. The method further includes communicating a signal to the user device indicating denial of the request to order the product due to the inadequate capacity of the container.

20 Claims, 33 Drawing Sheets

(56) References Cited

U.S. PATENT DOCUMENTS

| | | | |
|---|---|---|---|
| 5,428,388 | A | 6/1995 | Von Bauer |
| 5,506,905 | A | 4/1996 | Markowski |
| 5,751,224 | A | 5/1998 | Fitzgibbon |
| 5,767,784 | A | 6/1998 | Khamharn |
| 5,774,053 | A | 6/1998 | Porter |
| 5,872,513 | A | 2/1999 | Fitzgibbon |
| 5,910,163 | A | 6/1999 | Schlamp |
| 5,987,892 | A | 11/1999 | Watanabe |
| 6,037,858 | A | 3/2000 | Seki |
| 6,046,680 | A | 4/2000 | Soenen |
| 6,049,598 | A | 4/2000 | Peters |
| 6,085,172 | A | 7/2000 | Junger |
| 6,134,593 | A | 10/2000 | Alexander |
| 6,140,938 | A | 10/2000 | Flick |
| 6,204,763 | B1 | 3/2001 | Sone |
| 6,292,575 | B1 | 9/2001 | Bortolussi |
| 6,300,873 | B1 | 10/2001 | Kucharczyk |
| 6,323,782 | B1 | 11/2001 | Stephens |
| 6,344,796 | B1 | 2/2002 | Ogilvie |
| 6,404,337 | B1 | 6/2002 | Van Till et al. |
| 6,414,587 | B1 | 7/2002 | Fitzgibbon |
| 6,466,261 | B1 | 10/2002 | Nakamura |
| 6,483,433 | B2 | 11/2002 | Moskowitz |
| 6,529,949 | B1 | 3/2003 | Getsin |
| 6,536,659 | B1 | 3/2003 | Hauser |
| 6,563,431 | B1 | 5/2003 | Miller, Jr. |
| 6,570,488 | B2 | 5/2003 | Kucharczyk |
| 6,574,455 | B2 | 6/2003 | Jakobsson |
| 6,611,205 | B2 | 8/2003 | Guthrie |
| 6,696,918 | B2 | 2/2004 | Kucharczyk |
| 6,748,295 | B2 | 6/2004 | Tilles |
| 6,778,064 | B1 | 8/2004 | Yamasaki |
| 6,778,084 | B2 | 8/2004 | Chang |
| 6,793,253 | B2 | 9/2004 | Bruwer |
| 6,853,853 | B1 | 2/2005 | Van Wiemeersch |
| 6,882,269 | B2 | 4/2005 | Moreno |
| 6,909,356 | B2 | 6/2005 | Brown |
| 6,950,725 | B2 | 9/2005 | Von Kannewurff |
| 6,952,181 | B2 | 10/2005 | Karr |
| 6,957,197 | B1 | 10/2005 | Altendahl |
| 6,965,294 | B1 | 11/2005 | Elliott |
| 6,967,562 | B2 | 11/2005 | Menard |
| 6,967,575 | B1 | 11/2005 | Dohrmann |
| 6,975,937 | B1 | 12/2005 | Kantarjiev |
| 6,987,452 | B2 | 1/2006 | Yang |
| 7,015,943 | B2 | 3/2006 | Chiang |
| 7,015,946 | B2 | 3/2006 | Suzuki |
| 7,028,339 | B2 | 4/2006 | Stevens |
| 7,035,916 | B1 | 4/2006 | Backman |
| 7,042,492 | B2 | 5/2006 | Spinelli |
| 7,076,449 | B2 | 7/2006 | Tsunenari |
| 7,120,697 | B2 | 10/2006 | Aiken, Jr. |
| 7,133,743 | B2 | 11/2006 | Tilles |
| 7,149,959 | B1 | 12/2006 | Jones |
| 7,151,434 | B2 | 12/2006 | Mayer |
| 7,154,531 | B2 | 12/2006 | Laird |
| 7,158,941 | B1 | 1/2007 | Thompson |
| 7,170,998 | B2 | 1/2007 | Mclintock |
| 7,193,644 | B2 | 3/2007 | Carter |
| 7,205,908 | B2 | 4/2007 | Tsui |
| 7,207,142 | B2 | 4/2007 | Mullet |
| 7,212,889 | B2 | 5/2007 | Mann |
| 7,237,013 | B2 | 6/2007 | Winkeler |
| 7,242,279 | B2 | 7/2007 | Wolfe |
| 7,260,835 | B2 | 8/2007 | Bajikar |
| 7,269,634 | B2 | 9/2007 | Getsin |
| 7,345,574 | B2 | 3/2008 | Fitzgibbon |
| 7,353,042 | B2 | 4/2008 | Yamagishi |
| 7,355,505 | B2 | 4/2008 | Bonner |
| 7,376,572 | B2 | 5/2008 | Siegel |
| 7,379,805 | B2 | 5/2008 | Olsen, III |
| 7,385,499 | B2 | 6/2008 | Horton |
| 7,429,910 | B2 | 9/2008 | Domenz |
| 7,441,264 | B2 | 10/2008 | Himmel |
| 7,468,663 | B1 | 12/2008 | Rufolo, Jr. |
| 7,468,676 | B2 | 12/2008 | Styers |
| 7,471,189 | B2 | 12/2008 | Vastad |
| 7,484,088 | B2 | 1/2009 | Campbell |
| 7,518,485 | B2 | 4/2009 | Shuster |
| 7,528,722 | B2 | 5/2009 | Nelson |
| 7,532,709 | B2 | 5/2009 | Styers |
| 7,553,173 | B2 | 6/2009 | Kowalick |
| 7,558,743 | B2 | 7/2009 | Razumov |
| 7,567,844 | B2 | 7/2009 | Thomas |
| 7,583,191 | B2 | 9/2009 | Zinser |
| 7,602,283 | B2 | 10/2009 | John |
| 7,647,231 | B2 | 1/2010 | Kuebert |
| 7,653,603 | B1 | 1/2010 | Holtkamp, Jr. |
| 7,657,466 | B2 | 2/2010 | Klingenberg |
| 7,677,243 | B2 | 3/2010 | McClendon |
| 7,697,686 | B2 | 4/2010 | Puiatti |
| 7,729,957 | B2 | 6/2010 | Sadler |
| 7,735,732 | B2 | 6/2010 | Linton |
| 7,742,928 | B2 | 6/2010 | Reynolds |
| 7,746,223 | B2 | 6/2010 | Howarter |
| 7,765,131 | B2 | 7/2010 | Klingenberg |
| 7,786,891 | B2 | 8/2010 | Owens |
| 7,788,221 | B2 | 8/2010 | Tanaka |
| 7,792,712 | B2 | 9/2010 | Kantarjiev |
| 7,815,112 | B2 | 10/2010 | Volpe |
| 7,817,013 | B2 | 10/2010 | Bazakos |
| 7,847,675 | B1 | 12/2010 | Thyen |
| 7,869,582 | B2 | 1/2011 | Styers |
| 7,885,821 | B2 | 2/2011 | Tait |
| 7,904,391 | B2 | 3/2011 | Sesek |
| 7,940,300 | B2 | 5/2011 | Spinelli |
| 7,945,032 | B2 | 5/2011 | Elberbaum |
| 7,962,422 | B1 | 6/2011 | Melechko |
| 7,983,991 | B2 | 7/2011 | Crussol |
| 8,018,329 | B2 | 9/2011 | Morgan |
| 8,044,782 | B2 | 10/2011 | Saban |
| 8,045,961 | B2 | 10/2011 | Ayed |
| 8,054,340 | B2 | 11/2011 | Miki |
| 8,077,034 | B2 | 12/2011 | Borlez |
| 8,077,054 | B1 | 12/2011 | Aarons |
| 8,093,986 | B2 | 1/2012 | Harvey |
| 8,103,521 | B2 | 1/2012 | Kuebert |
| 8,108,259 | B2 | 1/2012 | Klingenberg |
| 8,108,914 | B2 | 1/2012 | Hernoud |
| 8,120,459 | B2 | 2/2012 | Kwak |
| 8,139,098 | B2 | 3/2012 | Carter |
| 8,140,592 | B2 | 3/2012 | Scott |
| 8,144,183 | B2 | 3/2012 | Carter |
| 8,144,184 | B2 | 3/2012 | Carter |
| 8,154,581 | B2 | 4/2012 | Carter |
| 8,164,614 | B2 | 4/2012 | Carter |
| 8,218,739 | B2 | 7/2012 | Styers |
| 8,255,235 | B2 | 8/2012 | Aldstadt |
| 8,265,947 | B2 | 9/2012 | Kuebert |
| 8,326,001 | B2 | 12/2012 | Free |
| 8,334,906 | B2 | 12/2012 | Lipton |
| 8,378,988 | B1 | 2/2013 | Artino |
| 8,410,930 | B2 | 4/2013 | Karasek |
| 8,487,998 | B2 | 7/2013 | Chen |
| 8,489,520 | B2 | 7/2013 | Kuebert |
| 8,558,885 | B2 | 10/2013 | Fitzgibbon |
| 8,558,887 | B2 | 10/2013 | Plaster |
| 8,624,733 | B2 | 1/2014 | Cusack, Jr. |
| 8,635,078 | B2 | 1/2014 | Aldstadt |
| 8,666,907 | B1 | 3/2014 | Wang |
| 8,675,066 | B2 | 3/2014 | Trundle |
| 8,700,474 | B2 | 4/2014 | Argue |
| 8,704,793 | B1 | 4/2014 | Artino |
| 8,731,953 | B2 | 5/2014 | Cook |
| 8,733,291 | B2 | 5/2014 | Dunigan |
| 8,767,075 | B2 | 7/2014 | Bianco |
| 8,769,632 | B2 | 7/2014 | Cook |
| 8,775,329 | B2 | 7/2014 | Kuebert |
| 8,780,201 | B1 | 7/2014 | Scalisi |
| D714,514 | S | 9/2014 | Pettit |
| 8,823,795 | B1 | 9/2014 | Scalisi |
| 8,825,021 | B2 | 9/2014 | Wang |
| 8,825,535 | B2 | 9/2014 | Weik, III |
| 8,831,225 | B2 | 9/2014 | Gilb |

(56) References Cited

U.S. PATENT DOCUMENTS

| | | | |
|---|---|---|---|
| 8,842,180 B1 | 9/2014 | Kasmir |
| 8,844,010 B2 | 9/2014 | Brady |
| 8,844,811 B1 | 9/2014 | Rogers |
| 8,872,915 B1 | 10/2014 | Scalisi |
| 8,876,050 B2 | 11/2014 | Wentland |
| 8,881,252 B2 | 11/2014 | Van Till |
| 8,896,446 B2 | 11/2014 | Cusack, Jr. |
| 8,897,433 B2 | 11/2014 | Mota |
| 8,919,637 B2 | 12/2014 | Kim |
| 8,934,679 B2 | 1/2015 | Jeon |
| 8,941,736 B1 | 1/2015 | Scalisi |
| 8,947,530 B1 | 2/2015 | Scalisi |
| 8,976,025 B2 | 3/2015 | Somasundaram |
| 8,976,248 B2 | 3/2015 | Tanaka |
| 8,990,889 B2 | 3/2015 | Van Till |
| 9,003,196 B2 | 4/2015 | Hoyos |
| 9,013,575 B2 | 4/2015 | Scalisi |
| 9,053,622 B2 | 6/2015 | Scalisi |
| 9,055,202 B1 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir |
| 9,068,375 B2 | 6/2015 | Hinkel |
| 9,109,378 B2 | 8/2015 | Scalisi |
| 9,118,819 B1 | 8/2015 | Scalisi |
| 9,122,254 B2 | 9/2015 | Cate |
| 9,147,117 B1 | 9/2015 | Madhu |
| 9,160,987 B1 | 10/2015 | Kasmir |
| 9,164,614 B2 | 10/2015 | Irie |
| 9,165,444 B2 | 10/2015 | Scalisi |
| 9,179,058 B1 | 11/2015 | Zeira |
| 9,179,109 B1 | 11/2015 | Kasmir |
| 9,195,950 B2 | 11/2015 | Schenken |
| 9,196,133 B2 | 11/2015 | Scalisi |
| 9,202,034 B2 | 12/2015 | Matsuoka |
| 9,208,629 B2 | 12/2015 | Saladin |
| 9,229,957 B2 | 1/2016 | Kwan |
| 9,230,158 B1 | 1/2016 | Ramaswamy |
| 9,230,230 B2 | 1/2016 | Gupta |
| 9,235,943 B2 | 1/2016 | Scalisi |
| 9,244,147 B1 | 1/2016 | Soundararajan |
| 9,245,398 B2 | 1/2016 | Plummer |
| 9,275,535 B1 | 3/2016 | Ho |
| 9,322,194 B2 | 4/2016 | Cheng |
| 9,322,201 B1 | 4/2016 | Cheng |
| 9,325,949 B2 | 4/2016 | Moriarty |
| 9,326,094 B2 | 4/2016 | Johnson |
| 9,350,918 B1 | 5/2016 | Baldwin |
| 9,359,794 B2 | 6/2016 | Cheng |
| 9,364,112 B2 | 6/2016 | Sundaresan |
| 9,382,739 B1 | 7/2016 | Johnson |
| 9,392,099 B2 | 7/2016 | Lim |
| 9,396,594 B1 | 7/2016 | Fujisaki |
| 9,414,030 B2 | 8/2016 | Carter |
| 9,418,350 B2 | 8/2016 | Matula |
| 9,426,432 B2 | 8/2016 | Scalisi |
| 9,426,720 B2 | 8/2016 | Cohn |
| 9,447,609 B2 | 9/2016 | Johnson |
| 9,453,758 B2 | 9/2016 | Motoyama |
| 9,459,772 B2 | 10/2016 | Nihal |
| 9,460,596 B1 | 10/2016 | Moses |
| 9,461,992 B2 | 10/2016 | Outwater |
| 9,467,656 B1 | 10/2016 | Leizerovich |
| 9,470,017 B1 | 10/2016 | Cheng |
| 9,470,018 B1 | 10/2016 | Cheng |
| 9,472,031 B2 | 10/2016 | Pouille |
| 9,472,032 B2 | 10/2016 | Litterer |
| 9,472,077 B2 | 10/2016 | Coviello |
| 9,473,636 B2 | 10/2016 | Lenzeder |
| 9,483,887 B1 | 11/2016 | Soleimani |
| 9,485,478 B2 | 11/2016 | Carter |
| 9,508,054 B2 | 11/2016 | Brady |
| 9,510,693 B2 | 12/2016 | Cordier |
| 9,514,584 B1 | 12/2016 | Burge |
| 9,514,586 B2 | 12/2016 | Rogers |
| 9,516,030 B2 | 12/2016 | Torgersrud |
| 9,516,284 B2 | 12/2016 | Carter |
| 9,530,262 B2 | 12/2016 | Johnson |
| 9,530,295 B2 | 12/2016 | Johnson |
| 9,536,216 B1 | 1/2017 | Lisso |
| 9,554,090 B1 | 1/2017 | Carter |
| 9,558,673 B2 | 1/2017 | Soundararajan |
| 9,563,904 B2 | 2/2017 | Mastierov |
| 9,563,915 B2 | 2/2017 | Brady |
| 9,584,336 B2 | 2/2017 | Dunn |
| 9,608,834 B2 | 3/2017 | Hall |
| 9,619,955 B2 | 4/2017 | Eichenblatt |
| 9,635,323 B2 | 4/2017 | Carter |
| 9,641,474 B2 | 5/2017 | Brady |
| 9,644,399 B2 | 5/2017 | Johnson |
| 9,647,996 B2 | 5/2017 | Johnson |
| 9,648,290 B2 | 5/2017 | Carter |
| 9,652,912 B2 | 5/2017 | Fadell |
| 9,652,913 B2 | 5/2017 | Drako |
| 9,652,917 B2 | 5/2017 | Johnson |
| 9,654,614 B1 | 5/2017 | Hall |
| 9,661,122 B1 | 5/2017 | Hall |
| 9,661,123 B1 | 5/2017 | Hall |
| 9,667,768 B1 | 5/2017 | Hall |
| 9,683,391 B2 | 6/2017 | Johnson |
| 9,692,738 B1 | 6/2017 | Wenneman |
| 9,697,548 B1 | 7/2017 | Jaff |
| 9,704,320 B2 | 7/2017 | Johnson |
| 9,706,178 B2 | 7/2017 | Carter |
| 9,712,335 B2 | 7/2017 | Hall |
| 9,727,328 B2 | 8/2017 | Johnson |
| 9,747,735 B1 | 8/2017 | Drako |
| 9,756,233 B2 | 9/2017 | Lee |
| 9,760,072 B2 | 9/2017 | Hall |
| 9,779,571 B2 | 10/2017 | Chong |
| 9,786,141 B2 | 10/2017 | Grabham |
| 9,798,999 B2 | 10/2017 | Schenken |
| 9,799,183 B2 | 10/2017 | Harrison |
| 9,811,798 B2 | 11/2017 | Lievens |
| 9,811,958 B1 | 11/2017 | Hall |
| 9,835,434 B1 | 12/2017 | Sloo |
| 9,846,902 B2 | 12/2017 | Brady |
| 9,861,221 B2 | 1/2018 | Jiang |
| 9,875,486 B2 | 1/2018 | Mastierov |
| 9,881,474 B2 | 1/2018 | Fadell |
| 9,892,384 B2 | 2/2018 | Mastierov |
| 9,898,711 B2 | 2/2018 | Neal |
| 9,916,557 B1 | 3/2018 | Gillen |
| 9,916,746 B2 | 3/2018 | Johnson |
| 9,922,513 B1 | 3/2018 | Hall |
| 9,928,749 B2 | 3/2018 | Gil |
| 9,953,388 B2 | 4/2018 | Jones |
| 9,977,547 B1 | 5/2018 | Sloo |
| 10,015,898 B2 | 7/2018 | Whitmire |
| 10,039,401 B1 | 8/2018 | Romanucci |
| 10,055,718 B2 | 8/2018 | Madura |
| 10,089,801 B1 | 10/2018 | Musabeyoglu |
| 10,089,809 B1 | 10/2018 | Daly |
| 10,096,189 B2 | 10/2018 | Siegesmund |
| 10,137,816 B2 | 11/2018 | Harper |
| 10,147,249 B1 | 12/2018 | Brady |
| 10,167,661 B2 | 1/2019 | Preus |
| 10,203,211 B1 | 2/2019 | Mishra |
| 10,222,119 B2 | 3/2019 | Rezayat |
| 10,255,737 B1 | 4/2019 | Eichenblatt |
| 10,300,157 B2 | 5/2019 | Jones |
| D850,865 S | 6/2019 | Smith |
| 10,332,383 B1 | 6/2019 | Giles |
| 10,373,226 B1 | 8/2019 | Russell |
| 10,382,608 B2 | 8/2019 | Gerhardt |
| 10,388,092 B1 | 8/2019 | Solh |
| D860,789 S | 9/2019 | Rayeski |
| 10,443,918 B2 | 10/2019 | Li |
| 10,467,835 B2 | 11/2019 | Jones |
| 10,488,081 B2 | 11/2019 | High |
| 10,515,335 B2 | 12/2019 | Winkle |
| 10,525,865 B2 | 1/2020 | Wilkinson |
| 10,540,632 B2 | 1/2020 | Putcha |

(56) References Cited

U.S. PATENT DOCUMENTS

| | | | |
|---|---|---|---|
| 10,540,884 B1 | 1/2020 | Lyman | |
| 10,600,100 B2 | 3/2020 | Mattingly | |
| 10,602,867 B2 | 3/2020 | Poss | |
| 10,604,254 B2 | 3/2020 | O'Brien | |
| 10,618,447 B2 | 4/2020 | Putcha | |
| 10,621,811 B2 | 4/2020 | Tovey | |
| 10,624,484 B1 | 4/2020 | Mountford | |
| 10,627,244 B1 | 4/2020 | Lauka | |
| 10,628,786 B2 | 4/2020 | Millhouse | |
| 10,643,170 B2 | 5/2020 | Lee | |
| 10,657,383 B1 | 5/2020 | Solh | |
| 10,713,869 B2 * | 7/2020 | Morris | E05F 15/668 |
| 10,772,450 B2 | 9/2020 | Waisanen | |
| 10,834,523 B1 | 11/2020 | Rao | |
| 10,860,115 B1 | 12/2020 | Tran | |
| 10,874,240 B2 | 12/2020 | Lewis | |
| 10,977,660 B2 | 4/2021 | Thomas | |
| 11,037,146 B2 | 6/2021 | Payne | |
| 11,055,942 B2 | 7/2021 | Coates | |
| 11,087,602 B2 | 8/2021 | Lark | |
| 11,151,679 B2 | 10/2021 | Millhouse | |
| 11,157,865 B2 | 10/2021 | Millhouse | |
| 11,166,580 B2 | 11/2021 | Waisanen | |
| 11,275,196 B2 | 3/2022 | Bratton | |
| 11,521,444 B1 | 12/2022 | Badik | |
| 11,562,610 B2 | 1/2023 | Alamin | |
| 11,574,512 B2 | 2/2023 | Morris | |
| 2001/0013762 A1 | 8/2001 | Roman | |
| 2001/0024094 A1 | 9/2001 | Fitzgibbon | |
| 2001/0024095 A1 | 9/2001 | Fitzgibbon | |
| 2001/0029483 A1 | 10/2001 | Schultz | |
| 2001/0037509 A1 | 11/2001 | Kligman | |
| 2001/0038272 A1 | 11/2001 | Fitzgibbon | |
| 2001/0040422 A1 | 11/2001 | Gramlich | |
| 2001/0045449 A1 | 11/2001 | Shannon | |
| 2002/0013744 A1 | 1/2002 | Tsunenari | |
| 2002/0014953 A1 | 2/2002 | Stephens | |
| 2002/0014954 A1 | 2/2002 | Fitzgibbon | |
| 2002/0032572 A1 | 3/2002 | Ikemori | |
| 2002/0032612 A1 | 3/2002 | Williams | |
| 2002/0033683 A1 | 3/2002 | Fitzgibbon | |
| 2002/0034319 A1 | 3/2002 | Tumey | |
| 2002/0035515 A1 | 3/2002 | Moreno | |
| 2002/0035857 A1 | 3/2002 | Stein | |
| 2002/0050147 A1 | 5/2002 | Mai | |
| 2002/0053975 A1 | 5/2002 | Fitzgibbon | |
| 2002/0065565 A1 | 5/2002 | Okamura | |
| 2002/0087375 A1 | 7/2002 | Griffin | |
| 2002/0087429 A1 | 7/2002 | Shuster | |
| 2002/0088854 A1 | 7/2002 | Jo | |
| 2002/0097145 A1 | 7/2002 | Tumey | |
| 2002/0099945 A1 | 7/2002 | Mclintock | |
| 2002/0103653 A1 | 8/2002 | Huxter | |
| 2002/0103724 A1 | 8/2002 | Huxter | |
| 2002/0110242 A1 | 8/2002 | Bruwer | |
| 2002/0147919 A1 | 10/2002 | Gentry | |
| 2002/0152390 A1 | 10/2002 | Furuyama | |
| 2002/0153854 A1 | 10/2002 | Reed | |
| 2002/0156645 A1 | 10/2002 | Hansen | |
| 2002/0177460 A1 | 11/2002 | Beasley | |
| 2002/0180580 A1 | 12/2002 | Gotfried | |
| 2002/0180582 A1 | 12/2002 | Nielsen | |
| 2002/0186130 A1 | 12/2002 | Guthrie | |
| 2003/0007851 A1 | 1/2003 | Heigl | |
| 2003/0029579 A1 | 2/2003 | Mays | |
| 2003/0037009 A1 | 2/2003 | Tobin | |
| 2003/0071590 A1 | 4/2003 | Roman | |
| 2003/0076062 A1 | 4/2003 | Mullet | |
| 2003/0083807 A1 | 5/2003 | Kuroda | |
| 2003/0114206 A1 | 6/2003 | Timothy | |
| 2003/0155488 A1 | 8/2003 | Olson | |
| 2003/0169337 A1 | 9/2003 | Wilson | |
| 2003/0205980 A1 | 11/2003 | Fitzgibbon | |
| 2003/0234719 A1 | 12/2003 | Denison | |
| 2004/0012483 A1 | 1/2004 | Mays | |
| 2004/0015393 A1 | 1/2004 | Fong | |
| 2004/0057567 A1 | 3/2004 | Lee | |
| 2004/0066328 A1 | 4/2004 | Galley | |
| 2004/0122780 A1 | 6/2004 | Devar | |
| 2004/0133446 A1 | 7/2004 | Myrick | |
| 2004/0164847 A1 | 8/2004 | Hale | |
| 2004/0168083 A1 | 8/2004 | Gasparini | |
| 2004/0177279 A1 | 9/2004 | Domenz | |
| 2004/0210327 A1 | 10/2004 | Robb | |
| 2004/0216379 A1 | 11/2004 | Gioia | |
| 2004/0252017 A1 | 12/2004 | Holding | |
| 2005/0006908 A1 | 1/2005 | Bruwer | |
| 2005/0007451 A1 | 1/2005 | Chiang | |
| 2005/0060063 A1 | 3/2005 | Reichelt | |
| 2005/0080898 A1 | 4/2005 | Block | |
| 2005/0104716 A1 * | 5/2005 | Simms | G07C 9/27 |
| | | | 340/5.73 |
| 2005/0131774 A1 | 6/2005 | Huxter | |
| 2005/0137990 A1 | 6/2005 | Mayer | |
| 2005/0140321 A1 | 6/2005 | Wojciak, Jr. | |
| 2005/0149741 A1 | 7/2005 | Humbel | |
| 2005/0172462 A1 | 8/2005 | Rudduck | |
| 2005/0173937 A1 | 8/2005 | Yoshida | |
| 2005/0174080 A1 | 8/2005 | Beckerman | |
| 2005/0176400 A1 | 8/2005 | Mullet | |
| 2005/0199019 A1 | 9/2005 | Marcelle | |
| 2005/0204787 A1 | 9/2005 | Ernst | |
| 2005/0206498 A1 | 9/2005 | Tsui | |
| 2005/0206519 A1 | 9/2005 | Tsui | |
| 2005/0207616 A1 | 9/2005 | Brad | |
| 2005/0218854 A1 | 10/2005 | Gioia | |
| 2005/0232747 A1 | 10/2005 | Brackmann | |
| 2006/0012325 A1 | 1/2006 | Robb | |
| 2006/0055511 A1 | 3/2006 | Rodriguez | |
| 2006/0058012 A1 | 3/2006 | Caspi | |
| 2006/0170533 A1 | 8/2006 | Chioiu | |
| 2006/0176016 A1 | 8/2006 | Kok | |
| 2006/0186844 A1 | 8/2006 | Fitzgibbon | |
| 2006/0186991 A1 | 8/2006 | Jankovsky | |
| 2006/0190419 A1 | 8/2006 | Bunn | |
| 2006/0197481 A1 | 9/2006 | Hotto | |
| 2006/0202815 A1 | 9/2006 | John | |
| 2006/0254729 A1 | 11/2006 | Mays | |
| 2006/0255912 A1 | 11/2006 | Simms | |
| 2006/0282277 A1 | 12/2006 | Ng | |
| 2007/0005452 A1 | 1/2007 | Klingenberg | |
| 2007/0008142 A1 | 1/2007 | Crowe | |
| 2007/0022438 A1 | 1/2007 | Arseneau | |
| 2007/0024421 A1 | 2/2007 | Hale | |
| 2007/0046231 A1 | 3/2007 | Mullet | |
| 2007/0046232 A1 | 3/2007 | Mullet | |
| 2007/0150375 A1 | 6/2007 | Yang | |
| 2007/0172155 A1 | 7/2007 | Guckenberger | |
| 2007/0188120 A1 | 8/2007 | Mullet | |
| 2007/0193834 A1 | 8/2007 | Pai | |
| 2007/0268145 A1 | 11/2007 | Bazakos | |
| 2007/0268365 A1 | 11/2007 | Lee | |
| 2007/0285510 A1 | 12/2007 | Lipton | |
| 2008/0012515 A1 | 1/2008 | Murray | |
| 2008/0061926 A1 | 3/2008 | Strait | |
| 2008/0061957 A1 | 3/2008 | Nguyen | |
| 2008/0072170 A1 | 3/2008 | Simons | |
| 2008/0087797 A1 | 4/2008 | Turnbull | |
| 2008/0088410 A1 | 4/2008 | Mullet | |
| 2008/0094175 A1 | 4/2008 | Mullet | |
| 2008/0121682 A1 | 5/2008 | Grim | |
| 2008/0133209 A1 | 6/2008 | Bar-Or | |
| 2008/0136628 A1 | 6/2008 | Ishii | |
| 2008/0168271 A1 | 7/2008 | Sherburne | |
| 2008/0215766 A1 | 9/2008 | Stobbe | |
| 2008/0224859 A1 | 9/2008 | Li | |
| 2008/0239072 A1 | 10/2008 | Cheng | |
| 2008/0247345 A1 | 10/2008 | Bahar | |
| 2008/0298230 A1 | 12/2008 | Luft | |
| 2009/0012802 A1 | 1/2009 | Pinney | |
| 2009/0037217 A1 | 2/2009 | Naik | |
| 2009/0041311 A1 | 2/2009 | Hundley | |
| 2009/0051528 A1 | 2/2009 | Graichen | |
| 2009/0059001 A1 | 3/2009 | Wang | |

(56) References Cited

U.S. PATENT DOCUMENTS

| | | |
|---|---|---|
| 2009/0115570 A1 | 5/2009 | Cusack, Jr. |
| 2009/0166403 A1 | 7/2009 | Volpe |
| 2009/0209829 A1 | 8/2009 | Yanagidaira |
| 2009/0231093 A1 | 9/2009 | Keller, Jr. |
| 2009/0231121 A1 | 9/2009 | Daniel-Wayman |
| 2009/0231427 A1 | 9/2009 | Fitzgibbon |
| 2009/0251560 A1 | 10/2009 | Azar |
| 2009/0278683 A1 | 11/2009 | Carter |
| 2009/0284595 A1 | 11/2009 | Carter |
| 2010/0045429 A1 | 2/2010 | Mullet |
| 2010/0075655 A1 | 3/2010 | Howarter |
| 2010/0100497 A1 | 4/2010 | Kuebert |
| 2010/0141381 A1 | 6/2010 | Bliding |
| 2010/0171588 A1 | 7/2010 | Chutorash |
| 2010/0176919 A1 | 7/2010 | Myers |
| 2010/0190480 A1 | 7/2010 | Zheng |
| 2010/0201536 A1 | 8/2010 | Robertson |
| 2010/0237984 A1 | 9/2010 | Zenaty |
| 2010/0250021 A1 | 9/2010 | Cook |
| 2010/0250929 A1 | 9/2010 | Schultz |
| 2010/0283560 A1 | 11/2010 | Sommer |
| 2010/0283580 A1 | 11/2010 | Sheng |
| 2010/0289661 A1 | 11/2010 | Styers |
| 2010/0306549 A1 | 12/2010 | Ullmann |
| 2011/0000140 A1 | 1/2011 | Mays |
| 2011/0007156 A1 | 1/2011 | Sankaranarayanan |
| 2011/0013812 A1 | 1/2011 | Shin |
| 2011/0060480 A1 | 3/2011 | Mottla |
| 2011/0074570 A1 | 3/2011 | Feldstein |
| 2011/0106329 A1 | 5/2011 | Donnelly |
| 2011/0162058 A1 | 6/2011 | Powell |
| 2011/0165896 A1 | 7/2011 | Stromberg |
| 2011/0166700 A1 | 7/2011 | Dunn |
| 2011/0187497 A1 | 8/2011 | Chin |
| 2011/0193700 A1 | 8/2011 | Fitzgibbon |
| 2011/0205014 A1 | 8/2011 | Fitzgibbon |
| 2011/0227712 A1 | 9/2011 | Atteck |
| 2011/0228083 A1 | 9/2011 | Su |
| 2011/0231914 A1 | 9/2011 | Hung |
| 2011/0252843 A1 | 10/2011 | Sumcad |
| 2011/0254680 A1 | 10/2011 | Perkinson |
| 2011/0254681 A1 | 10/2011 | Perkinson |
| 2011/0254955 A1 | 10/2011 | Shen |
| 2011/0282611 A1 | 11/2011 | Reed |
| 2011/0292214 A1 | 12/2011 | Plaster |
| 2011/0311052 A1 | 12/2011 | Myers |
| 2011/0317872 A1 | 12/2011 | Free |
| 2012/0005297 A1 | 1/2012 | Robles Gil Daellenbach |
| 2012/0007735 A1 | 1/2012 | Rhyins |
| 2012/0019659 A1 | 1/2012 | Warzelhan |
| 2012/0027268 A1 | 2/2012 | Kwan |
| 2012/0036141 A1 | 2/2012 | Kim |
| 2012/0050006 A1 | 3/2012 | Deblaey |
| 2012/0089532 A1 | 4/2012 | Kuebert |
| 2012/0092124 A1 | 4/2012 | Fitzgibbon |
| 2012/0092125 A1 | 4/2012 | Farber |
| 2012/0113253 A1 | 5/2012 | Slater |
| 2012/0126939 A1 | 5/2012 | Chang |
| 2012/0147179 A1 | 6/2012 | Kim |
| 2012/0169880 A1 | 7/2012 | Williamson |
| 2012/0174143 A1 | 7/2012 | Yang |
| 2012/0188346 A1 | 7/2012 | Schnabl |
| 2012/0249289 A1 | 10/2012 | Freese |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0288023 A1 | 11/2012 | Karabinis |
| 2013/0006885 A1 | 1/2013 | Kuebert |
| 2013/0024525 A1 | 1/2013 | Brady |
| 2013/0024924 A1 | 1/2013 | Brady |
| 2013/0027212 A1 | 1/2013 | King |
| 2013/0066744 A1 | 3/2013 | Higgins |
| 2013/0100230 A1 | 4/2013 | Carter |
| 2013/0114188 A1 | 5/2013 | Fitzgibbon |
| 2013/0147601 A1 | 6/2013 | Fitzgibbon |
| 2013/0147623 A1 | 6/2013 | Somasundaram |
| 2013/0163833 A1 | 6/2013 | Wang |
| 2013/0167212 A1 | 6/2013 | Azar |
| 2013/0169801 A1 | 7/2013 | Martin |
| 2013/0176437 A1 | 7/2013 | Tseng |
| 2013/0204803 A1 | 8/2013 | Chalmers |
| 2013/0223696 A1 | 8/2013 | Azar |
| 2013/0227886 A1 | 9/2013 | Kurth |
| 2013/0262276 A1 | 10/2013 | Wan |
| 2013/0271261 A1 | 10/2013 | Ribas |
| 2013/0275326 A1 | 10/2013 | Klingenberg |
| 2013/0297047 A1 | 11/2013 | Sullivan |
| 2013/0300866 A1 | 11/2013 | Kildevaeld, III |
| 2013/0314542 A1 | 11/2013 | Jackson |
| 2013/0328663 A1 | 12/2013 | Ordaz |
| 2014/0009609 A1 | 1/2014 | Webster |
| 2014/0014008 A1 | 1/2014 | Tompkins |
| 2014/0015978 A1 | 1/2014 | Smith |
| 2014/0016837 A1 | 1/2014 | Nechyba |
| 2014/0020635 A1 | 1/2014 | Sayers |
| 2014/0037155 A1 | 2/2014 | Oliveira |
| 2014/0049371 A1 | 2/2014 | Tung |
| 2014/0063191 A1 | 3/2014 | Bataller |
| 2014/0075528 A1 | 3/2014 | Matsuoka |
| 2014/0077927 A1 | 3/2014 | Mattern |
| 2014/0078303 A1 | 3/2014 | Mattern |
| 2014/0098227 A1 | 4/2014 | Chen |
| 2014/0104429 A1 | 4/2014 | Ward |
| 2014/0125499 A1 | 5/2014 | Cate |
| 2014/0129606 A1 | 5/2014 | Cate |
| 2014/0139316 A1 | 5/2014 | Fitzgibbon |
| 2014/0139678 A1 | 5/2014 | Moriarty |
| 2014/0180959 A1 | 6/2014 | Gillen |
| 2014/0192197 A1 | 7/2014 | Hanko |
| 2014/0195952 A1 | 7/2014 | Champagne |
| 2014/0225713 A1 | 8/2014 | Mcintyre |
| 2014/0247347 A1 | 9/2014 | Mcneill |
| 2014/0254896 A1 | 9/2014 | Zhou |
| 2014/0266573 A1 | 9/2014 | Sullivan |
| 2014/0266589 A1 | 9/2014 | Wilder |
| 2014/0266593 A1 | 9/2014 | Nye |
| 2014/0267716 A1 | 9/2014 | Child |
| 2014/0293046 A1 | 10/2014 | Ni |
| 2014/0334684 A1 | 11/2014 | Strimling |
| 2014/0341443 A1 | 11/2014 | Cao |
| 2014/0358814 A1 | 12/2014 | Brady |
| 2014/0361869 A1 | 12/2014 | Prasad |
| 2014/0365773 A1 | 12/2014 | Gerhardt |
| 2014/0368646 A1 | 12/2014 | Traff |
| 2015/0028165 A1 | 1/2015 | Deng |
| 2015/0029008 A1 | 1/2015 | Scalisi |
| 2015/0029334 A1 | 1/2015 | Scalisi |
| 2015/0049191 A1 | 2/2015 | Scalisi |
| 2015/0062337 A1 | 3/2015 | Scalisi |
| 2015/0062343 A1 | 3/2015 | Hwang |
| 2015/0077219 A1 | 3/2015 | Keller, Jr. |
| 2015/0084779 A1 | 3/2015 | Saladin |
| 2015/0088781 A1 | 3/2015 | Gillen |
| 2015/0097949 A1 | 4/2015 | Ure |
| 2015/0100513 A1 | 4/2015 | Parris |
| 2015/0102906 A1 | 4/2015 | Gerhardt |
| 2015/0120015 A1 | 4/2015 | Fadell |
| 2015/0138353 A1 | 5/2015 | Yang |
| 2015/0145643 A1 | 5/2015 | Fadell |
| 2015/0145993 A1 | 5/2015 | Scalisi |
| 2015/0154461 A1 | 6/2015 | Kitaura |
| 2015/0156465 A1 | 6/2015 | Tanaka |
| 2015/0158599 A1 | 6/2015 | Sisko |
| 2015/0161434 A1 | 6/2015 | Ross |
| 2015/0163463 A1 | 6/2015 | Hwang |
| 2015/0179011 A1 | 6/2015 | Kramer |
| 2015/0181014 A1 | 6/2015 | Gerhardt |
| 2015/0181169 A1 | 6/2015 | Kim |
| 2015/0186840 A1 | 7/2015 | Torres |
| 2015/0221147 A1 | 8/2015 | Daniel-Wayman |
| 2015/0235166 A1 | 8/2015 | Brady |
| 2015/0235172 A1 | 8/2015 | Hall |
| 2015/0235173 A1 | 8/2015 | Hall |
| 2015/0235174 A1 | 8/2015 | Hall |

(56)　　　　References Cited

U.S. PATENT DOCUMENTS

| | | |
|---|---|---|
| 2015/0235175 A1 | 8/2015 | Hall |
| 2015/0235301 A1 | 8/2015 | Brady |
| 2015/0235490 A1 | 8/2015 | Hall |
| 2015/0235493 A1 | 8/2015 | Hall |
| 2015/0235495 A1 | 8/2015 | Hall |
| 2015/0248754 A1 | 9/2015 | Graner |
| 2015/0248798 A1 | 9/2015 | Howe |
| 2015/0262443 A1 | 9/2015 | Chong |
| 2015/0275564 A1 | 10/2015 | Rosenthal |
| 2015/0281268 A1 | 10/2015 | Satish |
| 2015/0281658 A1 | 10/2015 | Lee |
| 2015/0296183 A1 | 10/2015 | Cho |
| 2015/0310381 A1 | 10/2015 | Lyman |
| 2015/0310713 A1 | 10/2015 | Kellermann |
| 2015/0312531 A1 | 10/2015 | Samad |
| 2015/0317841 A1 | 11/2015 | Karsch |
| 2015/0317853 A1 | 11/2015 | Reymann |
| 2015/0324571 A1 | 11/2015 | Hernoud |
| 2015/0356802 A1 | 12/2015 | Cho |
| 2015/0358359 A1 | 12/2015 | Ghai |
| 2015/0371469 A1 | 12/2015 | Scalisi |
| 2015/0381949 A1 | 12/2015 | Renkis |
| 2016/0004229 A1 | 1/2016 | Hall |
| 2016/0004230 A1 | 1/2016 | Hall |
| 2016/0005281 A1 | 1/2016 | Laska |
| 2016/0010382 A1 | 1/2016 | Cate |
| 2016/0016664 A1 | 1/2016 | Basuni |
| 2016/0035198 A1 | 2/2016 | Coviello |
| 2016/0042333 A1 | 2/2016 | Ho |
| 2016/0050082 A1 | 2/2016 | Hall |
| 2016/0050121 A1 | 2/2016 | Hall |
| 2016/0055692 A1 | 2/2016 | Trani |
| 2016/0058181 A1 | 3/2016 | Han |
| 2016/0085949 A1 | 3/2016 | Peterson |
| 2016/0086403 A1 | 3/2016 | Litterer |
| 2016/0087991 A1 | 3/2016 | Matsuoka |
| 2016/0093180 A1 | 3/2016 | Fitzgibbon |
| 2016/0094815 A1 | 3/2016 | Scalisi |
| 2016/0096508 A1 | 4/2016 | Oz |
| 2016/0098670 A1 | 4/2016 | Oz |
| 2016/0098871 A1 | 4/2016 | Oz |
| 2016/0098876 A1 | 4/2016 | Oz |
| 2016/0099927 A1 | 4/2016 | Oz |
| 2016/0110762 A1 | 4/2016 | Mastierov |
| 2016/0110763 A1 | 4/2016 | Mastierov |
| 2016/0123619 A1 | 5/2016 | Hester |
| 2016/0125357 A1 | 5/2016 | Hall |
| 2016/0148154 A1 | 5/2016 | Tibbs |
| 2016/0171435 A1* | 6/2016 | Newton ............. G06Q 10/0833 |
| | | 705/333 |
| 2016/0180156 A1 | 6/2016 | Marcheselli |
| 2016/0180618 A1 | 6/2016 | Ho |
| 2016/0185466 A1 | 6/2016 | Dreano, Jr. |
| 2016/0189502 A1 | 6/2016 | Johnson |
| 2016/0194912 A1 | 7/2016 | Fitzgibbon |
| 2016/0196702 A1 | 7/2016 | Wilson |
| 2016/0196703 A1 | 7/2016 | Jean |
| 2016/0196704 A1 | 7/2016 | Devin |
| 2016/0205096 A1 | 7/2016 | Hoyos |
| 2016/0210454 A1 | 7/2016 | Chou |
| 2016/0217632 A1 | 7/2016 | Ille |
| 2016/0217636 A1 | 7/2016 | Lai |
| 2016/0217638 A1 | 7/2016 | Child |
| 2016/0219254 A1 | 7/2016 | Hu |
| 2016/0225208 A1 | 8/2016 | Chou |
| 2016/0247027 A1 | 8/2016 | Tsoi |
| 2016/0247344 A1* | 8/2016 | Eichenblatt .......... A47G 29/141 |
| 2016/0258777 A1 | 9/2016 | Bodake |
| 2016/0265253 A1 | 9/2016 | Hild |
| 2016/0292942 A1 | 10/2016 | Ranchod |
| 2016/0300187 A1 | 10/2016 | Kashi |
| 2016/0300415 A1 | 10/2016 | Deneen |
| 2016/0300463 A1 | 10/2016 | Mahar |
| 2016/0307380 A1 | 10/2016 | Ho |
| 2016/0308859 A1 | 10/2016 | Barry |
| 2016/0316178 A1 | 10/2016 | Hoeffner |
| 2016/0316322 A1 | 10/2016 | Gillen |
| 2016/0328894 A1 | 11/2016 | Zhang |
| 2016/0328898 A1 | 11/2016 | Robinson |
| 2016/0328903 A1 | 11/2016 | Roberts |
| 2016/0343187 A1 | 11/2016 | Trani |
| 2016/0343192 A1 | 11/2016 | Grow |
| 2016/0343220 A1 | 11/2016 | Grabham |
| 2016/0360163 A1 | 12/2016 | Carter |
| 2016/0360181 A1 | 12/2016 | Drako |
| 2016/0371642 A1 | 12/2016 | Wilkinson |
| 2017/0019413 A1 | 1/2017 | Dailly |
| 2017/0019765 A1 | 1/2017 | Hoyer |
| 2017/0024691 A1 | 1/2017 | O'Brien |
| 2017/0034485 A1 | 2/2017 | Scalisi |
| 2017/0039515 A1 | 2/2017 | Wilkinson |
| 2017/0041745 A1 | 2/2017 | Lott |
| 2017/0048489 A1 | 2/2017 | Carter |
| 2017/0048497 A1 | 2/2017 | Carter |
| 2017/0055751 A1 | 3/2017 | Sundaresan |
| 2017/0099295 A1 | 4/2017 | Ricci |
| 2017/0109952 A1 | 4/2017 | Johnson |
| 2017/0116572 A1 | 4/2017 | Natarajan |
| 2017/0116835 A1 | 4/2017 | Child |
| 2017/0124510 A1 | 5/2017 | Caterino |
| 2017/0126900 A1 | 5/2017 | Quady |
| 2017/0131888 A1 | 5/2017 | Hall |
| 2017/0134244 A1 | 5/2017 | Hall |
| 2017/0134245 A1 | 5/2017 | Hall |
| 2017/0134557 A1 | 5/2017 | Hall |
| 2017/0134558 A1 | 5/2017 | Hall |
| 2017/0134559 A1 | 5/2017 | Hall |
| 2017/0142377 A1 | 5/2017 | Tanaka |
| 2017/0142544 A1 | 5/2017 | Hall |
| 2017/0143146 A1 | 5/2017 | Charbeneau |
| 2017/0144757 A1 | 5/2017 | Hall |
| 2017/0147979 A1 | 5/2017 | Brady |
| 2017/0147994 A1 | 5/2017 | Mastierov |
| 2017/0149623 A1 | 5/2017 | Hall |
| 2017/0161674 A1 | 6/2017 | Jones |
| 2017/0175433 A1 | 6/2017 | Kang |
| 2017/0187841 A1 | 6/2017 | Hall |
| 2017/0193465 A1 | 7/2017 | Madura |
| 2017/0195625 A1 | 7/2017 | Mahar |
| 2017/0195636 A1 | 7/2017 | Child |
| 2017/0198516 A1 | 7/2017 | Dey |
| 2017/0220872 A1 | 8/2017 | Child |
| 2017/0236193 A1 | 8/2017 | Zundel |
| 2017/0286905 A1 | 10/2017 | Richardson |
| 2017/0293916 A1 | 10/2017 | Humphrys |
| 2017/0301166 A1 | 10/2017 | Earles |
| 2017/0307278 A1 | 10/2017 | Chandran |
| 2017/0323502 A1 | 11/2017 | Hall |
| 2017/0323545 A1 | 11/2017 | Gillen |
| 2017/0350635 A1 | 12/2017 | Thirumurugavel |
| 2017/0355076 A1 | 12/2017 | Gordon-Carroll |
| 2018/0005169 A1 | 1/2018 | High |
| 2018/0040216 A1 | 2/2018 | Scalisi |
| 2018/0041493 A1 | 2/2018 | Wilkinson |
| 2018/0047227 A1 | 2/2018 | Beavers |
| 2018/0053365 A1 | 2/2018 | Bode |
| 2018/0061154 A1 | 3/2018 | Scalisi |
| 2018/0061164 A1 | 3/2018 | Scalisi |
| 2018/0075680 A1 | 3/2018 | Sommer |
| 2018/0075681 A1 | 3/2018 | Scalisi |
| 2018/0082249 A1 | 3/2018 | High |
| 2018/0137495 A1 | 5/2018 | Pandey |
| 2018/0180340 A1 | 6/2018 | Jones |
| 2018/0191889 A1 | 7/2018 | Gerhardt |
| 2018/0242768 A1 | 8/2018 | Lewis |
| 2018/0268633 A1 | 9/2018 | Kwon |
| 2018/0276613 A1 | 9/2018 | Hall |
| 2018/0285814 A1 | 10/2018 | Hall |
| 2018/0308048 A1 | 10/2018 | Nemati |
| 2018/0315013 A1 | 11/2018 | Wilkinson |
| 2018/0357847 A1 | 12/2018 | Shinar |
| 2018/0365644 A1 | 12/2018 | Smith |
| 2019/0005445 A1 | 1/2019 | Bahrainwala |
| 2019/0031146 A1 | 1/2019 | Etonye |

(56) References Cited

U.S. PATENT DOCUMENTS

| | | | |
|---|---|---|---|
| 2019/0034859 A1 | 1/2019 | Kim | |
| 2019/0035187 A1 | 1/2019 | Kim | |
| 2019/0043290 A1 | 2/2019 | Morris | |
| 2019/0077600 A1 | 3/2019 | Watts | |
| 2019/0087775 A1 | 3/2019 | Buehre | |
| 2019/0102730 A1 | 4/2019 | Giorgi | |
| 2019/0108481 A1 | 4/2019 | Kashi | |
| 2019/0130348 A1 | 5/2019 | Mellado | |
| 2019/0147680 A1 | 5/2019 | Tehranchi | |
| 2019/0167025 A1 | 6/2019 | Cherry | |
| 2019/0188775 A1 | 6/2019 | Rivoli | |
| 2019/0196511 A1 | 6/2019 | Millhouse | |
| 2019/0202557 A1 | 7/2019 | Meredith | |
| 2019/0213817 A1 | 7/2019 | Wechsler | |
| 2019/0233103 A1 | 8/2019 | High | |
| 2019/0241266 A1 | 8/2019 | Thompson | |
| 2019/0244168 A1 | 8/2019 | High | |
| 2019/0244448 A1 | 8/2019 | Alamin | |
| 2019/0259232 A1 | 8/2019 | Gopal | |
| 2019/0263521 A1 | 8/2019 | O'Brien | |
| 2019/0265717 A1 | 8/2019 | Mchale | |
| 2019/0266819 A1 | 8/2019 | Mchale | |
| 2019/0282015 A1 | 9/2019 | High | |
| 2019/0287063 A1 | 9/2019 | Skaaksrud | |
| 2019/0300202 A1 | 10/2019 | High | |
| 2019/0320834 A1 | 10/2019 | Tovey | |
| 2019/0333302 A1 | 10/2019 | Kagnew | |
| 2019/0342702 A1 | 11/2019 | Shinar | |
| 2019/0359400 A1* | 11/2019 | Pariente-Cohen | B65D 5/4212 |
| 2019/0375594 A1 | 12/2019 | Tovey | |
| 2019/0378086 A1 | 12/2019 | Laye | |
| 2020/0055596 A1 | 2/2020 | Millhouse | |
| 2020/0077826 A1 | 3/2020 | Chenier | |
| 2020/0116414 A1 | 4/2020 | Dade | |
| 2020/0128991 A1 | 4/2020 | Jessie | |
| 2020/0219340 A1* | 7/2020 | Geerlings | G07C 9/00896 |
| 2020/0219348 A1* | 7/2020 | Hanlon | G07C 9/00896 |
| 2020/0273133 A1 | 8/2020 | Morris | |
| 2020/0312073 A1* | 10/2020 | Ivarson | G06K 7/1417 |
| 2020/0327754 A1 | 10/2020 | Morris | |
| 2020/0346852 A1* | 11/2020 | Hess | G01F 23/0007 |
| 2020/0356945 A1 | 11/2020 | Durkee | |
| 2020/0390260 A1 | 12/2020 | Romanucci | |
| 2020/0393854 A1 | 12/2020 | Romanucci | |
| 2020/0402336 A1* | 12/2020 | Levy | G07C 9/00817 |
| 2021/0065489 A1 | 3/2021 | Hass | |
| 2021/0101745 A1 | 4/2021 | Cruz | |
| 2021/0269255 A1 | 9/2021 | Montgomery, III | |
| 2021/0272401 A1 | 9/2021 | Alamin | |
| 2021/0287168 A1 | 9/2021 | Arora | |
| 2021/0304539 A1* | 9/2021 | Simms | G07C 9/00309 |
| 2021/0315404 A9 | 10/2021 | Waisanen | |
| 2021/0319529 A1 | 10/2021 | High | |
| 2022/0005303 A1 | 1/2022 | Kim | |
| 2022/0296023 A1* | 9/2022 | Fernandez | A47G 29/141 |
| 2023/0070772 A1 | 3/2023 | Bingham | |
| 2023/0090303 A1 | 3/2023 | Morris | |
| 2023/0177899 A1 | 6/2023 | Morris | |

FOREIGN PATENT DOCUMENTS

| | | |
|---|---|---|
| CA | 3016902 A1 | 9/2017 |
| CA | 3027735 A1 | 12/2017 |
| CA | 3033213 A1 | 3/2018 |
| CA | 3038525 A1 | 4/2018 |
| CA | 3103822 A1 | 8/2019 |
| CA | 2959486 C | 10/2021 |
| CN | 101329779 A | 12/2008 |
| CN | 103635940 A | 3/2014 |
| EP | 1143835 A2 | 10/2001 |
| FR | 2818257 A1 | 6/2002 |
| FR | 3021733 A1 | 12/2015 |
| FR | 3082410 A1 | 12/2019 |
| FR | 3082411 A1 | 12/2019 |
| GB | 2355708 A | 5/2001 |
| JP | 2012247410 | 12/2012 |
| JP | 5317004 | 10/2013 |
| JP | 2013213680 | 10/2013 |
| KR | 20040035952 | 4/2004 |
| KR | 1020040035952 | 4/2004 |
| KR | 20050005150 | 1/2005 |
| KR | 20060035951 | 4/2006 |
| KR | 101535411 | 7/2015 |
| KR | 1020180049934 | 5/2018 |
| WO | 20010318272 | 5/2001 |
| WO | 2001097664 | 6/2001 |
| WO | 2001067344 | 9/2001 |
| WO | 0210040 | 2/2002 |
| WO | 02100040 | 12/2002 |
| WO | 02100040 A | 12/2002 |
| WO | 2006136662 | 12/2006 |
| WO | 2006136662 A | 12/2006 |
| WO | 2010144490 | 12/2010 |
| WO | 2010144490 A | 12/2010 |
| WO | 2012151290 | 11/2012 |
| WO | 2012151290 A | 11/2012 |
| WO | 2014151249 | 9/2014 |
| WO | 2015126965 | 8/2015 |
| WO | 2016064679 | 4/2016 |
| WO | 2017116769 | 7/2017 |
| WO | 2017190026 | 11/2017 |
| WO | 20170218914 | 12/2017 |
| WO | 2019071347 | 4/2019 |

OTHER PUBLICATIONS

U.S. Appl. No. 18/082,310, filed Dec. 15, 2022; 61 pages.

U.S. Appl. No. 17/992,691, filed Nov. 22, 2022; 63 pages.

U.S. Appl. No. 18/104,689; Non-Final Rejection mailed Jun. 20, 2023; (pp. 1-5).

U.S. Appl. No. 18/104,869; Notice of Allowance and Fees mailed Oct. 5, 2023; 10 Pages.

"Assa Abloy trials remote hotel check-ins", © 2012 AOL Inc., [online]. Retrieved from the Internet: <URL: http://www.engadget.com/2010/11 /02/assa-abloy-trials-remote-hotel-check-ins-unlocking-your-room-wi/>, (Accessed Apr. 23, 2012), 2 pgs.

"Cell phone controlled door lock", Copyright © 2012, Hack a Day, [online]. Retrieved from the Internet: <URL: http:J/hackaday.com/2007/07/17/cell-phone-controlled-door-lock/>, Accessed Apr. 23, 2012), 11 pgs.

"Chinese Application Serial No. 201280032878.2, Office Action mailed May 11, 2015", w/English Translation, 14 pgs.

"Chinese Application Serial No. 201280032878.2, Office Action mailed Sep. 26, 2018", w/English Translation, 14 pgs.

"ECKey—Turn your phone into a Key!", [online}. Retrieved from the Internet: <URL: http://www.eckev.com/>, (Accessed Apr. 23, 2012), 2 pgs.

"iDoor—iPhone Controlled Hydraulic Door", http://varenhor.st/ 2009 /07 /idoor-i phone-contro lied-hydraulic-door/, retrieved Apr. 23, 2012, 12 pages.

"iDoor—iPhone Controlled Hydraulic Door", Chris Varenhorst chris@localhost, [online]. Retrieved from the Internet: <URL: http://varenhor.st/2009/07/idoor-iphone-controlledhydraulic-door/>, (Accessed Apr. 23, 2012), 12 pgs.

"Keyless entry via SMS", Copyright © 2012, Hack a Day, [on line]. Retrieved from the Internet: <URL: http://hackaday.com/2011 /01 /24/keyless-entry-via-sms/, (Accessed Apr. 23, 2012), 9 pgs.

"Knock detecting lock", Copyright © 2012, Hack a Day, [online]. Retrieved from the Internet: <URL: http://hackaday.com/2009/11 /04/knock-detecting-lock/>, (Accessed Apr. 23, 2012), 10 pgs.

"Knock response automatic door opener", Copyright © 2012, Hack a Day, [on line]. Retrieved from the Internet: <URL: http://hackaday.com/2007/06/11/knock-responseautomatic-door-opener/>, (Accessed Apr. 23, 2012), 9 pgs.

"More cellphone controlled door locks", Copyright © 2012, Hack a Day, [online]. Retrieved from the Internet: <URL: http://hackaday.com/2010/02/23/more-cellphone-controlled-doorlocks/>, (Accessed Apr. 23, 2012), 10 pgs.

(56) References Cited

OTHER PUBLICATIONS

"Nexia Home Intelligence", Nexia™, [online]. Retrieved from the Internet: <URL: http://www.nexiahome.com/Products/ProductCatalog.aspx?catsel=5>, (Accessed Apr. 23, 2012), 2 pgs.

"Oliver Nash's Blog", [online]. Retrieved from the Internet: <URL: http ://ocfnash. wordpress .com/2009/10/31 /locked-out-at-2am/>, (Accessed Apr. 23, 2012), 18 pgs.

"Open Ways", OpenWays copyright 2011 , [online]. Retrieved from the Internet: <URL: http://www.openways.com/>, (Accessed Apr. 20, 2012), 1 pg.

"Opening a door via text message", [online]. Retrieved from the Internet: <URL: http:/ /anerroroccurredwhileprocessingthisdirective .com/2011 /01/01 /opening-a-door-via-textmessage/>, (Accessed Apr. 23, 2012), 8 pgs.

"Phantom Keyless Home Entry", Copyright © 2012 Phantom Smart Home, LLC, [online]. Retrieved from the Internet: <URL: http://phantomsmarthome.com/, (Accessed Apr. 23, 2012), 1 pg.

"Remote entry via Android and Launchpad", Copyright © 2012, Hack a Day, [online]. Retrieved from the Internet: <URL: http://hackaday.com/2012/01/24/remote-entry-viaandroid-and-launchpad/>, (Accessed Apr. 23, 2012), 9 pgs.

"SimpliciKey Electronic Door Look Solutions", Copyright © 2011 SimpliciKey TM, [online ]. Retrieved from the Internet: <URL: http://simplicikey.com/>, (Accessed Apr. 23, 2012), 1 pg.

"Unlock you door with Siri, SMS, or a secret knock", © 2010 laan labs, [online]. Retrieved from the Internet: <URL: http://labs.laan.com/wp/2011/10/unlock-your-door-with-siri-sms-ora-secret-knock/>, (Accessed Apr. 23, 2012), 11 pgs.

"USB Auth—Makers Local 256", Wiki pages, [online]. Retrieved from the Internet: <URL: https://256.makerslocal.ori:i/wiki/index.php/USB Auth>, (Accessed Apr. 23, 2012), 9 pgs.

"Viper SmartStart", © Copyright 2012 Directed., [online]. Retrieved from the Internet: <URL: http://www.vioer.com/smartstartl >, (Accessed Apr. 23, 2012), 2 pgs.

"Yale demos NFC-enabled residential locks, germaphobes rejoice", © 2012 AOL Inc, onlinel. Retrieved from the Internet: <URL:, (Accessed Apr. 23, 2012), 4 pgs.

"Zwave Products", Copyrights © 2012—Zwave Products Inc, [online]. Retrieved from the Internet: <URL: http://www.zwaveoroducts.com/KWIKSET.html>, (Accessed Apr. 23, 2012), 3 pgs.

Amazon Help; How In-Home Delivery Works; https://www.amazon.com/gp/help/customer/display.html?nodeId=202104360; 2 pages; Known as early as Oct. 2017.

U.S. Appl. No. 13/462,669 , Response filed Nov. 19, 2013 to Non Final Office Action mailed Aug. 26, 2013; 12 pgs.

U.S. Appl. No. 13/462,669, Examiner Interview Summary mailed Nov. 14, 2013, 3 pgs.

U.S. Appl. No. 13/462,669, Non Final Office Action mailed Aug. 26, 2013, 17 pgs.

U.S. Appl. No. 14/508,501, Non Final Office Action mailed Mar. 6, 2015, 15 pgs.

Author: Alarm.com; Title: MyQ Garage Universal Retrofit, Installation Guide; Date: 2004, Publisher: Alarm.com Pertinent Pages: Whole document (Year: 2014).

BenchSentry + Aladdin Connect; Protect any size delivery with the ultimate package theft solution; publicly available as early as Apr. 28, 2021; 9 pages; https://benchsentry.com.

Boxlock; Secure & Contactless Delivery Solutions | Package Security; The Supply Chain Access Control Platform; publicly available as early as Apr. 28, 2021; 6 pages; https://www.getboxlock.com.

Computer rendering of deadbolt lock publicly available before Aug. 1, 2017, 1 page.

Danby ParcelGuard; Stop Porch Pirates in Their Tracks With the World's Smallest Mailbox; publicly available as early as Apr. 28, 2021; 9 pages; https://www.danbyparcelguard.com/en-us/.

Dynosafe; Own the Porch—The original climate-controlled, smart home-enabled delivery lockbox; publicly available as early as Apr. 19, 2021; 10 pages; https://www.dynosafe.com.

HomeValet Launches Revolutionary Contactless Home Delivery System; The HomeValet-Powered SmartBox; publicly available as early as Apr. 28, 2021; 2 pages; https://www.perishablenews.com/retailfoodservice/homevalet-launches-revolutionary-contactless-home-delivery-system/ .

Hot Stuff: [Morning Edition]; by Andre Mouchard: The Orange County Register; Publication Jul. 20, 1998; 3 pages, https://dialog.proquest.com/professional/printviewfile?accountid=. . . .

International Application Serial No. PCT/722012/036141, International Search Report mailed Apr. 9, 2012, 5 pages.

International Application Serial No. PCT/US2012/036141 , International Preliminary Report on Patentability mailed Nov. 5, 2013, 7 pgs.

International Application Serial No. PCT/US2012/036141, International Search Report mailed Sep. 4, 2012, 5 pgs.

International Application Serial No. PCT/US2012/036141, Written Opinion mailed Sep. 4, 2012, 6 pgs.

International Search Report and Written Opinion; Corresponding PCT Patent Application No. PCT/US2020/021329; Dated Sep. 23, 2020; 13 pages.

Inventors Devise New Mailboxes for Bulky E-Commerce Packages; The Wall Street Journal; By Robert Johnson—Staff Reporter of the Wall Street Journal; 4 pages, Updated Aug. 17, 1999.

Liviri Deliver Different; Liviri Reusable Insulated Boxes | Reimagine the Box; publicly available as early as Apr. 28, 2021; 11 pages; https://liviri.com.

Meet HomeValet; publicly available as early as Apr. 28, 2021; 5 pages; https://www.homevalet.co.

Non-Patent Literature document Description of STM Electronics FlightSense product; publicly available before May 12, 2021, 1 page.

PCT Patent Application No. PCT/US2018/044625; International Search Report and Written Opinion dated Nov. 18, 2018; 12 Pages.

PCT Patent Application No. PCT/US2019/027632; International Search Report and Written Opinion dated Aug. 4, 2019, 10 pages.

Phantom Smart Snart Home; Hands-Free Keyless Home Entry, https://web.archive.org/web/20110222072442/http:/www.phantomsmarthome.com/; 3 pages, copyright 2011.

Porchster; Smart Delivery Locker; Parcel Locker, Delivery Locker Mailbox; publicly available as early as Apr. 28, 2021; 5 pages; https://porchster.com.

RGJ.com website, https://www.rgj.com/story/life/food/2017/09/05/only-rgj-com-uber-eats-debuts-wednesday-reno/632015001/, dated Sep. 5, 2017, 4 pages.

Samsung SpaceMax Family Hub IOT Refrigerator; Published Oct. 23, 2020; https://www.youtube.com/watch?v=njsZJtEi5z4; 21 pages.

Samsung SpaceMax Family Hub; It's More than a Fridge; Published: Jul. 26, 2020; https://www.youtube.com/watch?v=hcMx9flBdCA; 7 pages.

Sorex_wirelessKey_2_0-Sorex Wayback site of Sep. 6, 2011, 2 pages.

Sorex_wirelessKey_Folder_2009, 2 pages.

The Verge website, https://www.theverge.com/2017/10/25/16538834/amazon-key-in-home-delivery-unlock-door-prime-cloud-cam-smart-lock, dated Oct. 25, 2017, 5 pages.

Todd Bishop; Creeped out by Amazon Key? How the In-Home Delivery Service Will Work; https://www.geekwire.com/author/todd/) on Oct. 26, 2017 at 7:26 am.

Two-Factor Authentication with Proximity Uses iBeacon Bluetooth Low Energy (BLE) to Authenticate Users Instantly, https://saaspass.com/technologies/proximity-instant-login-two-factor-authentication-beacon.html, 5 pages, Known as early as Nov. 6, 2017.

Two-Factor Authentication with Proximity Uses iBeacon Low Energy (BLE) to Authenticate Users Instantly, https//saaspass.com/technologies/proximity-instant-login-two-factor-authentication-beacon.html, 5 pages, Known as early as Nov. 6, 2017.

U.S. Appl. No. 13/462,714, Non-Final Office Action Mailed Aug. 26, 2013, 17 pages.

U.S. Appl. No. 13/462,669, Final Office Action mailed Feb. 24, 2014, 22 pgs.

U.S. Appl. No. 13/462,669, Non Final Office Action mailed Aug. 26, 2013, 18 pgs.

U.S. Appl. No. 13/462,714, Examiner Interview Summary mailed Mar. 7, 2014, 3 pgs.

(56) References Cited

OTHER PUBLICATIONS

U.S. Appl. No. 13/462,714, Final Office Action mailed Apr. 7, 2014, 20 pgs.

U.S. Appl. No. 13/462,714, Non Final Office Action mailed Aug. 26, 2013, 17 pgs.

U.S. Appl. No. 13/462,714, Response filed Feb. 26, 2014 to Non Final Office Action mailed Aug. 26, 2013, 15 pgs.

U.S. Appl. No. 13/462,765, Non Final Office Action mailed Sep. 4, 2014, 11 pgs.

U.S. Appl. No. 14/468,114, Final Office Action mailed Mar. 15, 2016, 13 pgs.

U.S. Appl. No. 14/468,114, Non Final Office Action mailed Jul. 21, 2016, 11 pgs.

U.S. Appl. No. 14/468,114, Preliminary Amendment filed Aug. 27, 2014, 7 pgs.

U.S. Appl. No. 14/638,828, Examiner Interview Summary mailed Mar. 4, 2016, 3 pgs.

U.S. Appl. No. 14/638,828, Final Office Action mailed May 16, 2016, 15 pgs.

U.S. Appl. No. 14/638,828, Non Final Office Action mailed Jan. 11, 2017, 13 pgs.

U.S. Appl. No. 14/638,828, Non Final Office Action mailed Oct. 26, 2015, 11 pgs.

U.S. Appl. No. 14/638,828, Response filed Feb. 26, 2016 to Non Final Office Action mailed Oct. 26, 2015, 12 pgs.

U.S. Appl. No. 14/638,828, Response Filed Nov. 16, 2016 to Final Office Action mailed May 16, 2016, 12 pgs.

U.S. Appl. No. 17/741,620, filed May 11, 2022, titled Product Delivery System and Method.

U.S. Appl. No. 16/050,923; Application as filed Jul. 31, 2019; 32 pages.

U.S. Appl. No. 16/050,923; Office Action Dated Apr. 10, 2019; 47 Pages.

U.S. Appl. No. 16/383,093; Filed Apr. 12, 2019; 64 pages.

U.S. Appl. No. 16/912,104; Office Action Dated Jun. 16, 2022; 46 pages.

U.S. Appl. No. 63/295,217 dated Dec. 30, 2021; 48 pages.

U.S. Appl. No. 16/050,923; Notice of Allowance mailed Mar. 4, 2020; (pp. 1-10).

U.S. Appl. No. 16/050,923; Office Action mailed Nov. 27, 2019; (pp. 1-27).

U.S. Appl. No. 16/383,093; Corrected Notice of Allowability mailed Mar. 22, 2021; (pp. 1-2).

U.S. Appl. No. 16/383,093; Notice of Allowance mailed Feb. 16, 2021; (pp. 1-20).

U.S. Appl. No. 16/383,093; Office Action mailed Sep. 17, 2020; (pp. 1-13).

U.S. Appl. No. 16/912,104; Non-Final Rejection mailed Jun. 17, 2022; (pp. 1-16).

U.S. Appl. No. 16/912,104; Office Action (Non-Final Rejection) Aug. 12, 2021; (pp. 1-19).

U.S. Appl. No. 17/323,196; Non-Final Rejection Oct. 6, 2021; (pp. 1-13).

U.S. Appl. No. 17/323,196; Non-Final Rejection mailed Apr. 12, 2022; (pp. 1-12).

Wayback Machine capture of https://about.ubereats.com/, capture dated Jun. 3, 2017, 7 pages.

Wayback Machine capture of https://en.wikipedia.org/wiki/Sally_port, capture dated Nov. 11, 2016, 3 pages.

WirelessKey Hardware Deutsch 1.1 Sep. 6, 2011 Wayback Machine, (with Google Machine Translation) 34 pages.

Yale; Smart Delivery Box; Copyright © Yale, Assa Abloy Residential Group; publicly available as early as Apr. 28, 2021; 3 Pages; https://us.yalehome.com/en/yalhome-products/yale-smart-storage1/yale-smart-storage/smart-delivery-box/.

YouTube Video entitled Bluetooth Sorex Wirelss Key, dated Mar. 5, 2009, 5 pages.

YouTube Video entitled Bluetooth SorexLoXX Entrance System, dated Mar. 5, 2009, 9 pages.

YouTube Video entitled Bluetooth-Sorex LoXX dated Feb. 5, 2009, 8 pages.

U.S. Appl. No. 16/912,104; Notice of Allowance and Fees Due (PTOL-85) mailed Oct. 4, 2022; (pp. 1-9).

U.S. Appl. No. 17/323,196; Notice of Allowance Dated Jul. 25, 2022; 39 Pages.

* cited by examiner

246

206

242

240    234

206              212

216

215    210    250

600

602

604

607

612

610 606 608

704          722          720

724          726

728

PRODUCT DELIVERY SYSTEM AND METHOD

CROSS-REFERENCE TO RELATED APPLICATIONS

This application claims the benefit of U.S. Provisional application No. 63/187,815, filed May 12, 2021, and U.S. Provisional application No. 63/188,853, filed May 14, 2021, which are incorporated by reference in their entireties herein.

FIELD

This application relates to delivery of packages to secured areas and, more specifically, to delivery of packages to containers.

BACKGROUND

Retailers often offer a customer the option to order a product and have the product delivered to the customer's home. The customer may have a receptacle, such as a lock box, on their porch to receive the delivery. The receptacle may be refrigerated for receiving a product that requires refrigeration, such as a gallon of milk. Various problems exist with existing product delivery systems. One problem arises when the customer orders one or more products that would exceed the available capacity of the container. A delivery associate may transport an ordered product to the container, only to discover the ordered product is too large for the current capacity of the container. The delivery associate may leave the product outside of the container, which could subject the product to theft or spoilage.

DETAILED DESCRIPTION

In one aspect of the present disclosure, a computing system is provided that includes a memory to store information indicative of a product and communication circuitry configured to receive container information from a container. The container information includes a capacity of the container detected by a sensor of the container. The communication circuitry is configured to receive a request to order the product from the container. The computing system further comprises a processor operably connected to the memory and the communication circuitry. The processor is configured to deny the request to order the product in response a determination of inadequate capacity of the container. The determination of inadequate capacity of the container is based at least in part upon the container information and the information indicative of the product. The processor is further configured to cause the communication circuitry to communicate a signal to a user device indicating denial of the request to order the product due to the determination of inadequate capacity of the container. In this manner, a user is unable to order a product for delivery to the container if the container lacks adequate capacity. Further, denying the request to order the product keeps a delivery associate from transporting the product to the full container and avoids the associated transportation costs and risk of theft or spoilage.

The user may remove or re-arrange items in the container to increase the capacity of the container. In one embodiment, the processor is configured to accept the request to order the product for delivery to the container from the user device in response to a determination of adequate capacity of the container. The determination of adequate capacity of the container is based at least in part upon the updated container information and the information indicative of the product.

For example, the communication circuitry may be configured to receive updated container information subsequent to the processor causing the communication circuitry to communicate the signal to the user device indicating the denial of the request to order the product. In one approach, the container periodically communicates updated container information to the computing system. The updated container information indicates an increase in container capacity if the user has removed or re-arranged items in the container to increase container capacity. In another approach, the user provides a user input to the user device indicating the user has addressed the inadequate container capacity, the user device communicates with the computing system regarding the user addressing the inadequate container capacity, and the computing system requests the updated container information from the container.

Figure 1:
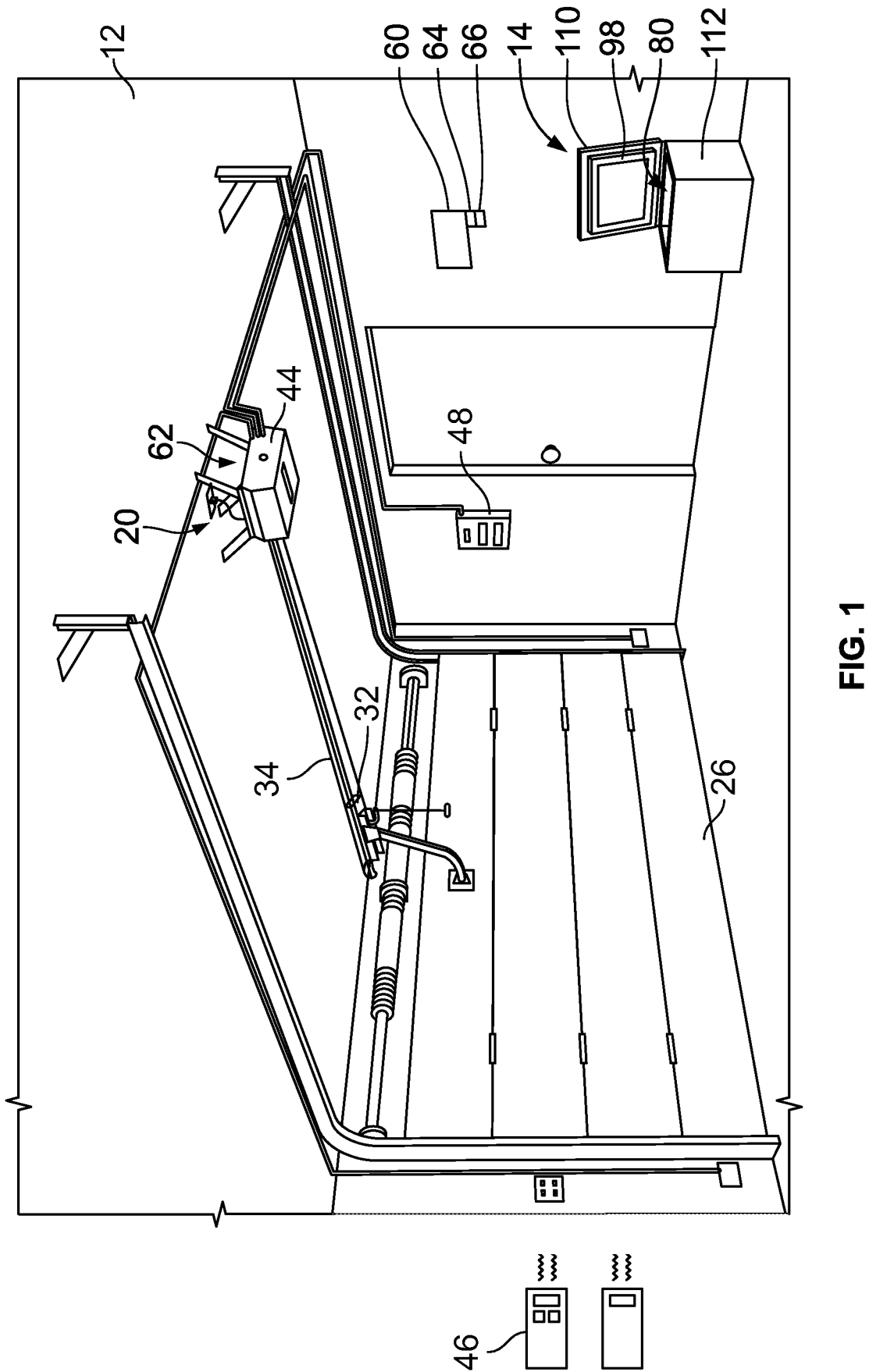
FIG. 1 is a perspective view of an example movable barrier operator and refrigerated container in a garage.
Figure 2A:
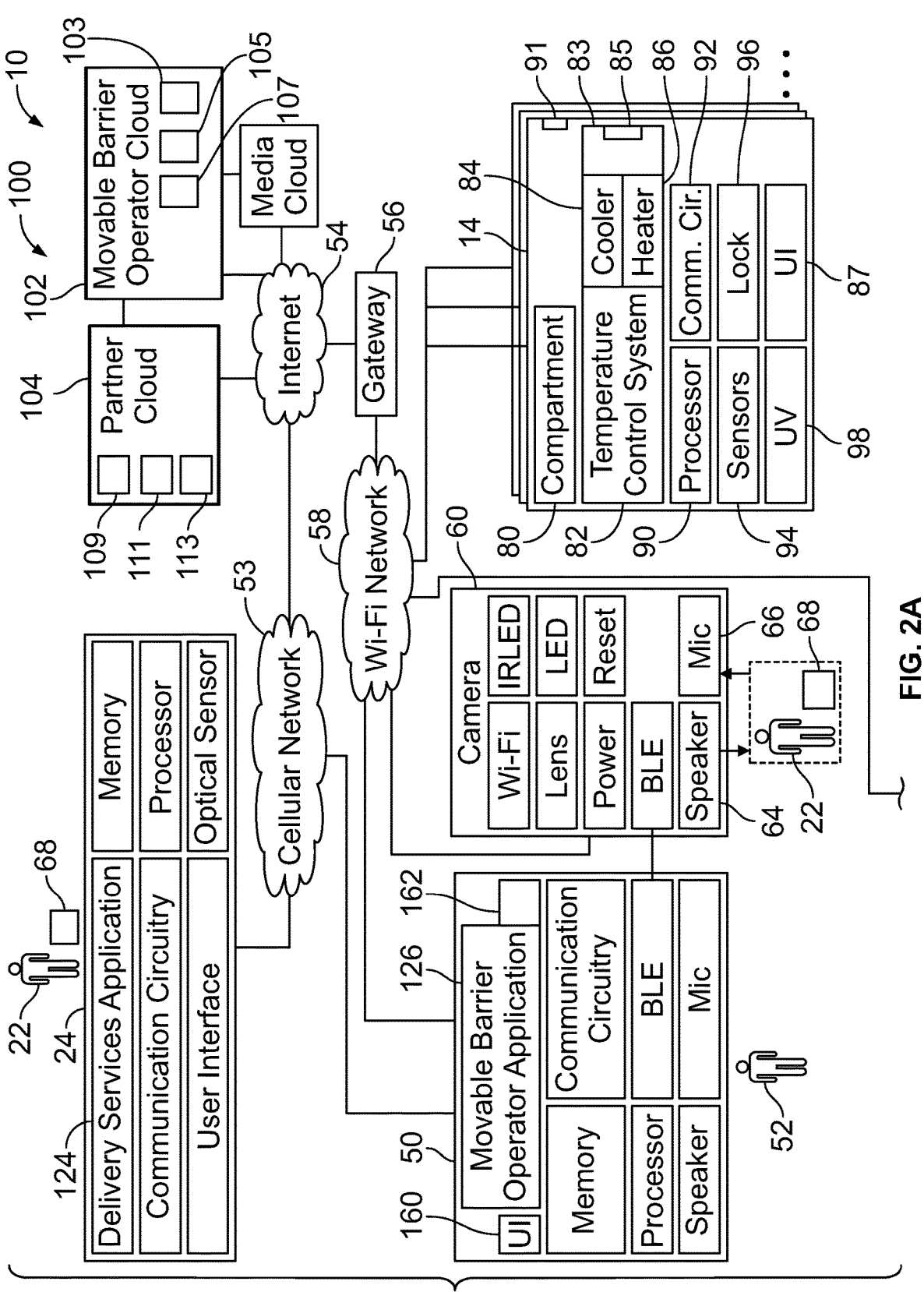
FIGS. 2A and 2B are a block diagram of an example temperature-controlled delivery service system for facilitating delivery of a package to a refrigerated container of a garage.
Figure 2B:
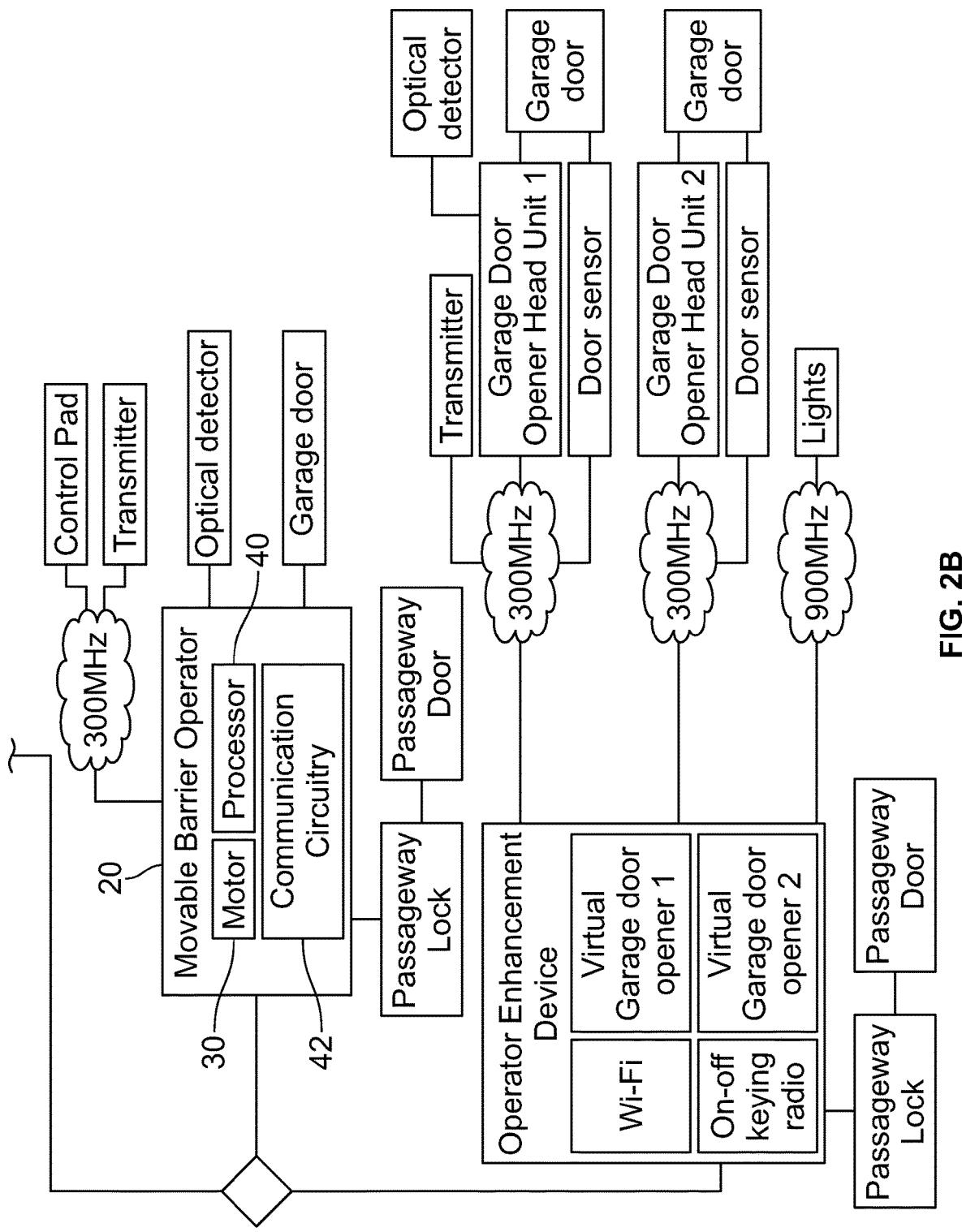

Regarding FIGS. 1, 2A, and 2B, a refrigerated delivery service system 10 is provided that facilitates delivery of packages to a secured area 12, and more specifically, to a temperature-controlled container 14 of the secured area 12. The refrigerated delivery service system 10 has a movable barrier operator 20 that may be operated by a delivery person or associate 22 using a user device 24 of the delivery associate 22 to open a movable barrier, such as a garage door 26 to gain access to the secured area 12. The movable barrier operator 20 has a motor 30 to drive a trolley 32 along a rail 34 and cause corresponding movement of the garage door 26 between open and closed positions. The movable barrier operator 20 has a processor 40, and communication circuitry 42 with an antenna 44. The antenna 44 receives control signals from one or more remote controls 46 such as a handheld transmitter and a wall-mounted remote control 48. The remote controls 46, 48 may send state change commands directly to the movable barrier operator 20 and cause the movable barrier operator 20 to change the state (e.g., closed or open) of the garage door 26.

The movable barrier operator 20 may also be indirectly operated by way of a resident user device 50. The user device 50 may be a smartphone of a resident 52 of the home associated with the secured area 12. The delivery associate device 24 may likewise be a smartphone or other portable electronic device. The user devices 24, 50 may communicate with the movable barrier operator 20 via one or more networks, such as a cellular network 53, the internet 54, a local gateway 56, and a Wi-Fi network 58. Further details of the refrigerated delivery service system 10 may be provided in U.S. Patent App. Pub. No. 2019/0244448, which is hereby incorporated by reference herein in its entirety. The refrigerated delivery service system 10 includes a camera 60 that may be a component of a head unit 62 of the movable barrier operator 20 or a separate component, such as a wall-mounted camera. The camera 60 may include a speaker 64 and a microphone 66 that facilitates communication between the resident 52 and the delivery person 22 as the delivery person 22 delivers a package 68 to the secured area 12.

The refrigerated delivery service system 10 further includes one or more temperature-controlled containers 14 that may be controlled by the resident user device 50 and the delivery associate user device 24, or may be controlled by the originator of the shipment; for example, to match the requirements of the shipment. The temperature-controlled container 14 includes one or more compartments 80 to receive the package 68 and a temperature control system 82 that allows the resident 52, the delivery associate 22, and/or the originator of the shipment to set a temperature for one or more of the compartments 80.

In some embodiments, the temperature-controlled container 14 includes, a freezer, a refrigerator, a heater, or combinations thereof. For example, the temperature control system 82 may include a cooler 84 and a heater 86. In this way, the temperature-controlled container 14 may concurrently maintain thermally-isolated portions or volumes of the interior such as a cooled temperature in a first compartment (e.g., for delivered ice cream) and a heated temperature in a second compartment (e.g., for a delivered pizza). The heater 86 may also be utilized when an outside ambient temperature is below desired refrigerated temperature.

The temperature-controlled container 14 may also include a lock box 83 that may be within the compartment 80 or adjacent to the compartment 80. The lock box 83 may have dimensions smaller than the compartment 80. The lock box 83 includes a lock 85 for securing contents of the lock box 83. The lock 85 may be controllable via wireless communications from either device 24, 50, such as by using Bluetooth communications. In another approach, the lock 85 may connect to the Wi-Fi network 58 and be controlled over the internet 54 by the devices 24, 50 or another device such as the movable barrier operator cloud 102.

In this way, temperature-controlled container 14 may restrict access to certain types of items such as pharmaceuticals or alcoholic beverages delivered to the lock box 83, while permitting access to other goods within the compartment 80. In one example approach, the temperature-controlled container 14 includes an ambient air temperature sensor 91 for determining air temperature within the secured area 12. In another example approach, another device within the secured area such as the wall-mounted remote control 48 of FIG. 1 may communicate ambient air temperature within the secured area 12 to one or both of the temperature-controlled container 14 and a computing system such as a cloud-based computing system 100. In still another example approach, the ambient air within the secured area 12 may be estimated based on an outdoor air temperature at the geographic location of the secured area 12 (e.g., as determined by the cloud-based computing system 100 in communication with a data provider such as a weather service).

The temperature-controlled container 14 includes a processor 90, communication circuitry 92, and one or more sensors 94. The one or more sensors 94 detect conditions or parameters of the temperature-controlled container 14 and the processor 90 facilitates communication of the one or more conditions or parameters via the communication circuitry 92 to the delivery associate user device 24, the resident user device 50, and/or a cloud-based computing system 100 that coordinates package deliveries to the secured area 12. The temperature-controlled container 14 may optionally include a user interface 87, a lock 96 to limit access to the temperature-controlled container 14, and an ultraviolet light treatment system 98 that sanitizes the packages received in the temperature-controlled container 14. In one approach, the ultraviolet light treatment system 98 may be operably coupled to a lid state sensor (e.g., lid state sensor 134 of FIG. 3) such that the ultraviolet light treatment system 98 may be automatically deactivated upon opening of a lid 110 of the temperature-controlled container 14.

The refrigerated delivery service system 10 has one or more remote computers, such as one or more cloud-based computing systems 100 operably connected to the delivery associate user device 24, the resident user device 50, the movable barrier operator 20, the camera 60, and the temperature-controlled container 14. The cloud-based computing systems 100 include a movable barrier operator cloud 102 that receives state change requests from the delivery associate user device 24 and the resident user device 50. If the delivery associate user device 24 and/or the resident user device 50 are associated with authorized accounts, the movable barrier operator cloud computing system 102 may send a state change command to the movable barrier operator 20 to cause the movable barrier operator 20 to operate the change of state of the garage door 26.

The cloud-based computing systems 100 may also include a partner cloud or server 104. As discussed in greater detail below, the partner server 104 may be a server associated with a retailer for coordinating deliveries of goods purchased from the retailer by a user. In some embodiments, the partner server 104 may communicate delivery notifications to the movable barrier operator cloud computing system 102 and/or to a user device 24, 50. For example, the partner server 104 may communicate conditions that prevent delivery of purchased goods. Such conditions may include, for example, an incorrect or insufficient temperature detected at the temperature-controlled container 14 (e.g., the temperature is too warm or too cold for a given purchased product, as determined by the partner server 104), an insufficient or inadequate capacity of the container detected at the temperature-controlled container 14 compared to information indicative of a product or delivery (e.g., a volume of the product(s) in the delivery), an insufficient communication with the temperature-controlled container 14 (e.g., the temperature-controlled container 14 is offline), a power state of the temperature-controlled container 14 (e.g., the temperature-controlled container 14 is unpowered), or an operational state of the temperature-controlled container 14 (e.g., a detected failure at the temperature-controlled container 14).

Upon determining a condition unsuitable for delivery of the purchased goods at the temperature-controlled container 14, the partner server 104 may communicate delivery options to one or both of the movable barrier operator cloud computing system 102 and a user device 24. For example, the partner server 104 may suggest an alternative delivery method or another or alternative delivery location (e.g., within the secured area 12 but not within the temperature-controlled container 14, or a location outside of the secured area 12 such as a front porch). Alternatively, the partner server 104 may indicate that delivery of the purchased goods is not available. The partner server 104 may make such delivery determinations based at least in part on the types of goods purchased, the operational state of the temperature-controlled container 14, or the capacity of the temperature-controlled container 14. The moveable barrier operator cloud 102 and the partner cloud 104 may include a processor 103 and a processor 109, a memory 105 and a memory 111, and communication circuitry 107 and communication circuitry 113.

Regarding FIG. 1, the temperature-controlled container 14 has a movable closure such as a lid 110 that is movable between open and closed positions relative to a body 112. In one embodiment, the lid 110 is connected via one or more hinges to the body 112. The temperature-controlled container 14 has the ultraviolet light treatment system 98 built into an underside of the lid 110 in some embodiments.

Figure 3:
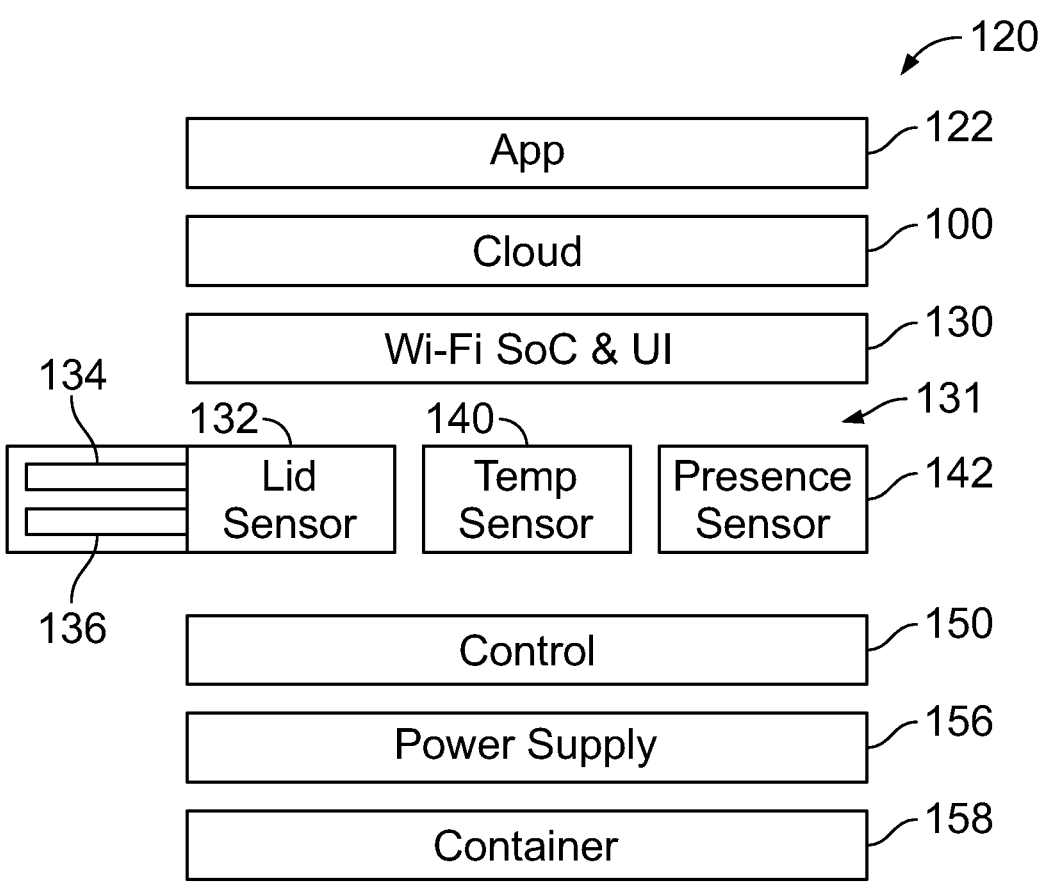
FIG. 3 is a schematic representation of portions of the refrigerated delivery service system of FIGS. 2A and 2B.

Regarding FIG. 3, the refrigerated delivery service system 10 may be logically organized into a system stack 120 that communicates with an app 122 for communicating with a delivery services application 124 (FIG. 2A) instantiated on the delivery associate user device 24 and a movable barrier operator application 126 instantiated on the user device 50. The system stack 120 further include communication with the cloud-based computing systems 100 that facilitate control of the movable barrier operator 20 as well as authenticating commands from the delivery associate user device 24.

The system stack 120 further includes a control and communication layer 130 of the temperature-controlled container 14. The control and communication layer 130 includes the communication circuitry 92, such as a Wi-Fi transceiver, a system on a chip (SoC) that includes the processor 90, and the user interface 87.

The system stack 120 further includes a sensor layer 131 that includes one or more sensors 94. In one embodiment, the one or more sensors 94 include a lid sensor 132 that includes one or more sensors, such as a lid state sensor 134 and a movement sensor 136. The lid state sensor 134 detects the state of the lid 110, such as whether the lid 110 is open or closed, and the movement sensor 136 determines whether the lid 110 is moving or has moved. In one embodiment, the lid state sensor 134 includes a reed switch and a magnet operably coupled to the body 112 and the lid 110, and the movement sensor 136 includes an accelerometer. The sensor layer 131 also includes a temperature sensor 140 and a presence sensor 142 of the one or more sensors 94. The temperature sensor 140 detects the temperature in a compartment 80 and the presence sensor 142 detects the presence of one or more items or objects (e.g., packages) in the compartment 80.

The system stack 120 further includes a control layer 150 such as the processor 90 that coordinates operation of the temperature-controlled container 14, a power supply level 156 that facilitates regulation of power to the temperature-controlled container 14, and a container level 158 that includes the body 112 and the lid 110.

Figure 4:
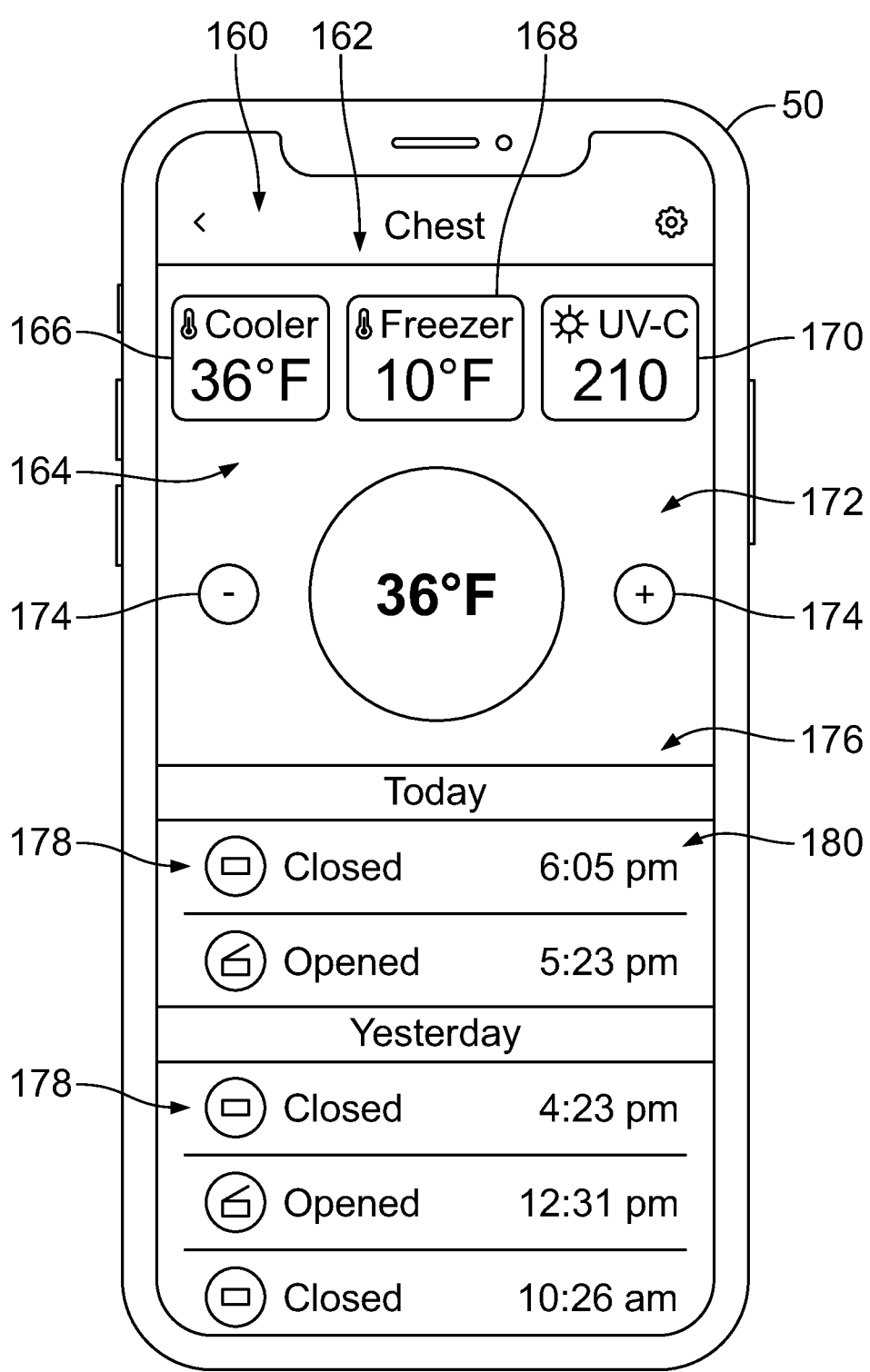
FIG. 4 is a screenshot of an example application used by a homeowner in the refrigerated delivery service system of FIGS. 2A and 2B.

Regarding FIG. 4, the resident device 50 is shown running the movable barrier operator application 126. The resident device 50 includes a user interface 160, such as a touchscreen. The movable barrier operator application 126 includes a temperature-controlled container menu 162 that provides operating parameters 164 of the temperature-controlled container 14. The parameters 164 include a temperature 166 of a cooler compartment of the temperature-controlled container 14, a temperature 168 of a freezer compartment of the temperature-controlled container 14, and an ultraviolet setting 170 of the ultraviolet light treatment system 98. The movable barrier operator application 126 has a temperature adjustment interface 172 that permits a user to adjust the temperature 166, 168 of the different compartments 80 of the temperature-controlled container 14 using buttons 174. The menu 162 further includes a history 176 such as the change in states 178 of the lid 110 and the time and day 180 that such changes occur. In this manner, the user can tell when the delivery associate 22 opened the lid 110 to position the package 68 in the compartment 80 and then whether the associate closed the lid 110.

The package 68 may be perishable items such as groceries, medicine, alcohol, prepared food from a restaurant, or other products that the user may want to have to be refrigerated or heated according to the contents of the package 68.

Figure 5:
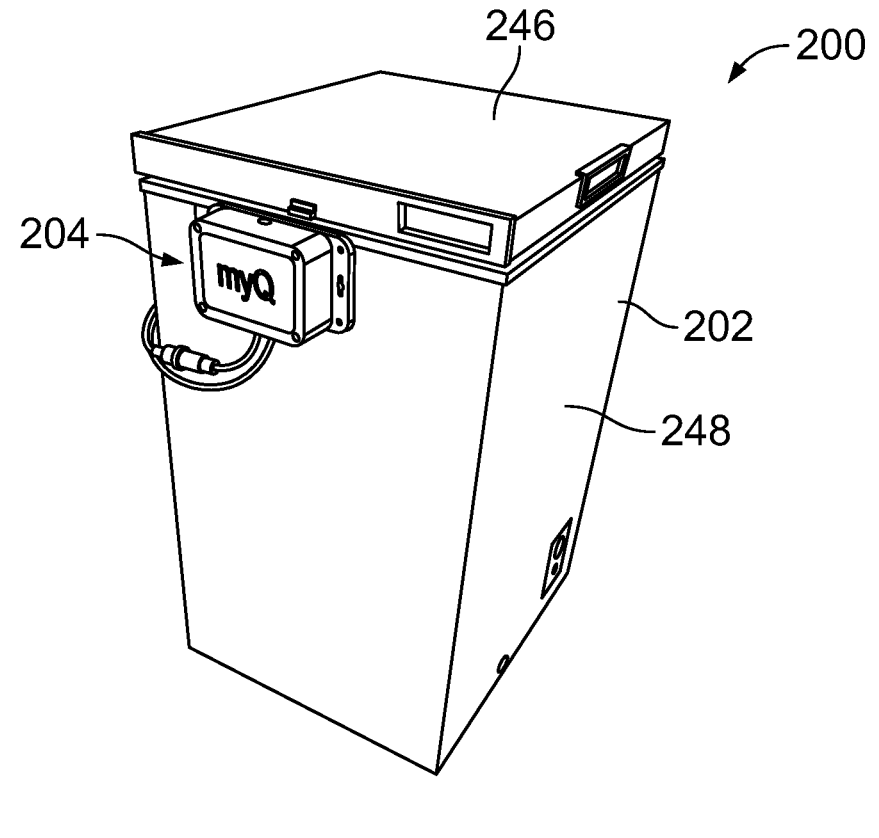
FIG. 5 is a perspective view of an example refrigerated container having a refrigerated container enhancement system.
Figure 6:
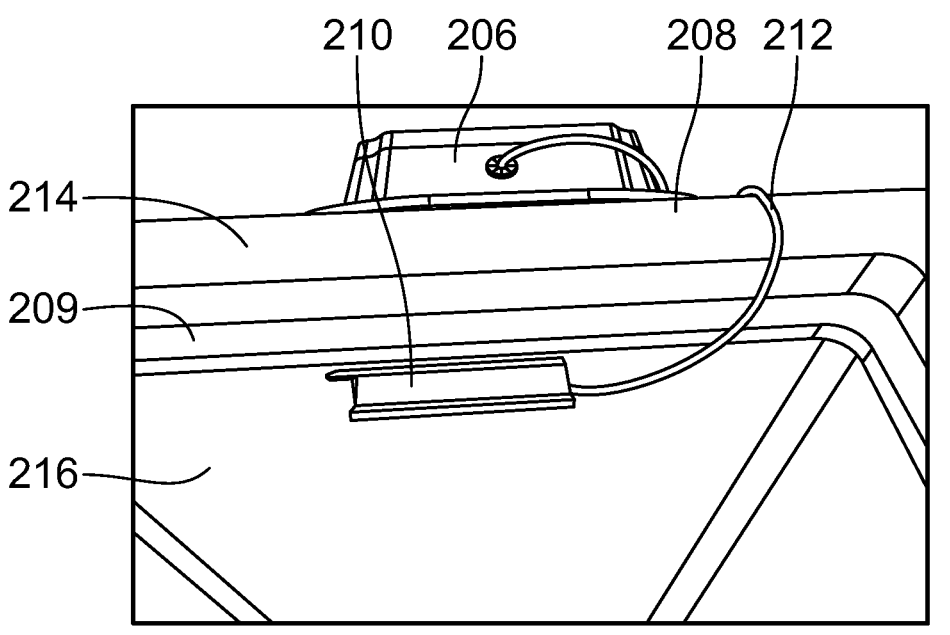
FIG. 6 is a perspective view of the refrigerated container of FIG. 5 with the lid opened to show a sensor assembly and a compartment of the refrigerated container.

Regarding FIGS. 5 and 6, another temperature-controlled container 200 is provided that is similar in many respects to the temperature-controlled container 14 discussed above such that differences will be highlighted. The temperature-controlled container 200 includes a freezer 202 and a refrigerated container enhancement system 204 that has been retrofitted onto the freezer 202 to provide communication connectivity and other features and functionality to the freezer 202. The refrigerated container enhancement system 204 includes a body 206 that is mounted to an exterior of a wall 208 of the freezer 202 and a sensor assembly 210 that mounts to an interior of one of the walls 208, such as an underside of the lip 209 of the wall 208. The refrigerated container enhancement system 204 has a wired connection such as a cable 212 connecting the body 206 and the sensor assembly 210 that traverses a seal area 214 of the freezer 202. Other embodiments may be configured with a wireless connection between the sensor assembly 210 and the body 206 of the refrigerated container enhancement system 204. Still further the wired connection such as cable 212 may be configured otherwise such as through the wall 208. Regardless, in this manner, the sensor assembly 210 is positioned to detect a package 68 once the package 68 has been delivered to a compartment 216 of the freezer 202.

The refrigerated container enhancement system 204 controls operation of the temperature-controlled container 200. In this way, the refrigerated container enhancement system 204 may cause a compressor of a refrigerator or freezer or heating elements of a heater to increase or decrease the temperature within the compartment 216. In one embodiment, the refrigerated container enhancement system 204 includes a control system for maintaining proper operation of the temperature-controlled container 14. For example, the control system may operate a compressor for a set period of time (e.g., five minutes) after receiving an instruction to operate the temperature-controlled container 14 in an "OFF" state.

Figure 7:
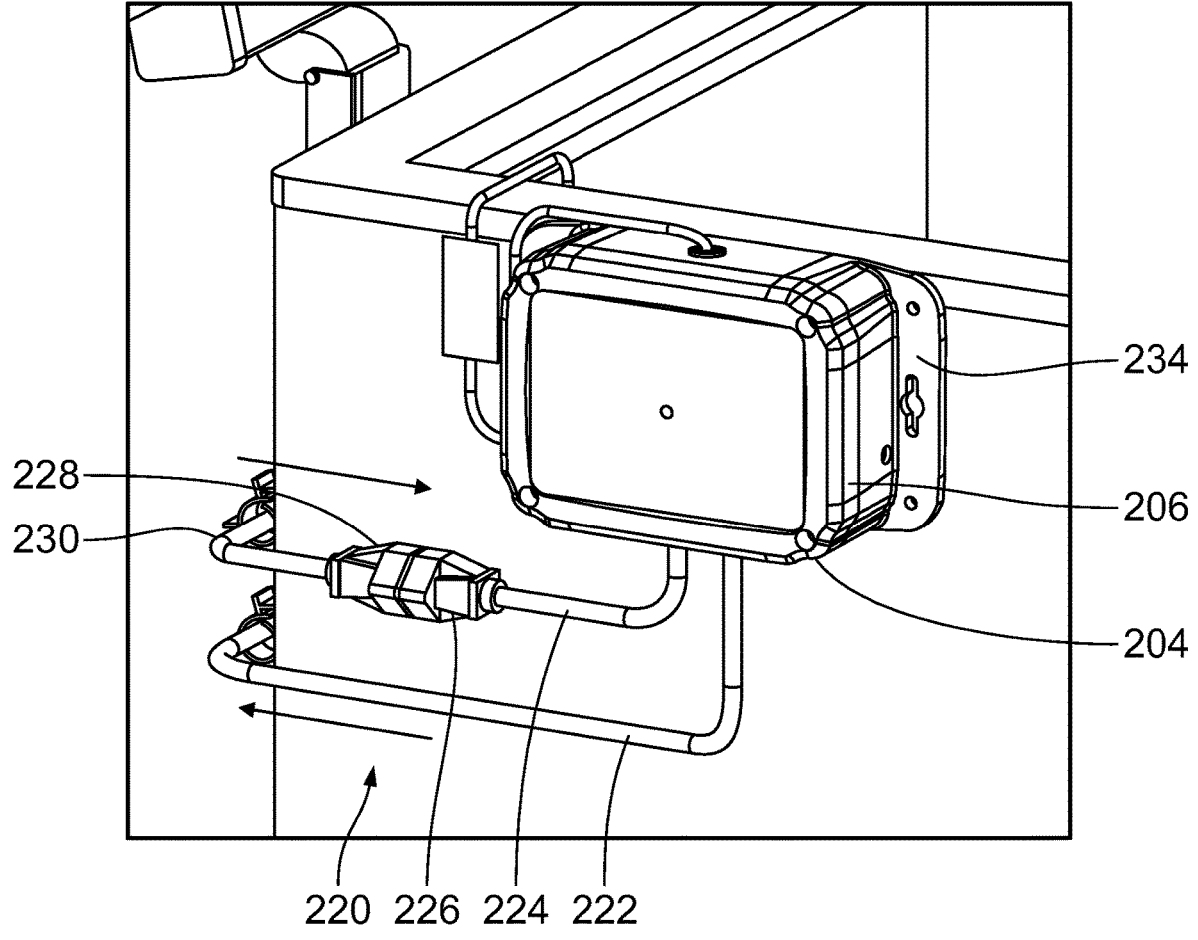
FIG. 7 is a perspective view of the refrigerated container of FIG. 5 showing the refrigerated container enhancement system having a power cord that receives a plug of the refrigerated container and a power cord for connecting to an electrical outlet.

Regarding FIG. 7, the refrigerated container enhancement system 204 includes a power supply interface 220 that receives power from an electrical outlet and that provides electrical power to the freezer 202. In one embodiment, the electrical power interface 220 includes a power cord 222 having a plug that connects to an electrical outlet and receives electrical power from the outlet. The refrigerated container enhancement system 204 further includes a power input 224. In one approach, the power input 224 is a power cord that includes a female plug 226 that connects to a male plug 228 of a power cord 230 of the freezer 202. In another approach, the power input 224 is configured as a power outlet that is integral with the body 206 of the refrigerated container enhancement system 204 for interfacing the male plug 228 of a power cord 230.

With the refrigerated container enhancement system 204 interposed between the electrical source (e.g., 120 volt AC wall outlet) and the power system (e.g., cord 230 and plug 228) of the container, the refrigerated container enhancement system 204 may regulate power for controlling temperature and other operational parameters of the container. Regarding FIG. 11, the refrigerated container enhancement system 204 includes an AC/DC power supply 230 on a circuit board 232 that facilitates delivery of power to various components of the refrigerated container enhancement system 204.

Figure 8:
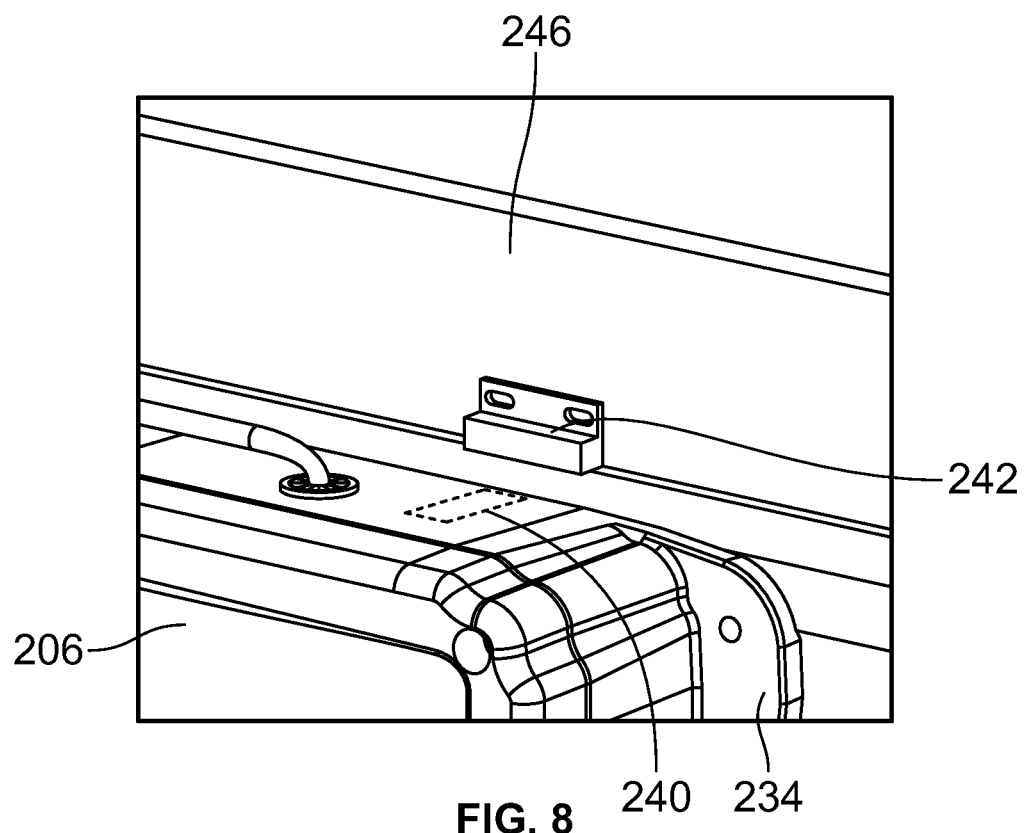
FIG. 8 is a perspective view of a portion of the refrigerated container enhancement system of FIG. 5 showing a magnet mounted to the lid of the container and a reed switch of the refrigerated container enhancement system.

Regarding FIGS. 7 and 8, the refrigerated container enhancement system 204 has a flange 234 that receives a fastener or other attachment approach to secure the body 206 to the freezer 202. The body 206 has a reed switch 240 or Hall Effect sensor therein that detects a presence of a magnet 242 or a ferrous/metallic portion of a lid 246 of the freezer 202. As the lid 246 pivots open relative to a body 248 of the freezer 202 about a hinge, the reed switch 240 detects the magnet 242 moving away from the reed switch 240. In this manner, the refrigerated container enhancement system 204 may detect whether the lid 246 is open or closed.

Figure 9:
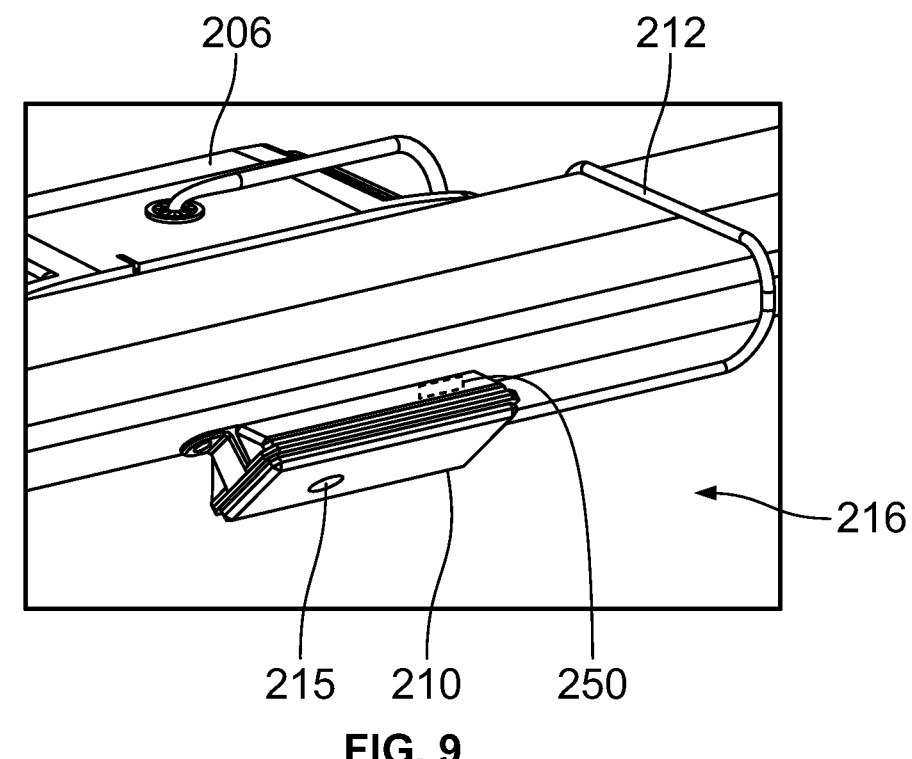
FIG. 9 is a perspective view of the sensor assembly of the refrigerated container enhancement system of FIG. 5 mounted to position a presence sensor to face an interior of the compartment.

Regarding FIG. 9, the sensor assembly 210 is positioned in or partially within the compartment 216 so that a temperature sensor 250 of the sensor assembly 210 may detect the temperature in the compartment 216. The sensor assembly 210 further includes a presence sensor, such as a time-of-flight sensor 215. The time-of-flight sensor 215 may be an optical time-of-flight sensor, an ultrasonic time-of-flight sensor, or other suitable time-of-flight sensor.

Figure 10:
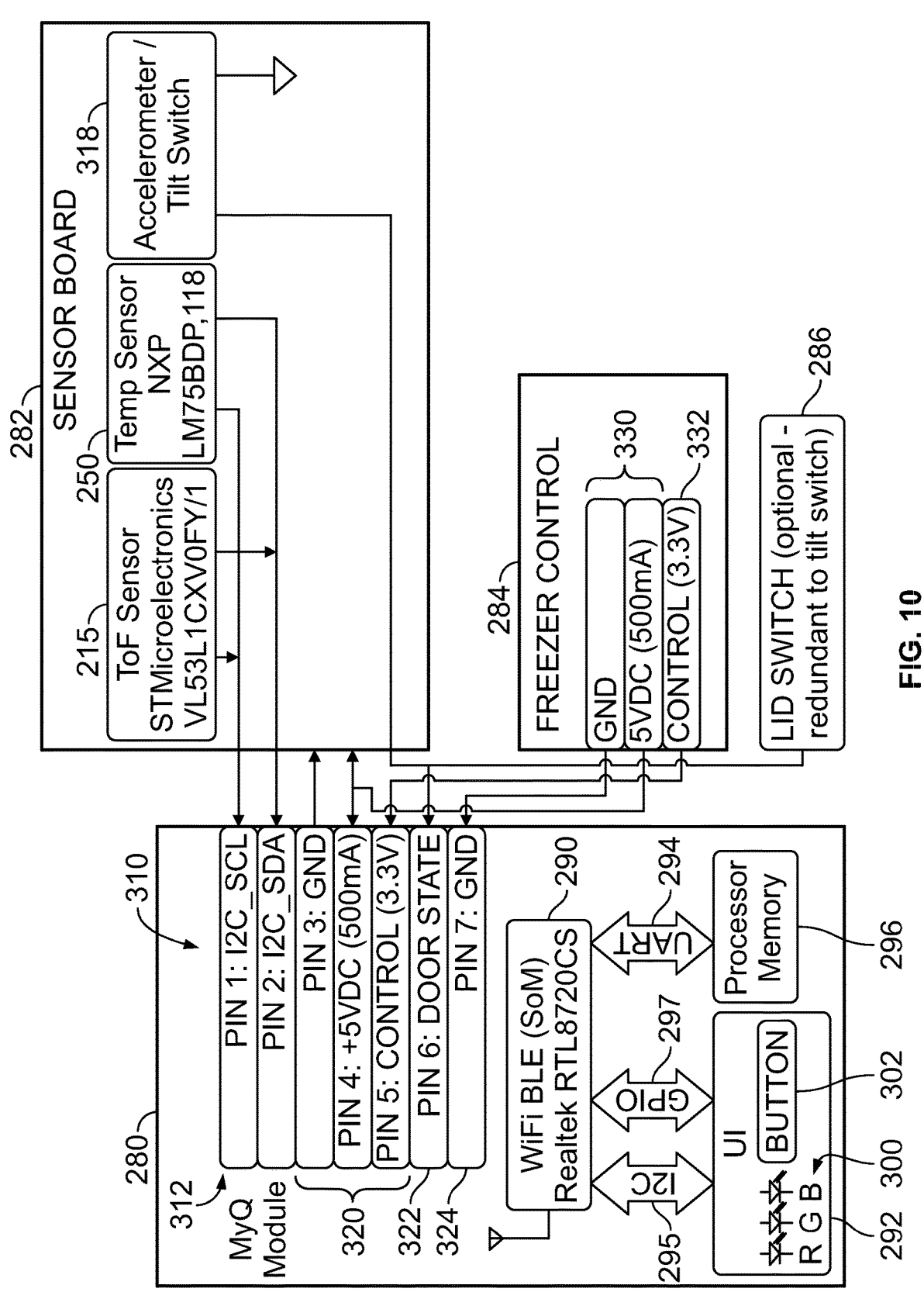
FIG. 10 is an example schematic representation of the refrigerated container enhancement system of FIG. 5.

Regarding FIG. 10, an example schematic representation of the refrigerated container enhancement system 204 is provided including a control module 280, a sensor module 282, a freezer control module 284, and a lid switch 286. A control module 280 includes communication circuitry 290, such as a combination Wi-Fi and Bluetooth (e.g., Bluetooth low energy 'BLE') transceiver chip, a user interface 292, a universal asynchronous receiver transmitter 294, and a processor and memory 296 that includes non-transitory computer readable medium having instructions stored thereon that facilitate operation of the refrigerated container enhancement system 204. The control module 280 further includes an inter-integrated circuit (I2C) 295 and a general-purpose input/output (GPIO) 297 circuit that interface the communication circuitry 290 and the user interface 292. The user interface 292 may have one or more indicators or indicia such as LEDs 300 and one or more user-actuatable switches or buttons 302 to, for example, reset a Wi-Fi connection or control power to the freezer 202. A control module 280 further includes an input-output module 310 with connections 312 to a time-of-flight sensor 215, a temperature sensor 250, and an accelerometer 318 of the sensor module 282. The input-output module 310 further includes a power supply portion such as a power pin, a ground pin, and control lines 320. The input-output module 310 further includes a lid state connection 322 and a ground 324 for the freezer control module 284. The freezer control module 284 includes power supply connections 330 and a control connection 332.

Figure 11:
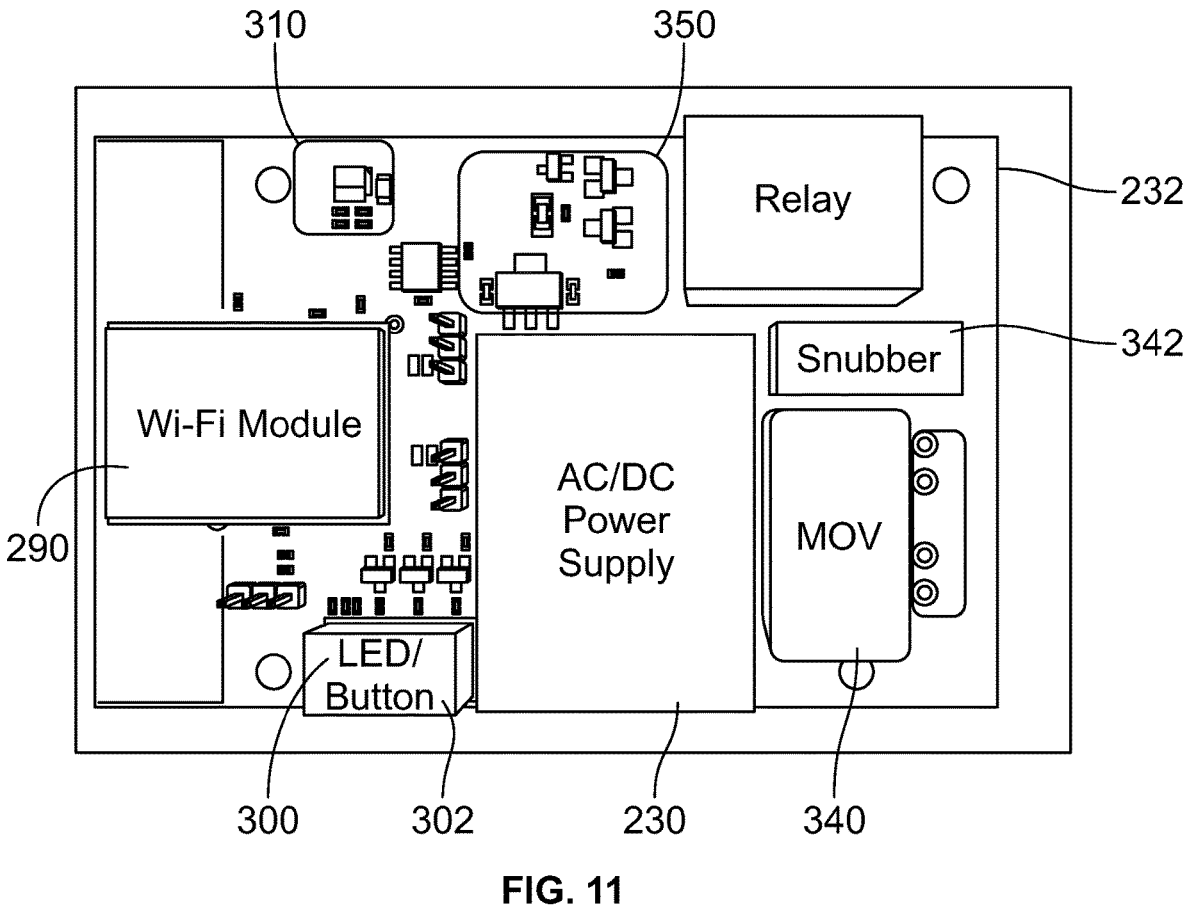
FIG. 11 is an example circuit board layout of the refrigerated container enhancement system of FIG. 5.

Regarding FIG. 11, in one embodiment, the components of the refrigerated container enhancement system 204 are provided on the circuit board 232. For example, the circuit board 232 may include the communication circuitry 290, the LEDs 300, the one or more buttons 302, the AC/DC power supply 230, a metal oxide varistor (MOV) 340, a snubber 342, the input-output module 310, and relay logic 350. The relay logic 350 may control operation of the temperature-controlled container 200 based upon different factors and conditions of the container 200.

Figure 12:
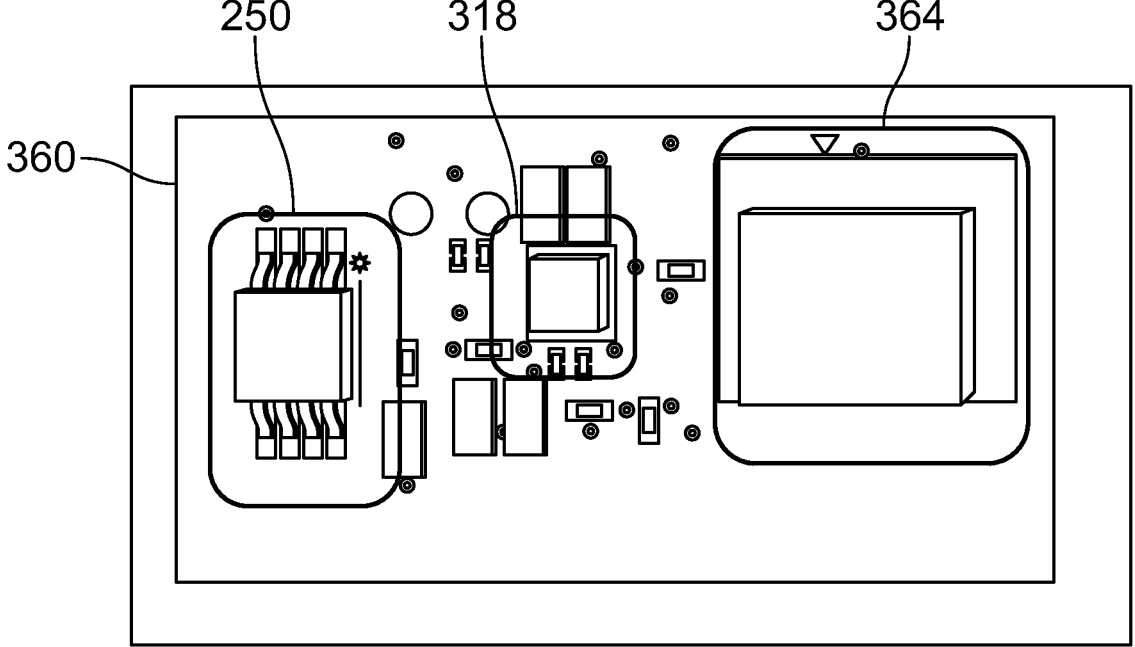
FIG. 12 is an example circuit board layout of the sensor assembly of FIG. 6.

With reference to FIG. 12, the sensor assembly 210 may include a circuit board 360 including the temperature sensor 250, an accelerometer 318, and an input-output module 364 configured to communicate data from the sensors 250, 318 with the control module 280 via the cable 212. As an alternative (or in addition to) to the previously-described magnet and reed switch, the accelerometer 318 or a gyroscope or a tilt sensor may be used for detection of the lid state (e.g., open, closed, opening, closing) based on sensing of the position (e.g., horizontal or angularly tilted) of the lid relative to gravity.

Figure 13:
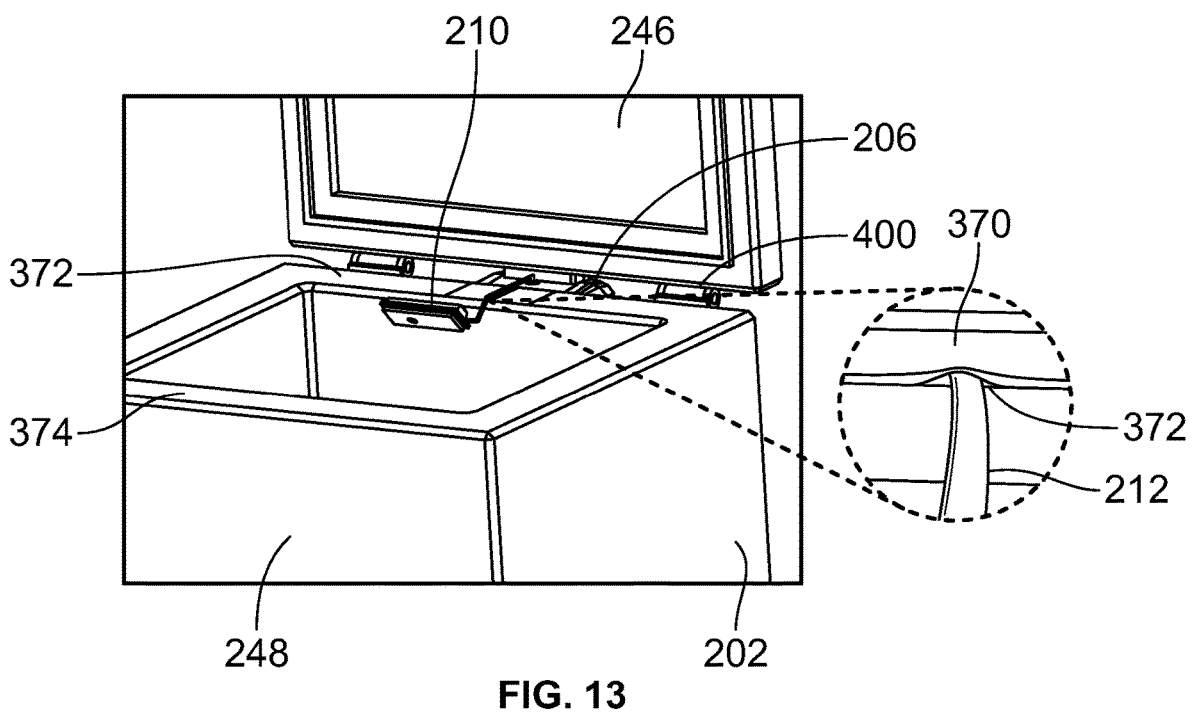
FIG. 13 is a perspective view of the refrigerated container enhancement system of FIG. 5 showing an example cable connecting the sensor module through a seal of the lid.

Regarding FIG. 13, the refrigerated container enhancement system 204 may be mounted in different positions about the freezer 202. In one embodiment, the body 206 is mounted between hinges 400 connecting the lid 246 to the body 248. As shown in FIG. 13, the cable 212 is sandwiched between a seal 370 of the lid 246 and a sealing area, such as a surface 372 of a rim 374 of the body 248.

Figure 14:
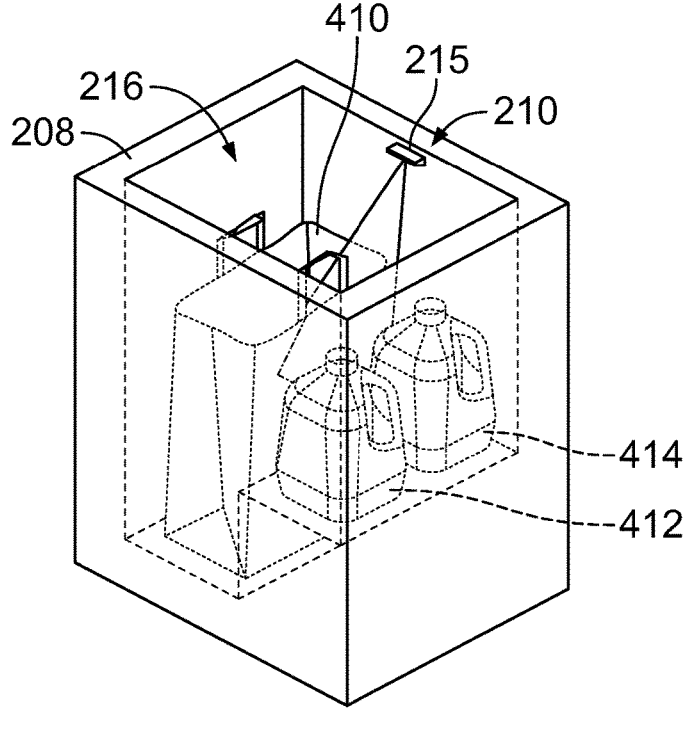
FIG. 14 is a perspective view of the refrigerated container enhancement system of FIG. 5 showing the presence sensor detecting the presence of a bag and two gallon bottles in the compartment.

Regarding FIG. 14, the packages have been positioned by the delivery associate 22 into the compartment 216. The packages include a bag 410 and two jugs 412, 414. The presence sensor 215 of the sensor assembly 210 detects the presence of the bag 410 and jugs 412, 414. For example, the presence sensor 215 may directly measure distance to an object based on the time for emitted photons to be reflected. The presence sensor 215 may comprise a three-dimensional scanner, such as one or more laser imaging devices, a scale, or another device configured to provide container information. The container information may include a capacity measurement, such as a capacity of the container. The sensor assembly 210 may convert measured information, such as the distance measured by the presence sensor 215 in the embodiments utilizing imaging devices, to a capacity measurement. The capacity measurement may include a capacity of the compartment 216 to enable a determination of an inadequate capacity of the container, discussed in more detail below. For example, a measured distance greater than 40 cm may indicate the compartment 216 is empty, a measured distance between 20 cm and 40 cm may indicate the compartment 216 is partially full, and a measured distance less than 20 cm may indicate the compartment 216 is full. When the interior volume is determined by the processor 296 to be full based on the measurement taken by the presence sensor 215, a user or delivery recipient may be notified or alerted to empty or rearrange goods within the container. Additionally or alternatively, the enhancement system may communicate the interior volume status to a remote computer such as a server or middleware such that an e-commerce retailer or delivery partner may take action regarding a planned or scheduled delivery of items to the container. Such action may include cancellation, delaying, or re-routing the delivery to an alternate location until volume within the container is made available. The sensor may include a single sensor capable of a single measurement or may include an array of sensors capable of discerning multiple measurements.

Figure 15:
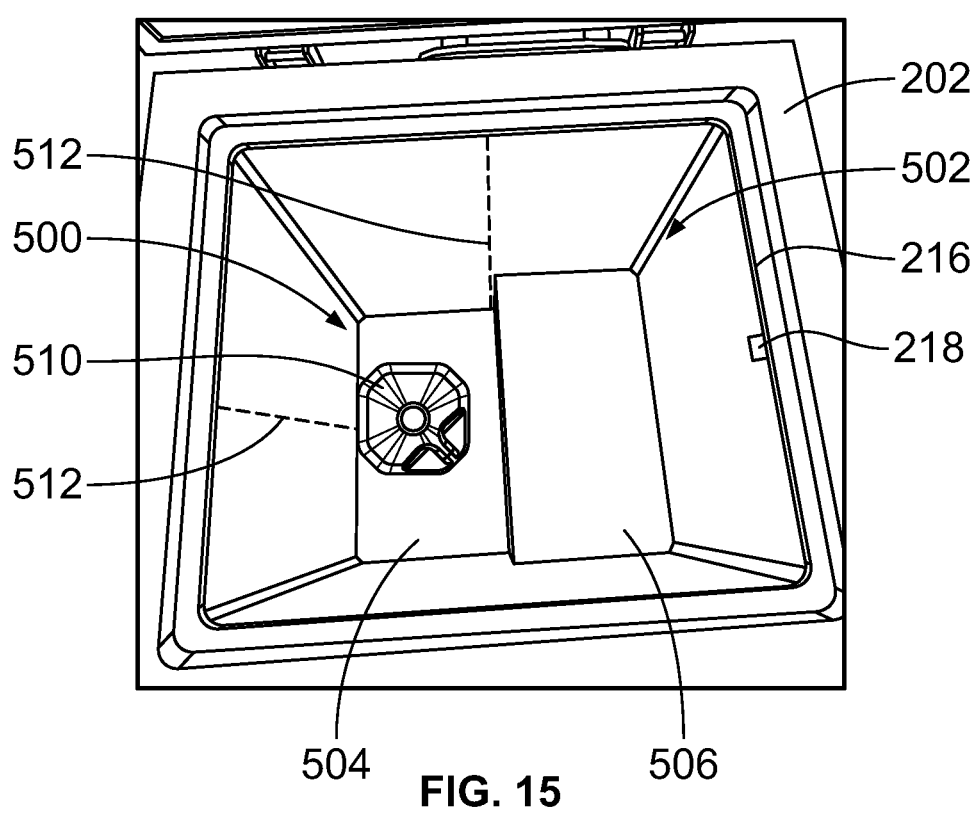
FIG. 15 is a view of an example interior of a refrigerated container similar to FIG. 5 showing a view of a camera that may be used in the sensor assembly.

Regarding FIG. 15, the compartment 216 includes a deeper portion 500 and a shallower portion 502. The deeper portion 500 includes a floor 504 and a shallower portion 502 includes a step 506. In one embodiment, the step 506 provides an area under the step 506 for refrigeration components of the freezer 202, such as a compressor. In FIG. 15, a jug 510 is positioned on the floor 504.

A camera 218 is provided in addition or as an alternative to the time-of-flight sensor to determine the occupancy or volume of the container. Camera 218 is configured to take a picture of the inside of the freezer. An edge detection routine may be used to determine if the compartment 216 is empty by comparing a real time edge detection against a pre-learned edge geometry of an empty compartment 216. This may be done by recording and storing the vertices and edges of the compartment 216 and comparing real time status against the learned empty state. As contents obscure the bottom of the compartment 216, the routine can detect a capacity of the compartment 216. In some embodiments a three-dimensional scanner (e.g., laser imaging device) may be employed to determine an instantaneous measurement of the compartment's absolute volume, such that the measured volume may be compared with a known/predetermined volume of the compartment when empty.

In another example, a graduated indicator 512 running along the vertical of the compartment 216, combined with a routine that reads the level, may be used to indicate the level of contents within the compartment 216.

Figure 16:
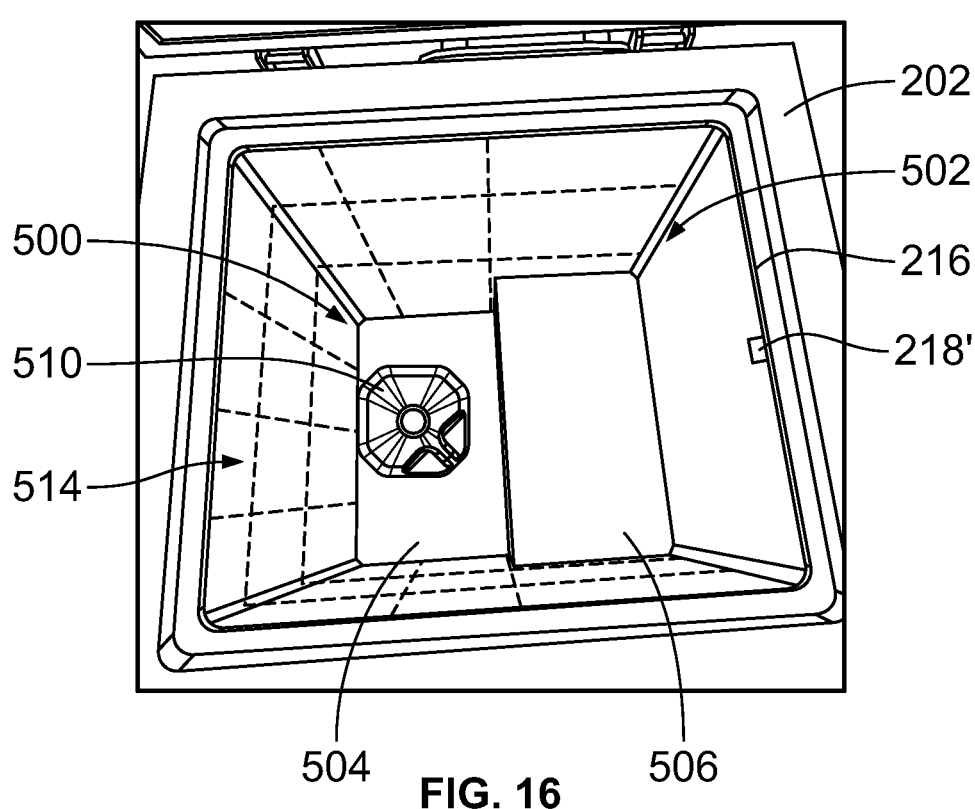
FIG. 16 is a view of an interior of the refrigerated container showing another camera view.

Regarding FIG. 16, the jug 510 is positioned on the floor 504. The camera 218' may be a three-dimensional imaging that may include, for example, stereo vision, projected grid mapping 514, and or a time-of-flight camera that may analyze the level of contents within the compartment 216.

Figure 17:
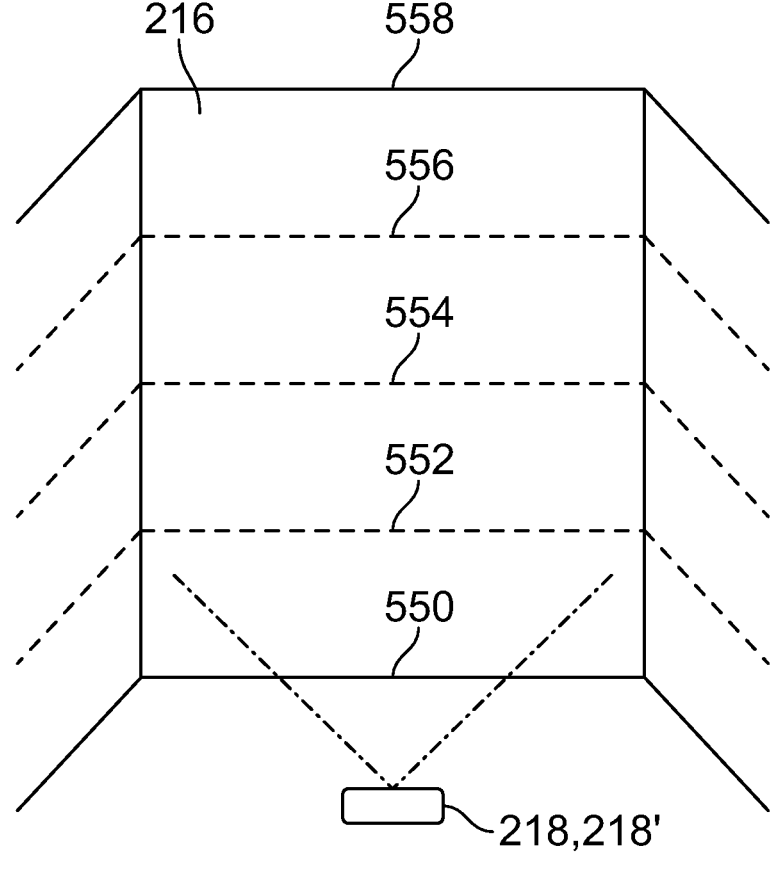
FIG. 17 is an example schematic view of the camera for detecting the capacity within the refrigerated container.

For example, referring to FIG. 17, the cameras 218, 218' may determine that the compartment 216 is empty at a height/level 550 that is substantially similar to floor 504, approximately 25% full at a height/level 552, approximately 50% full at a height/level 554, approximately 75% full at a height/level 556, or completely full at a height/level 558 that is substantially similar to the rim 374 (FIG. 13).

Figure 18:
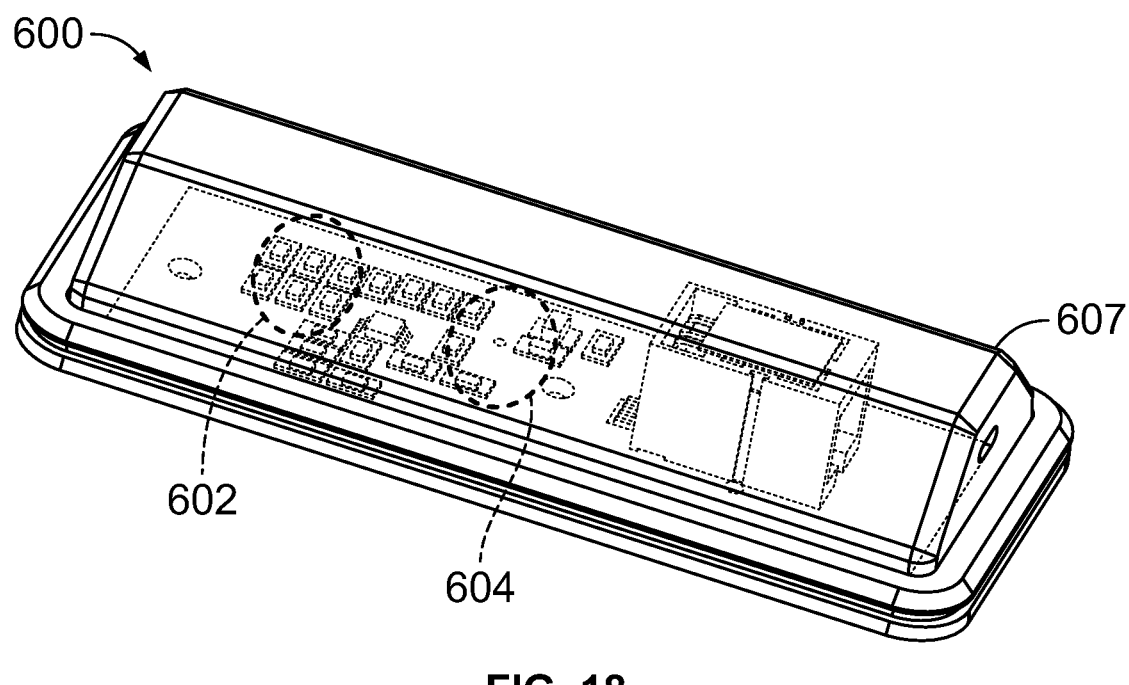
FIGS. 18 and 19 are perspective views of another embodiment of a sensor assembly.
Figure 19:
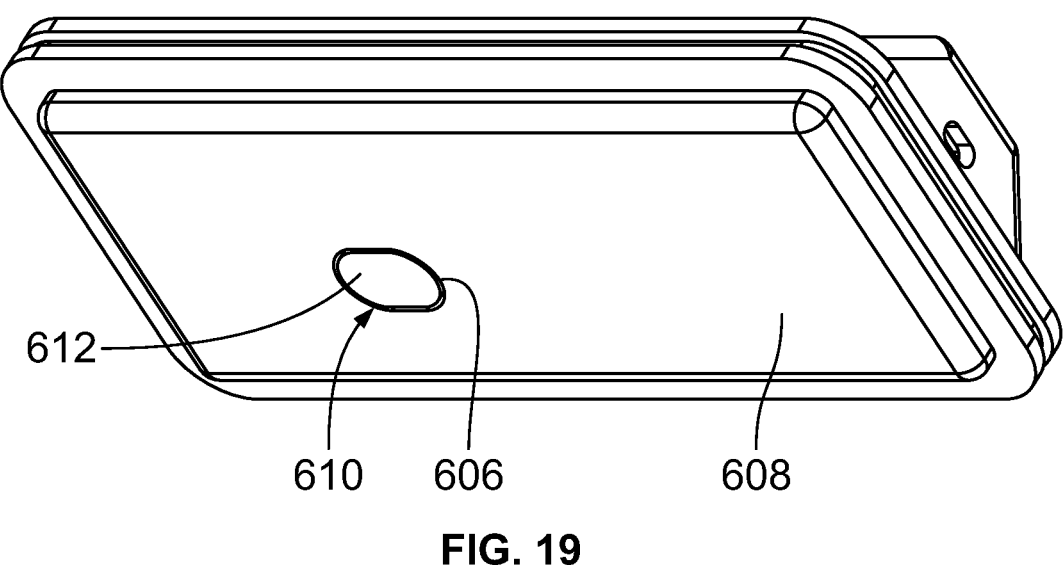

Regarding FIGS. 18 and 19, another sensor assembly 600 is shown that is similar in many respects to the sensor assembly 210 discussed above. The sensor assembly 600 includes a temperature sensor 602, an accelerometer 604, and a presence sensor 606. The sensor assembly 600 may also include a memory, a processor, and communication circuitry. The sensor assembly 600 includes a housing 607 containing the temperature sensor 602 and the accelerometer 604. The housing 607 includes a lower wall 608 and an opening 610 that exposes a sensing portion 612 of the presence sensor 606. The presence sensor 606 is similar in many respects to the presence sensor 215 discussed above.

Figures 20, 21:
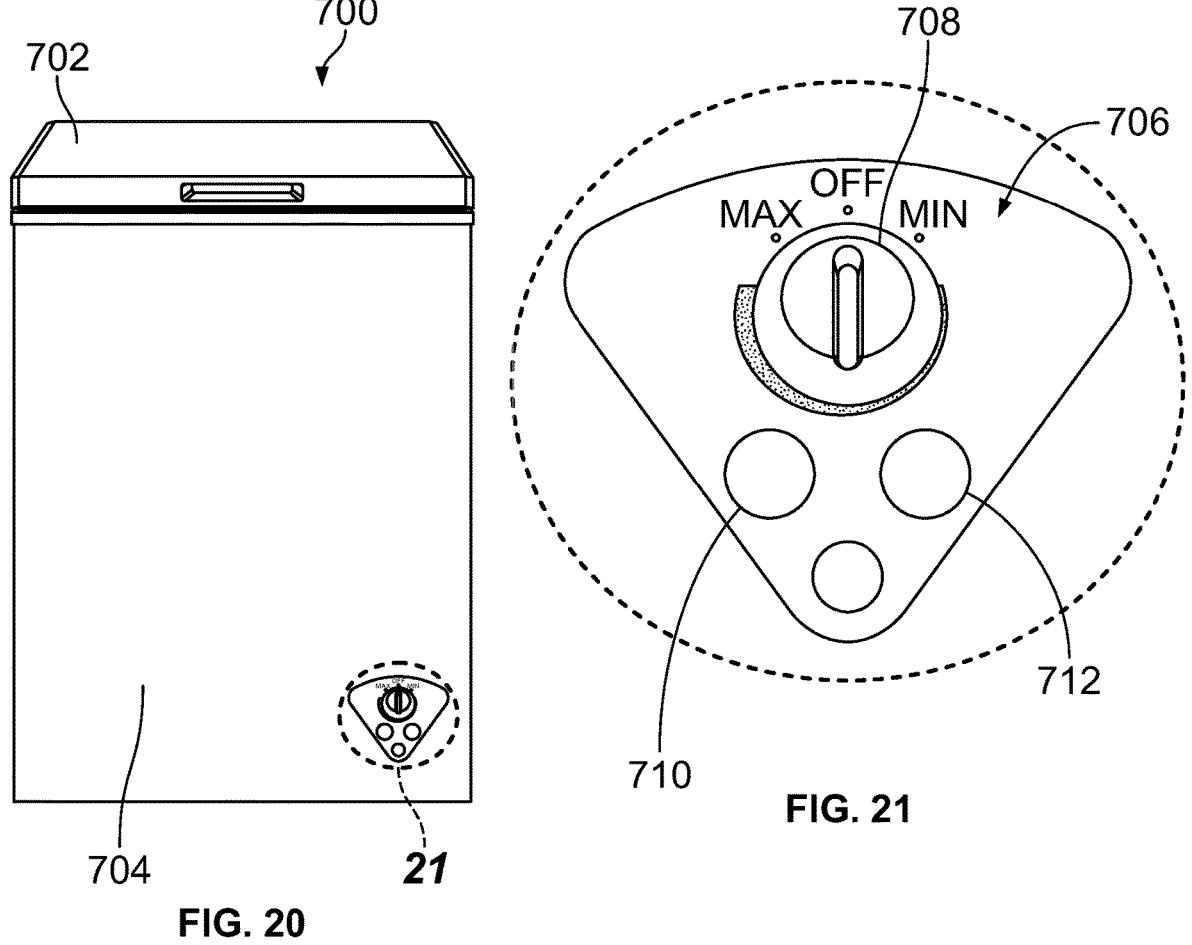
FIG. 20 is a perspective view of an example refrigerated container.
FIG. 21 is an enlarged view of a portion of the refrigerated container of FIG. 20 showing a user interface of the refrigerated container.

Regarding FIGS. 20 and 21, a temperature-controlled container 700 is provided that is similar in many respects to the temperature-controlled container 14 discussed above. The temperature-controlled container 700 includes a lid 702, a body 704, and a user interface 706. The user interface 706 has a temperature control input 708, such as a knob, in a compartment of the temperature-controlled container 700. The user interface 706 further includes an indicator such as an LED 710 that may blink, be solid, and/or have different colors to indicate different conditions of the temperature-controlled container 700. The user interface 706 further includes a wireless network setup button 712 that may be operated to initiate a setup procedure for connecting the temperature-controlled container 700 to a wireless network. For example, a user may press the wireless network setup button 712 and connect to the temperature-controlled container 700 using a smartphone via a Bluetooth connection. The user may then provide credentials for a Wi-Fi network to the temperature-controlled container 700 using the user's smartphone. The temperature-controlled container 700 may then connect to the Wi-Fi network using the credentials received from the user.

Figure 22:
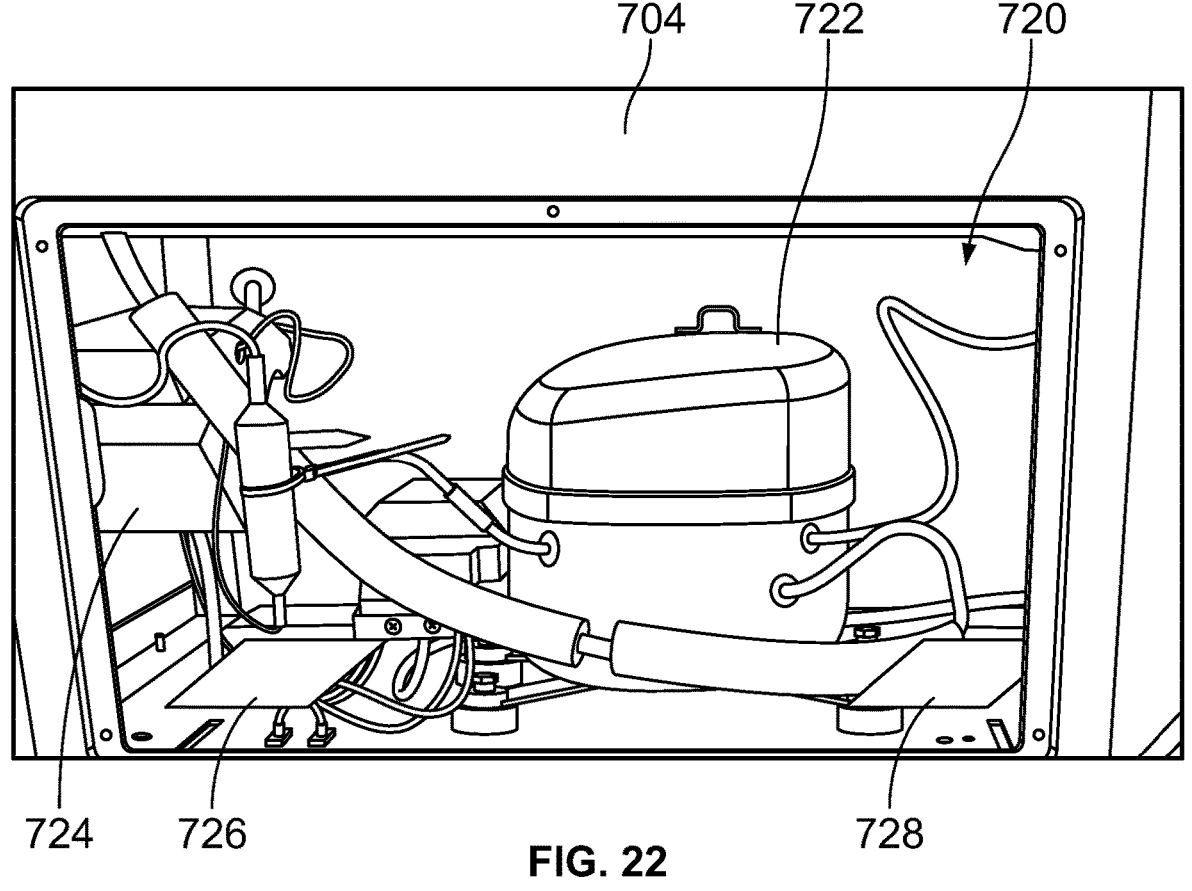
FIG. 22 is a perspective view of an example compressor compartment of the refrigerated container of FIG. 20 showing positions for a power board of the refrigerated container.
Figure 24:
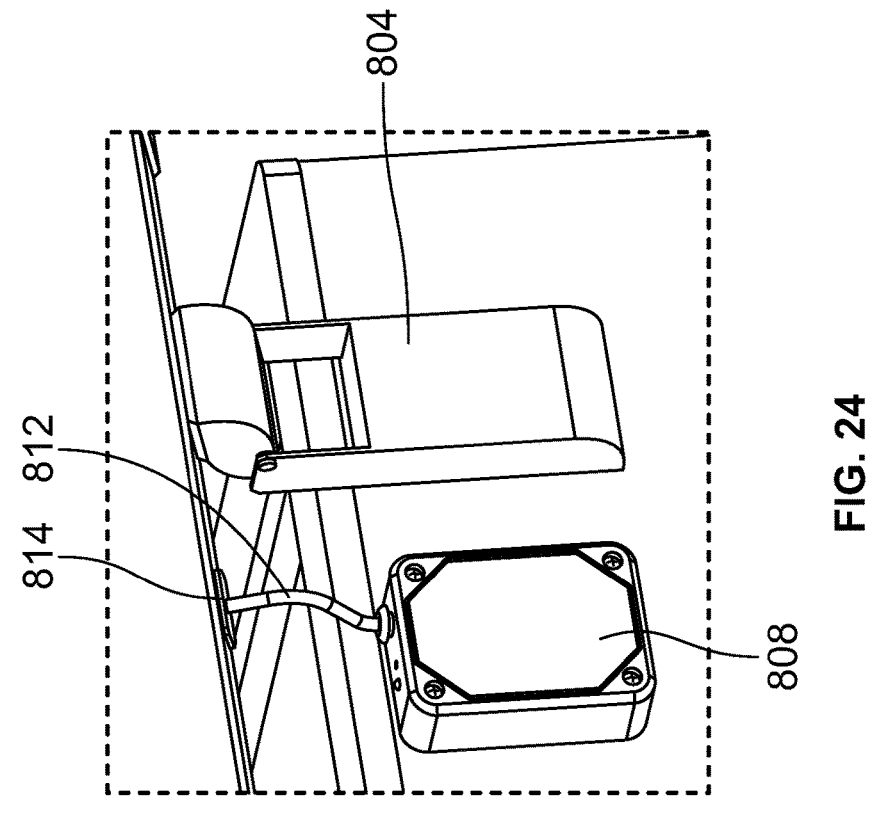
FIG. 24 is an enlarged view of the communication module of FIG. 23.
Figure 23:
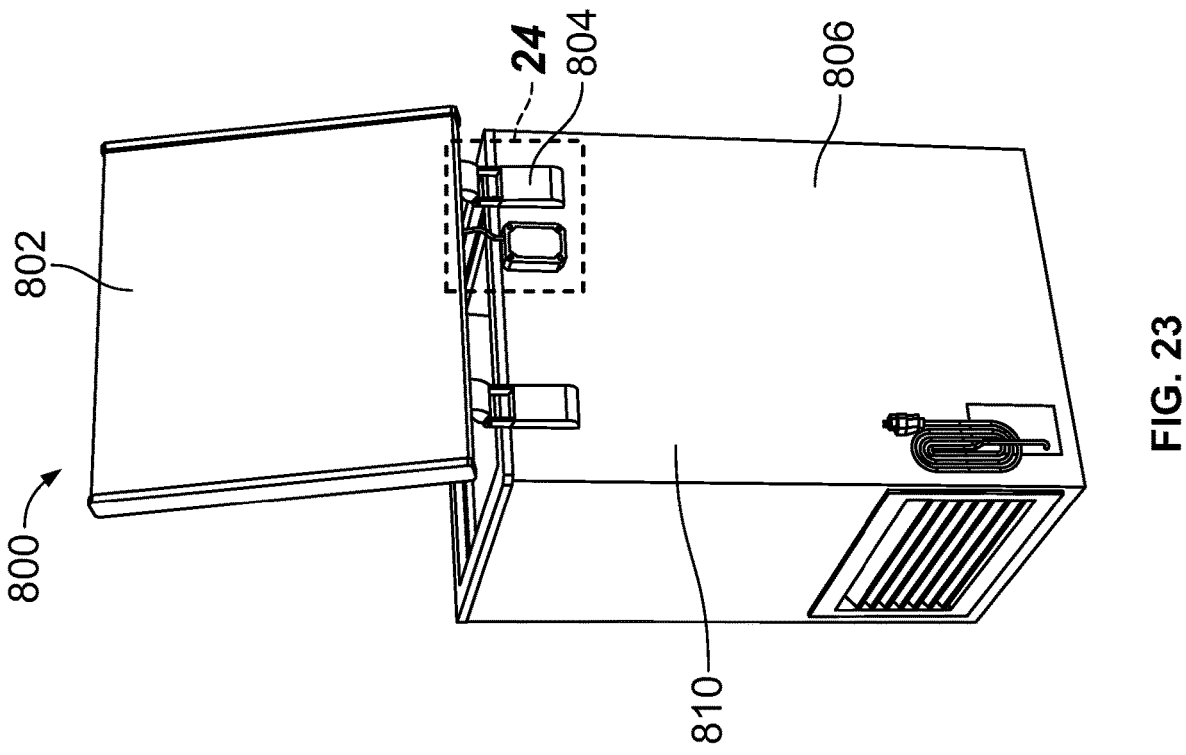
FIG. 23 is a rear perspective view of the refrigerated container of FIG. 20 showing a communication module of the refrigerated container mounted to a rear of the body of the refrigerator container.
Figure 25:
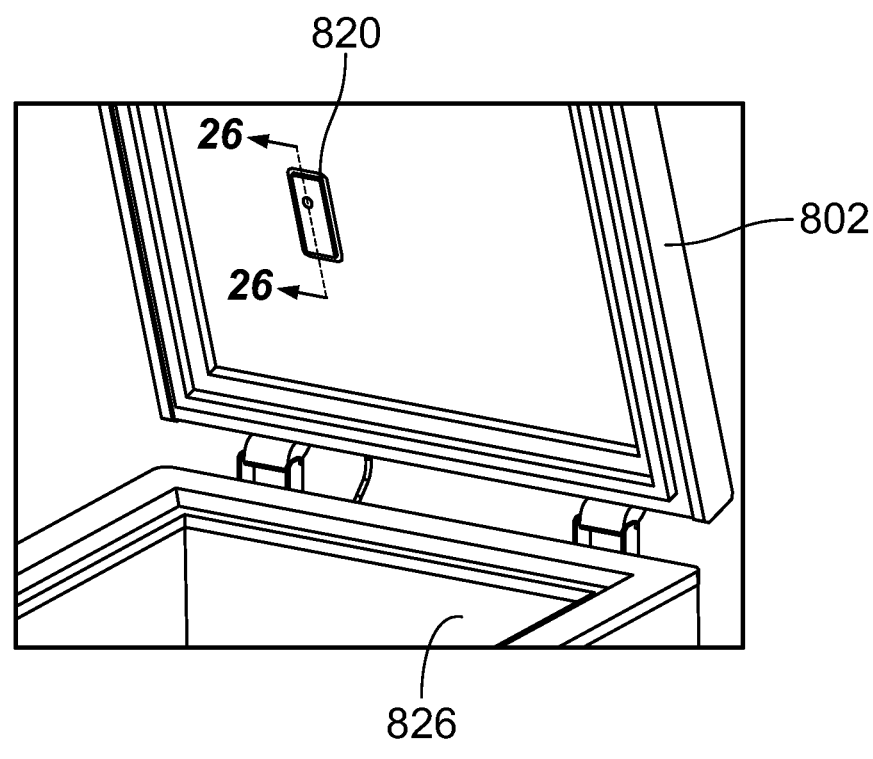
FIG. 25 is a perspective view of an example interior of the refrigerated container of FIG. 23.
Figure 26:
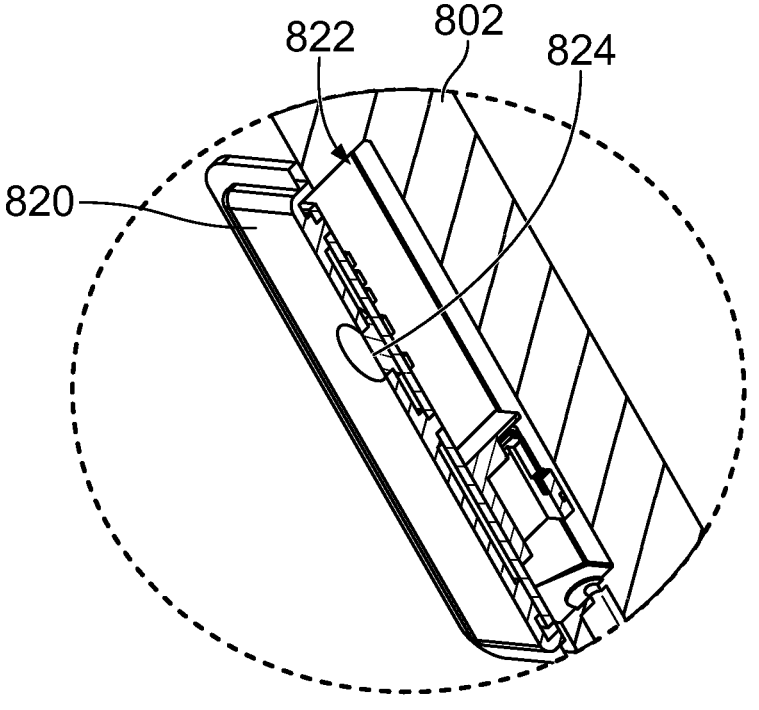
FIG. 26 is a cross-sectional view taken across line 26-26 in FIG. 25 showing the sensor assembly mounted in a cavity of the lid.

Regarding FIG. 22, the body 704 has a compressor compartment 720 for a compressor 722 and other mechanical components of the temperature-controlled container 700. The user interface 706 may be part of a user interface module 724 that extends into the compressor compartment 720. The temperature-controlled container 700 may include a power board 726 at location A or location B (see reference numeral 728). The power board 726 includes a processing, power control, and input-output interface for sensors of the temperature-controlled container 700.

Regarding FIGS. 23-26, a temperature-controlled container 800 is provided that is similar in many respects to the temperature-controlled containers discussed above. The temperature-controlled container 800 includes a lid 802, a hinge 804, a body 806, and a communication module 808 mounted to a wall 810 of the body 806. The temperature-controlled container 800 includes a wire 812, which may be contained in a flexible conduit, extending through a grommet 814 and then into an interior of the lid 802. The wire 812 facilitates communication between the communication module 808 and a sensor assembly 820 integrated in the lid 802. More specifically, the lid 802 has a cavity 822 and the sensor assembly 820 is received at least partially in the cavity 822. The sensor assembly 820 is similar in many respects to the sensor assemblies discussed above and includes a presence sensor 824 for detecting the presence of one or more packages in a compartment 826 of the temperature-controlled container 800.

Figure 27:
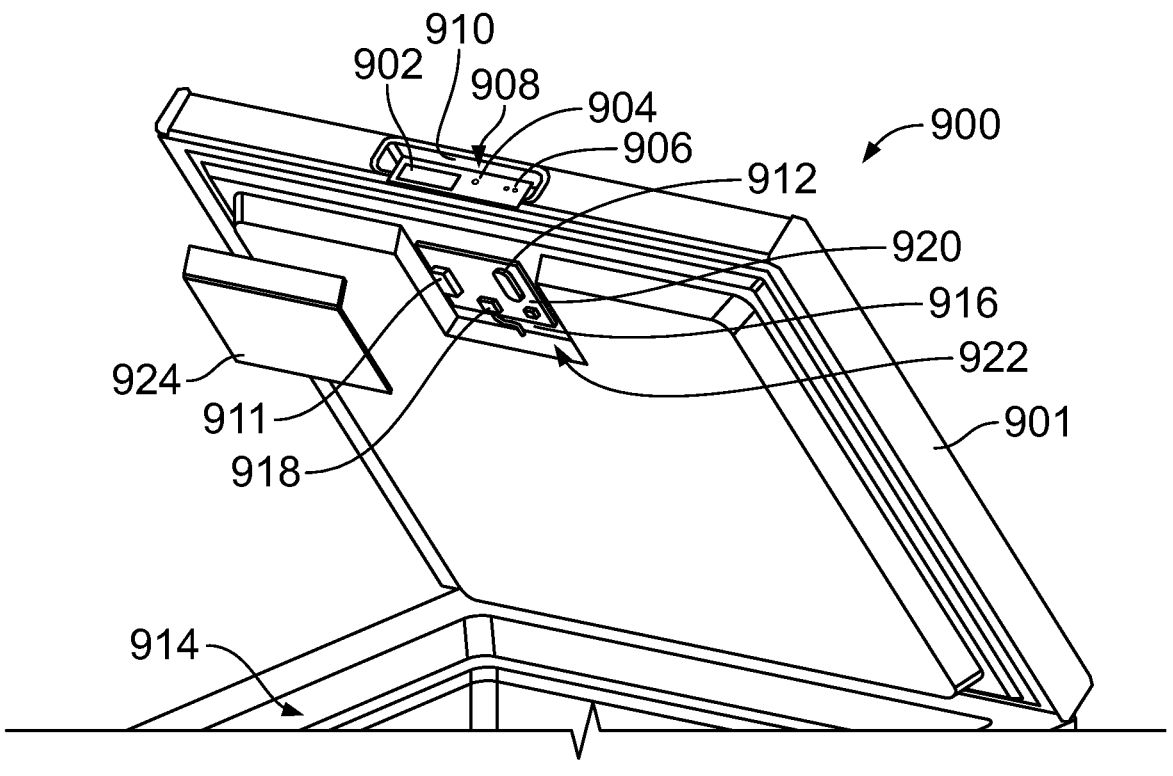
FIG. 27 is a perspective view of an example refrigerated container having processing circuitry adjacent a handle of the lid of the refrigerated container.

Regarding FIG. 27, a temperature-controlled container 900 is provided that is similar in many respects to the temperature-controlled containers discussed above. The temperature-controlled container 900 includes a lid 901 having an integrated communication, processing, and sensor components. The temperature-controlled container 900 has a Wi-Fi antenna 902, a reset switch 904, and one or more LEDs 906 accessible via an opening 908 adjacent a handle 910 of the lid 901. The temperature-controlled container 900 further includes a lid-state sensor such as a tilt sensor, a gyroscope, or an accelerometer 911 configured to detect whether the lid 901 is open or closed, and a temperature sensor 912 configured to detect an interior temperature of a compartment 914 of the temperature-controlled container 900. The accelerometer 911 is operably coupled to the lid 901 and may be capable of detecting the acceleration of gravity in two or three dimensions. The accelerometer 911 may be capable of detecting the orientation of the lid 901 with respect to gravity. For example, a lid orientation perpendicular to gravity may be indicative of the lid 901 being closed, and a lid orientation parallel to gravity may be indicative of the lid 901 being open. The temperature-controlled container 900 further includes a presence proximity sensor 916, which may be a line-of-sight sensor, and a power supply 918. The temperature sensor 912, proximity sensor 916, and the power supply 918 are provided in a circuit board 920 received in a cavity 922 of the lid 901. The lid 901 has a cover 924 that may be removably connected to enclose the circuit board 920 within the cavity 922.

Figure 28:
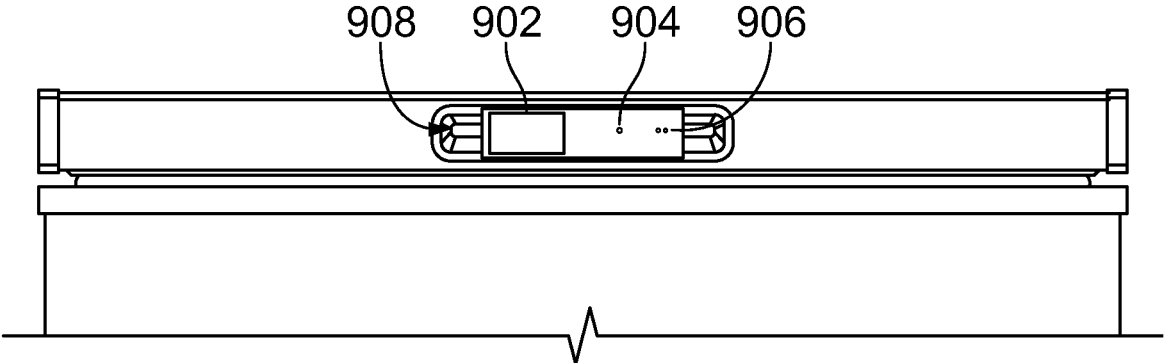
FIG. 28 is a front elevational view of the refrigerated container of FIG. 27.

Regarding FIG. 28, the Wi-Fi antenna 902 is in the opening 908 to provide communication which is vertically elevated on the temperature-controlled container 900 to provide improved signal characteristics for the Wi-Fi antenna 902. Further, the reset switch 904 and the LEDs 906 are in an elevated position readily accessed by a user.

Figure 29:
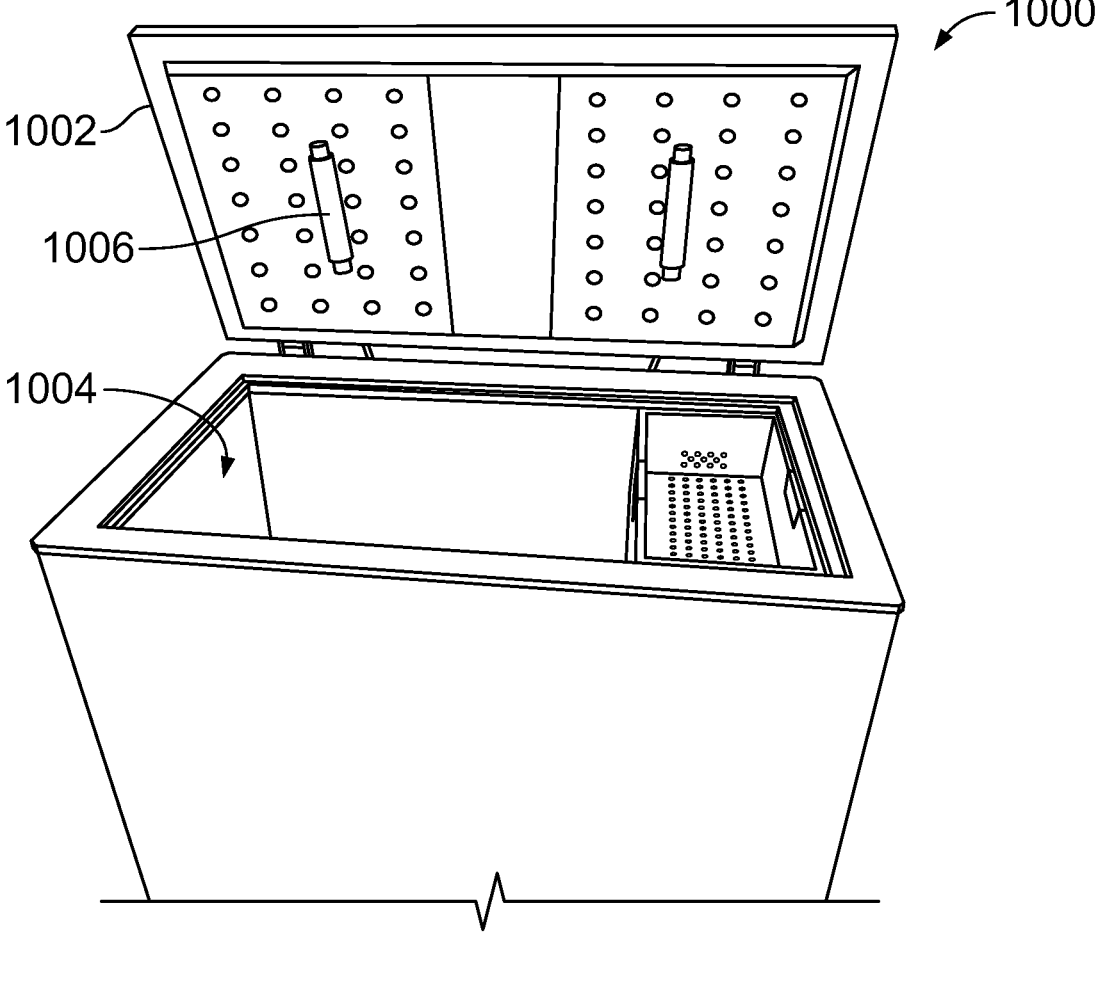
FIG. 29 is a perspective view of an example refrigerated container having an ultraviolet light treatment system.

Regarding FIG. 29, a temperature-controlled container 1000 is provided that is similar in many respects to the temperature-controlled containers discussed above. The temperature-controlled container 1000 includes a lid 1002 and a compartment 1004. The lid 1002 has an ultraviolet light treatment system 1006 supported thereon. The ultraviolet light treatment system 1006 directs ultraviolet light into the compartment 1004 to treat or irradiate the package. For example, the ultraviolet light may kill organisms, such as viruses on the packages. The ultraviolet light may also or instead be used to sterilize the compartment 1004 and/or contents within the compartment 1004 prior to the temperature-controlled container 1000 entering an energy-saving power down state. As discussed above, the ultraviolet light treatment system 1006 may be operably coupled to a lid state sensor (e.g., lid state sensor 134 of FIG. 3) such that the ultraviolet light treatment system 1006 may be automatically deactivated upon opening of a lid 1002 of the temperature-controlled container 1000.

Figure 30A:
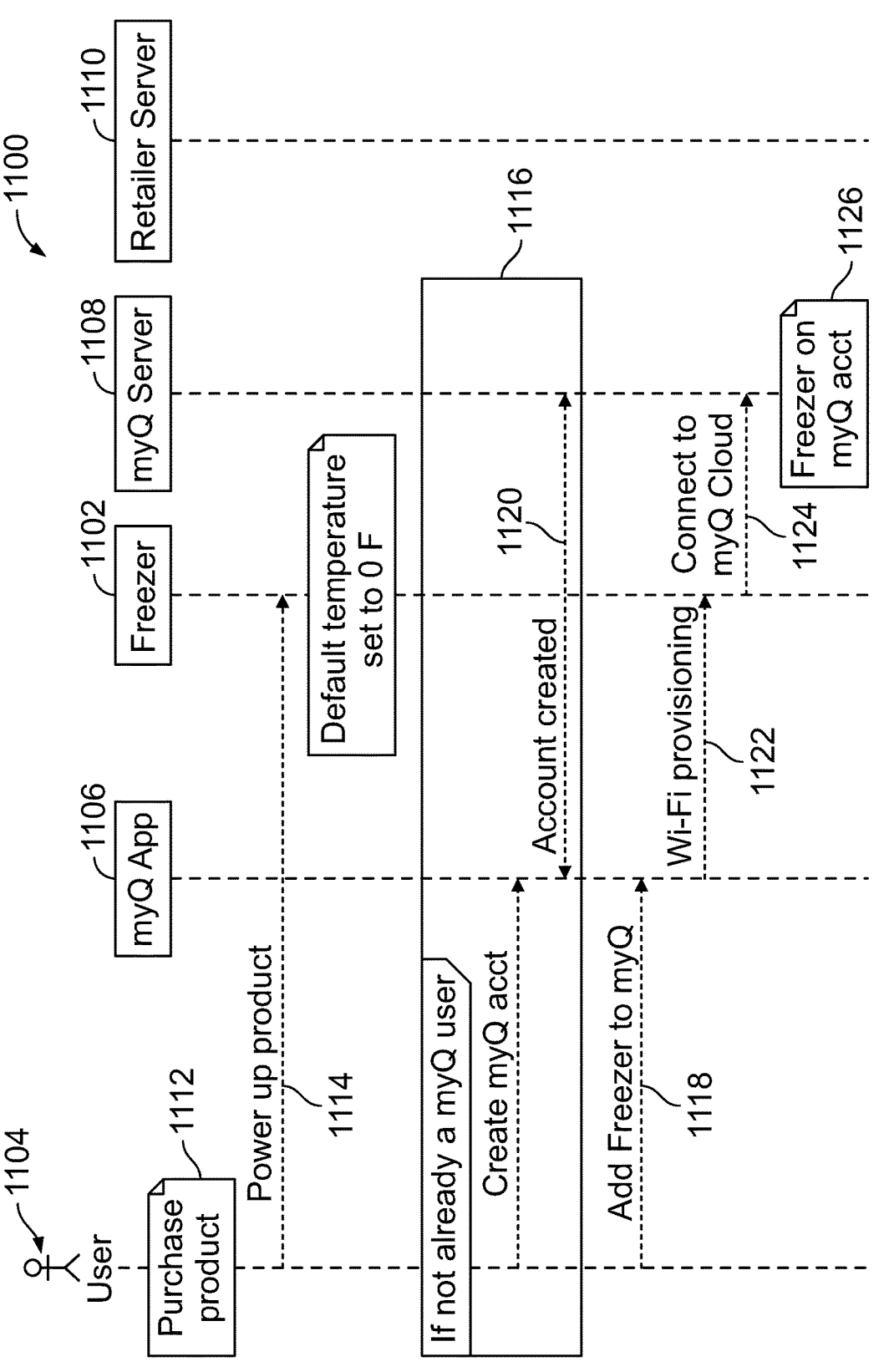
FIGS. 30A-30C illustrate example flowcharts regarding an example of facilitating delivery of purchased goods to a temperature-controlled container.
Figure 30B:
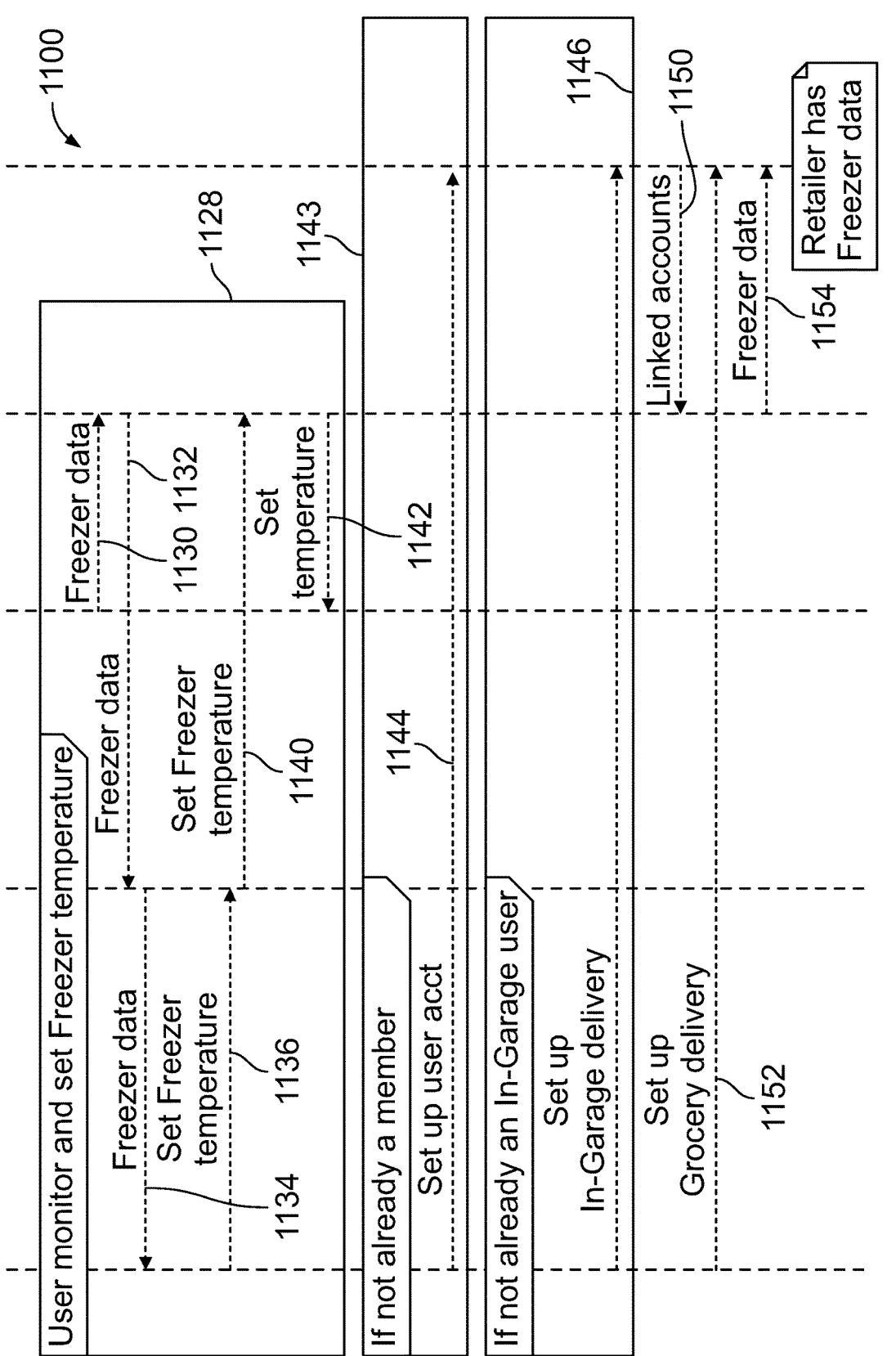
Figure 30C:
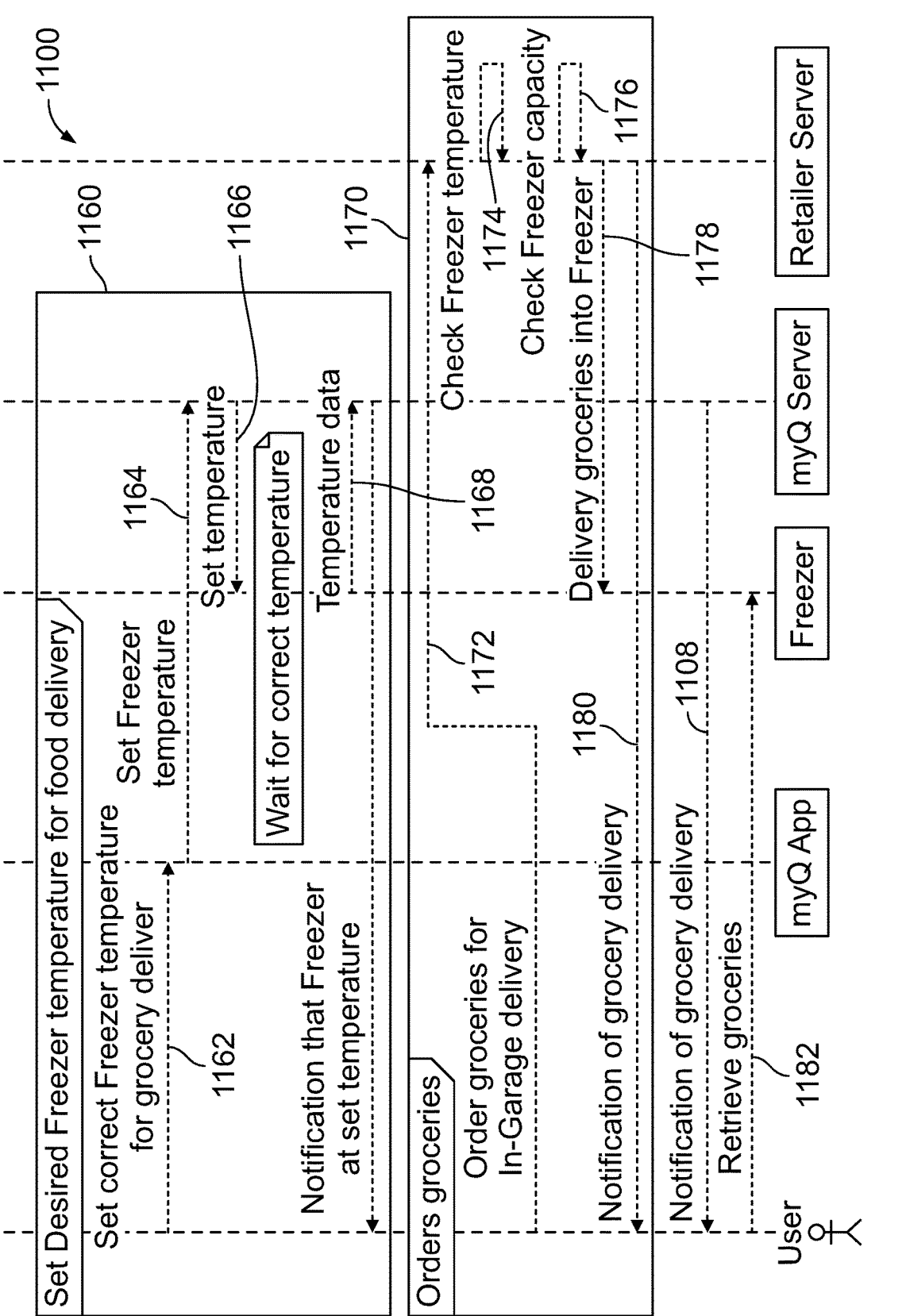

Regarding FIGS. 30A-30C, an example method 1100 is provided that facilitates delivery of groceries to a temperature-controlled container such as a freezer 1102. The method 1100 includes the user 1104 interacting with a user device, such as a smartphone operating an application 1106 and that may communicate with a movable barrier operator server 1108 as well as a third-party partner such as a delivery service and/or e-commerce retailer server 1110. The user 1104 purchases 1112 a product and powers up 1114 the freezer 1102, wherein the freezer 1102 has a default temperature of 30° F.

If the user 1104 does not already have an account with the movable barrier operator server 1108, the user 1104 creates 1116 the account. The user 1104 adds 1118 the freezer 1102 to the user account 1120 and, and provisions 1122 a Wi-Fi connection to a local Wi-Fi network such that the freezer 1102 connects 1124 to the movable barrier operator server 1108. The movable barrier operator server 1108 associates 1126 the freezer 1102 with the user account 1120. The user 1104 may then monitor 1128 the temperature of the freezer 1102 by way of the freezer 1102 providing 1130 the temperature to the movable barrier operator server 1108, the server 1108 providing 1132 the temperature to the application 1106, and the application 1106 providing 1134 the temperature to the user, as discussed above with respect to the smartphone in FIG. 4. The user 1104 may then set 1136 the freezer temperature using the user interface of the user's smartphone. The application 1106 communicates 1140 the desired temperature to the movable barrier operator server 1108 which sends a temperature communication, command, or request 1142 to the freezer 1102.

The method 1100 includes the user 1104 setting up 1143 an account with the retailer if the user 1104 does not already have an account 1144. The method 1100 further includes the user 1104 setting up 1146 the account with the retailer for in-garage delivery. The retailer server 1110 communicates with the movable barrier operator server 1108 to link 1150 the account.

The user 1104 sets up 1152 grocery, perishable, or prepared hot food delivery with the retailer server 1110, such as by using the retailer's application on the user device of the user 1104. The movable barrier operator server 1108 communicates freezer data 1154 to the retailer server 1110, such as the temperature of the freezer 1102, whether the lid of the freezer 1102 is open or closed, and contents or capacity of the fridge as determined, for example, the presence or proximity sensors (e.g., time-of-flight and/or imaging sensors) discussed herein.

The method 1100 further includes setting 1160 the desired freezer temperature for food delivery. In one embodiment, the user 1104 sets 1162 a correct freezer temperature for grocery delivery and the application 1106 communicates 1164 the temperature to the movable barrier operator server 1108. The movable barrier operator server 1108 communicates 1166 the temperature to the freezer 1102. The freezer 1102 provides 1168 the temperature to the movable barrier operator server 1108.

The method 1100 further includes the user 1104 requesting 1170, an order of a product for delivery. In one embodiment, the ordering includes the user 1104 using the user device to request 1172 an order of groceries from the retailer, such as using the retailer's application on the user device. The retailer server 1110 checks 1174 the freezer temperature and checks 1176 a capacity of the freezer. The checking of the freezer temperature 1174 and/or the capacity 1176 involve requesting the freezer information to be communicated 1154 or transmitted from the freezer to the retailer server 1110 via the movable barrier operator server 1108. The checking of the freezer temperature 1174 and/or the capacity of the freezer 1176 involve using the freezer data 1154 received from the movable barrier operator server 1108. Assuming there is adequate capacity (e.g., the available capacity of the freezer is greater than a product volume of the delivery), the retailer causes delivery 1178 of groceries into the freezer 1102 and the retailer server 1110 provides 1180 a notification of the grocery delivery to the user 1104 such as by the retailer application on the user device. The movable barrier operator server 1108 may also provide a notification to the user 1104. The user 1104 may then retrieve 1182 groceries from the freezer 1102. If there is an inadequate capacity of the freezer, a server computing system, such as the retail server 1110 and/or the movable barrier operator server 1108, may communicate a signal to a user device indicating the denial of the request for the order due to the inadequate capacity of the freezer 1102.

In one embodiment, the freezer 1102 is maintained in the "OFF" state for energy savings prior to and after the order 1172 is placed (particularly once the delivered items are retrieved) and remains in the OFF state until a predetermined time prior to the delivery 1178 of the order. For example, the freezer 1102 may be maintained in the OFF state until a predetermined period of time (e.g., 10 minutes, 30 minutes, 1 hour, 5 hours, etc.) prior to an anticipated delivery time, at which time the freezer 1102 is switched "ON" and is cooled to the set temperature. In another example, the freezer 1102 may be maintained in the OFF state until a delivery person is within a predetermined range of the freezer 1102 (e.g., one mile away, 10 miles away, etc.), at which time the freezer 1102 is similarly switched ON and cooled to the set temperature. In still another example, the freezer 1102 may be maintained in the OFF state until the purchased goods are within a predetermined range of a delivery schedule (e.g., two delivery stops away, 10 delivery stops away, etc.), at which time the freezer 1102 is similarly switched ON and cooled to the set temperature. In another example, the freezer 1102 may be maintained in the OFF state until an order is placed, at which time the freezer 1102 can be set to correspond to the requirements of the order. The freezer 1102 may have one or more preset temperatures such as "refrigerate," "freeze," and a "mixed load" setting in which a temperature is set just above freezing to allow for minimal thawing of frozen items and minimal freezing of fresh items).

Figure 31A:
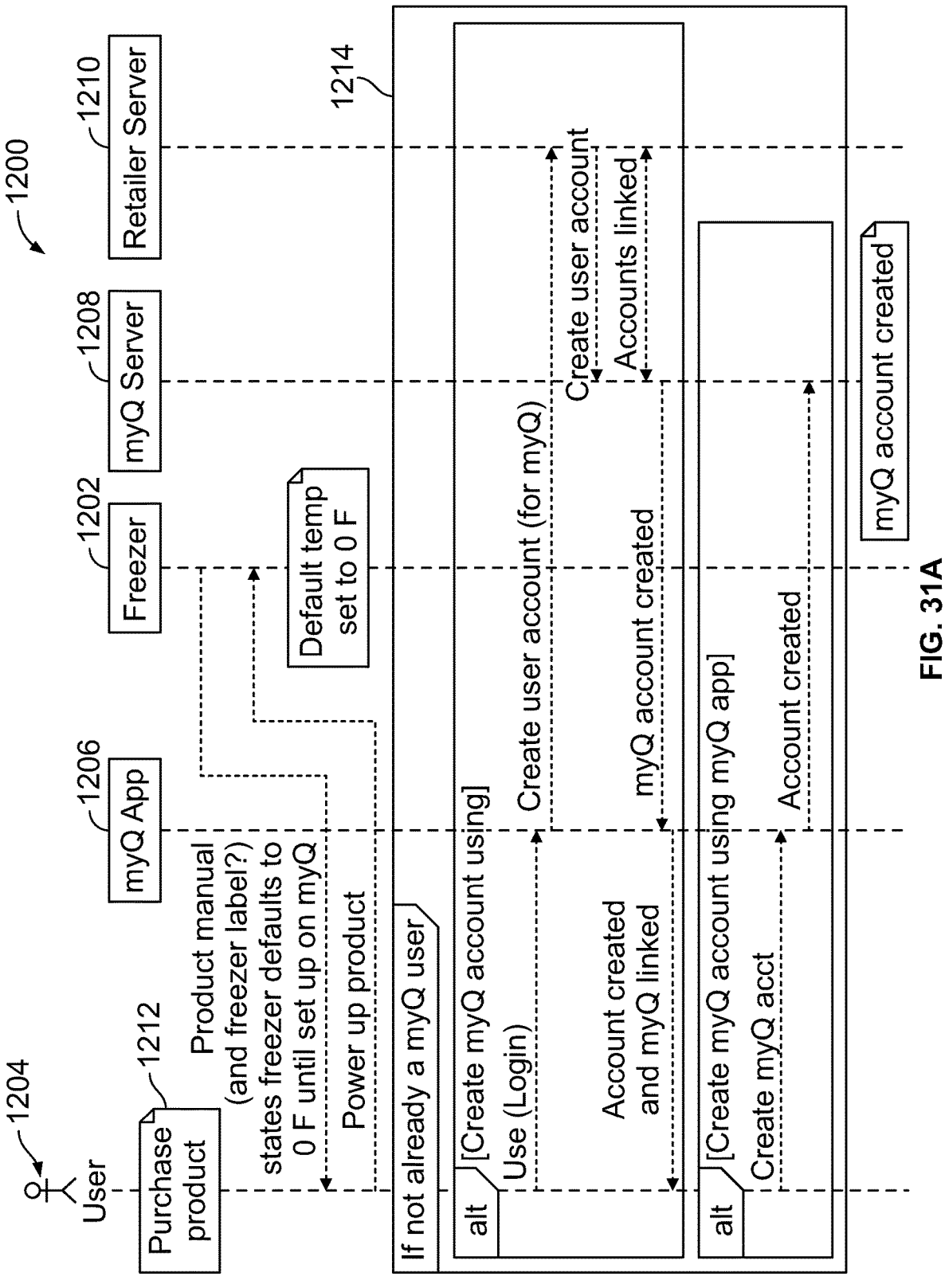
FIGS. 31A-31C illustrate example flowcharts regarding another example of facilitating delivery of purchased goods to a temperature-controlled container.
Figure 31B:
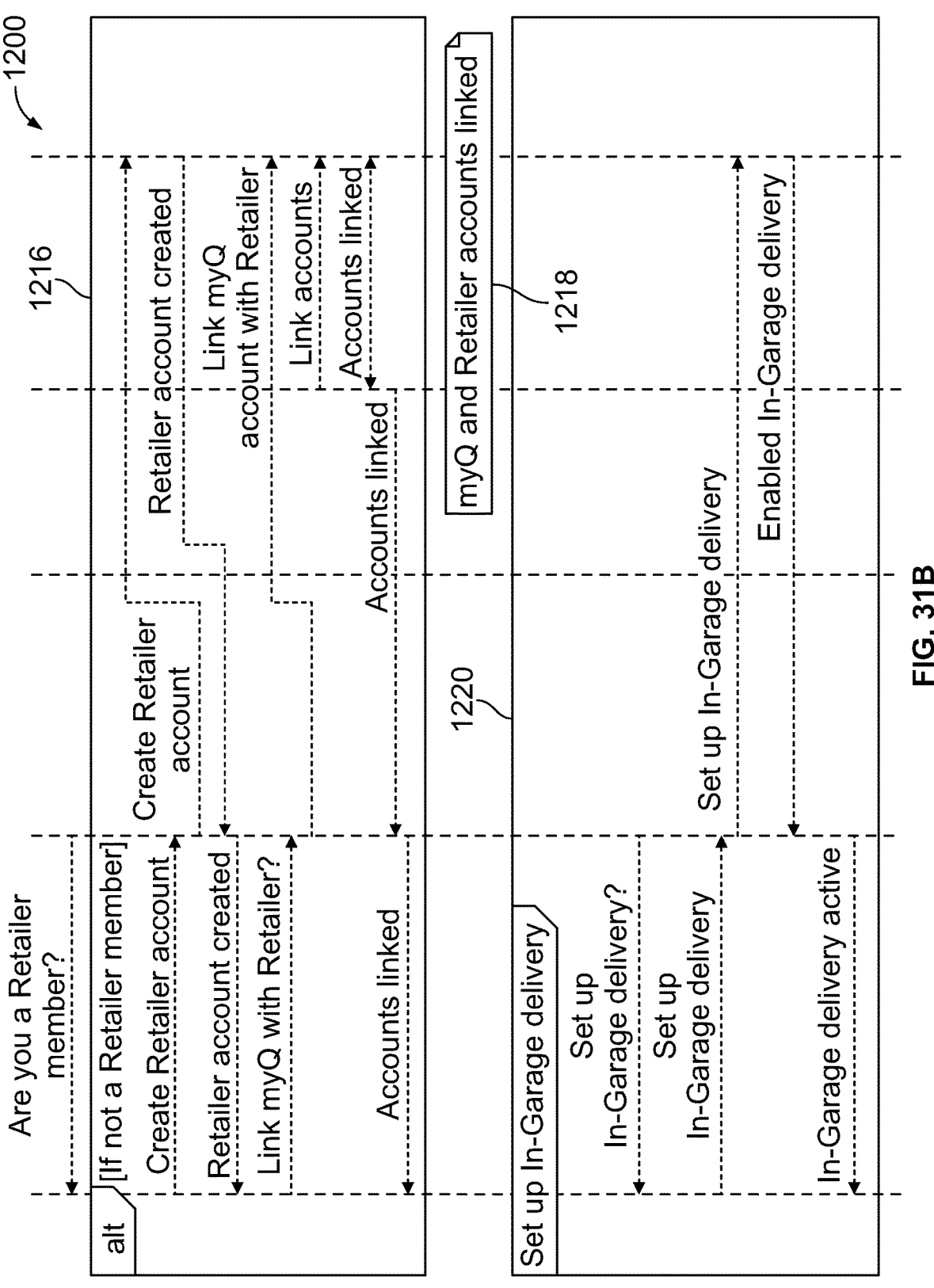
Figure 31C:
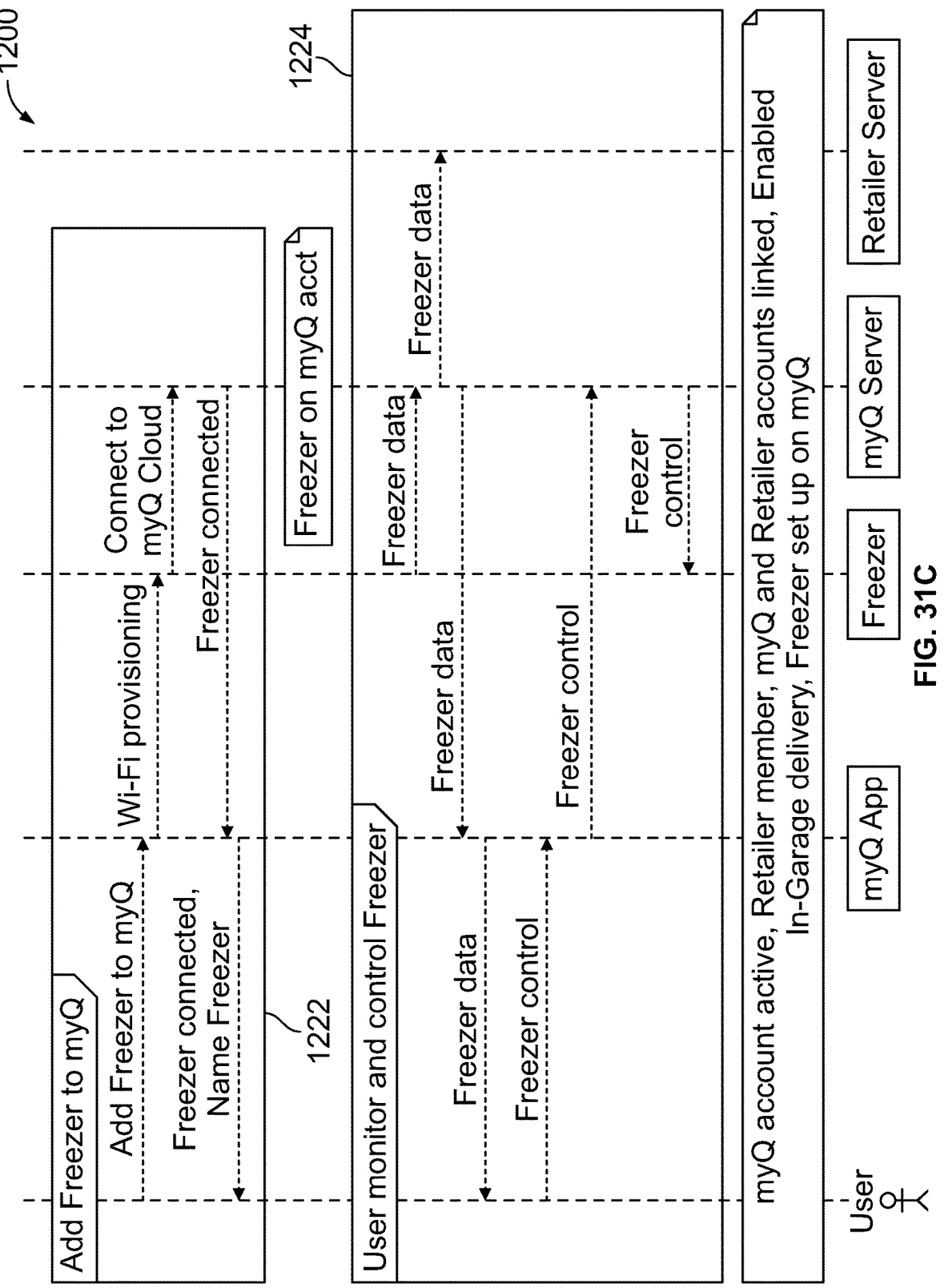

Regarding FIGS. 31A-31C, another example method 1200 is provided for facilitating delivery of groceries to a temperature-controlled container such as a freezer 1202. The method 1200 is similar in many respects to the method 1100 discussed above. The method 1200 may include a user 1204 using a user device, such as a smartphone, that operates an application 1206. The user device is operable to communicate with a movable barrier operator server 1208 and a retailer server 1210.

The method 1200 includes the user 1204 purchasing 1212 a product, setting up 1214 an account with the movable barrier operator service provider 1214, setting up 1216 an account with the retailer, and linking 1218 the movable barrier operator service provider and retailer account. The method 1200 further includes the user 1204 setting up 1220 in-garage delivery so that purchases made using the retailer's website or application or even in-store services may be then delivered to the garage of the user 1204. The method 1200 includes adding 1222 the freezer 1202 to the movable barrier operator service provider account of the user 1204 and then facilitating the user 1204 to monitor and control 1224 the freezer 1202 using the user device of the user 1204.

Figure 32A:
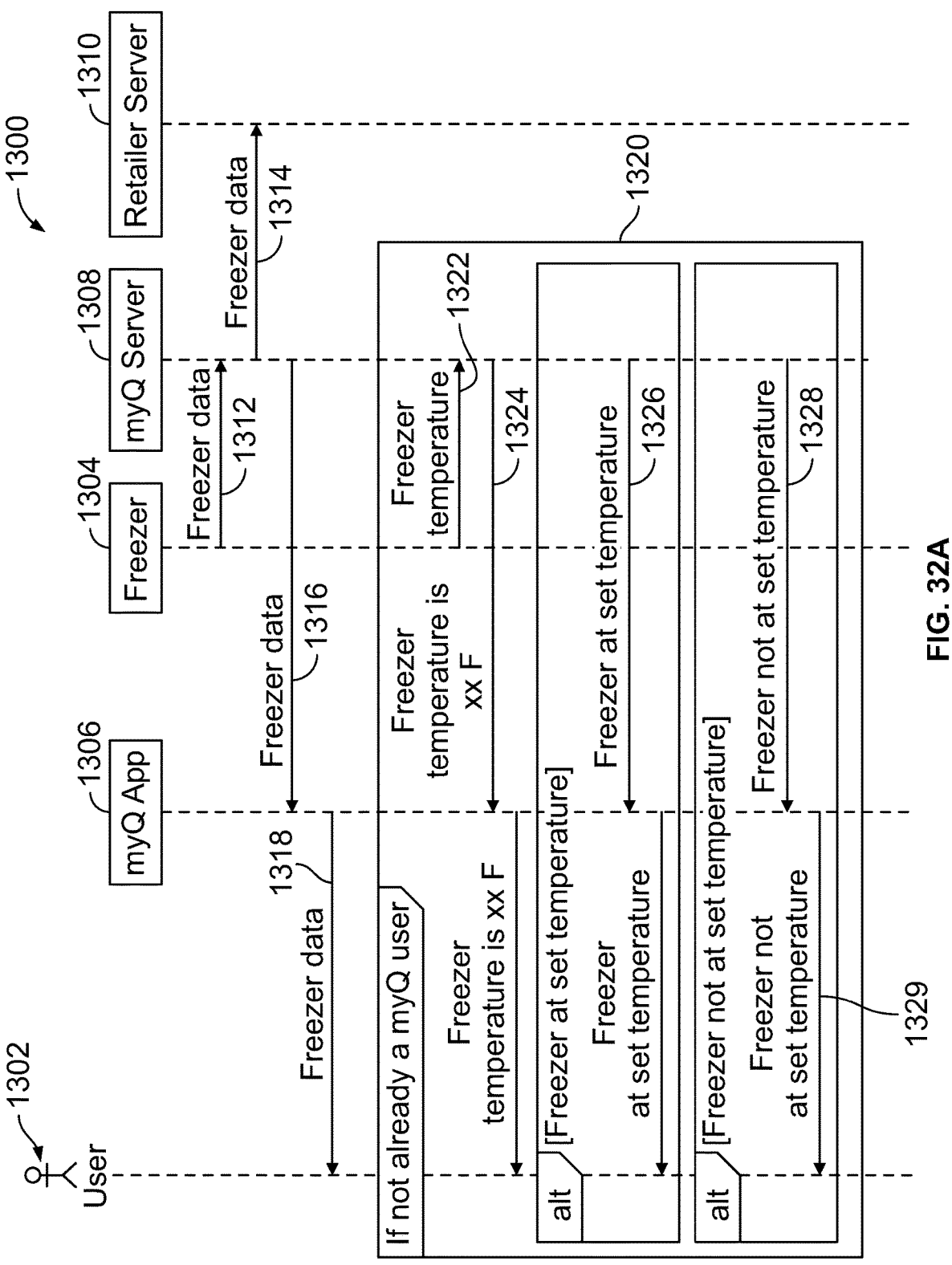
FIGS. 32A-32C illustrate example flowcharts regarding facilitating monitoring and controlling a temperature-controlled container via an application of a user device.
Figure 32B:
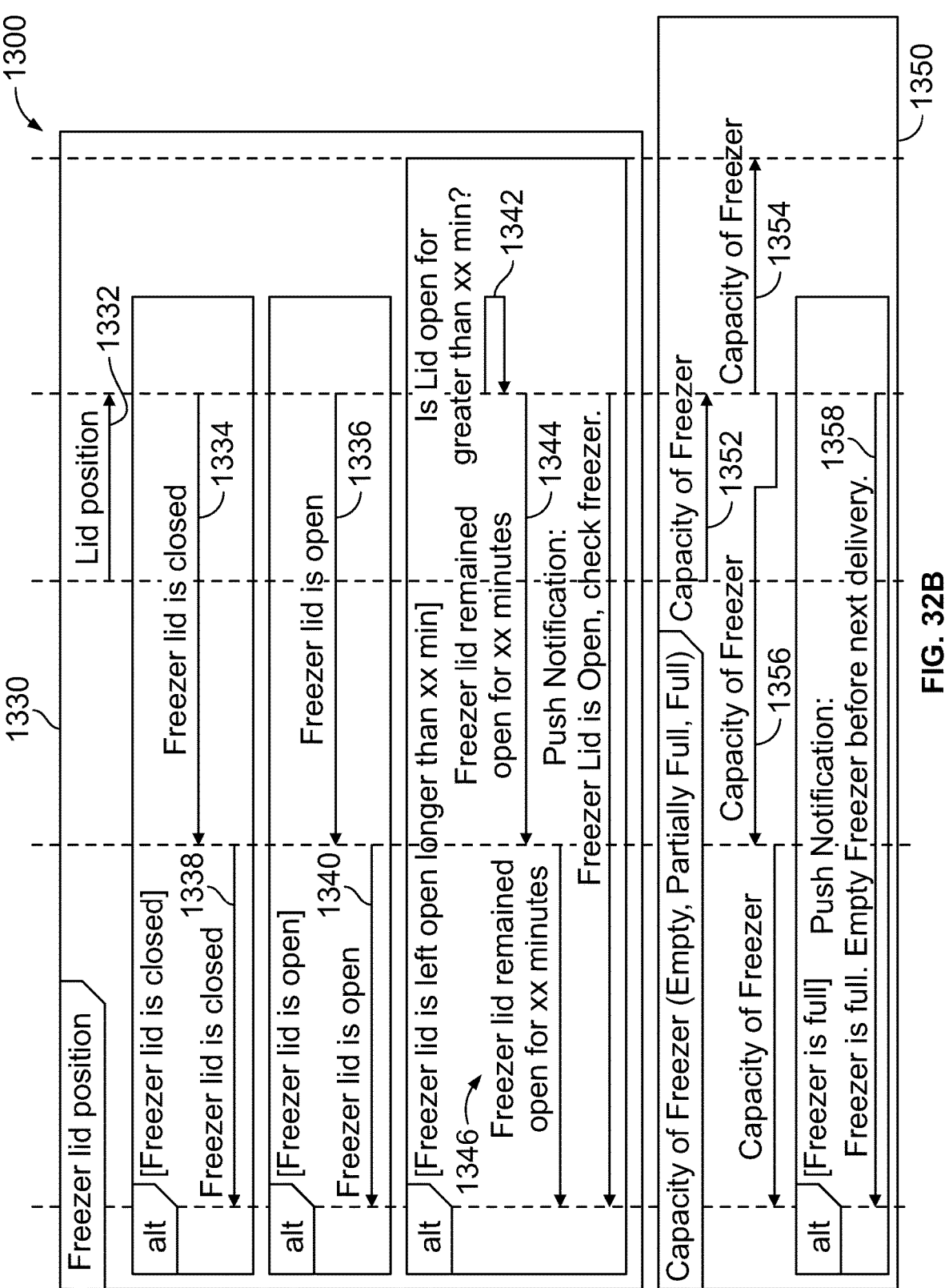
Figure 32C:
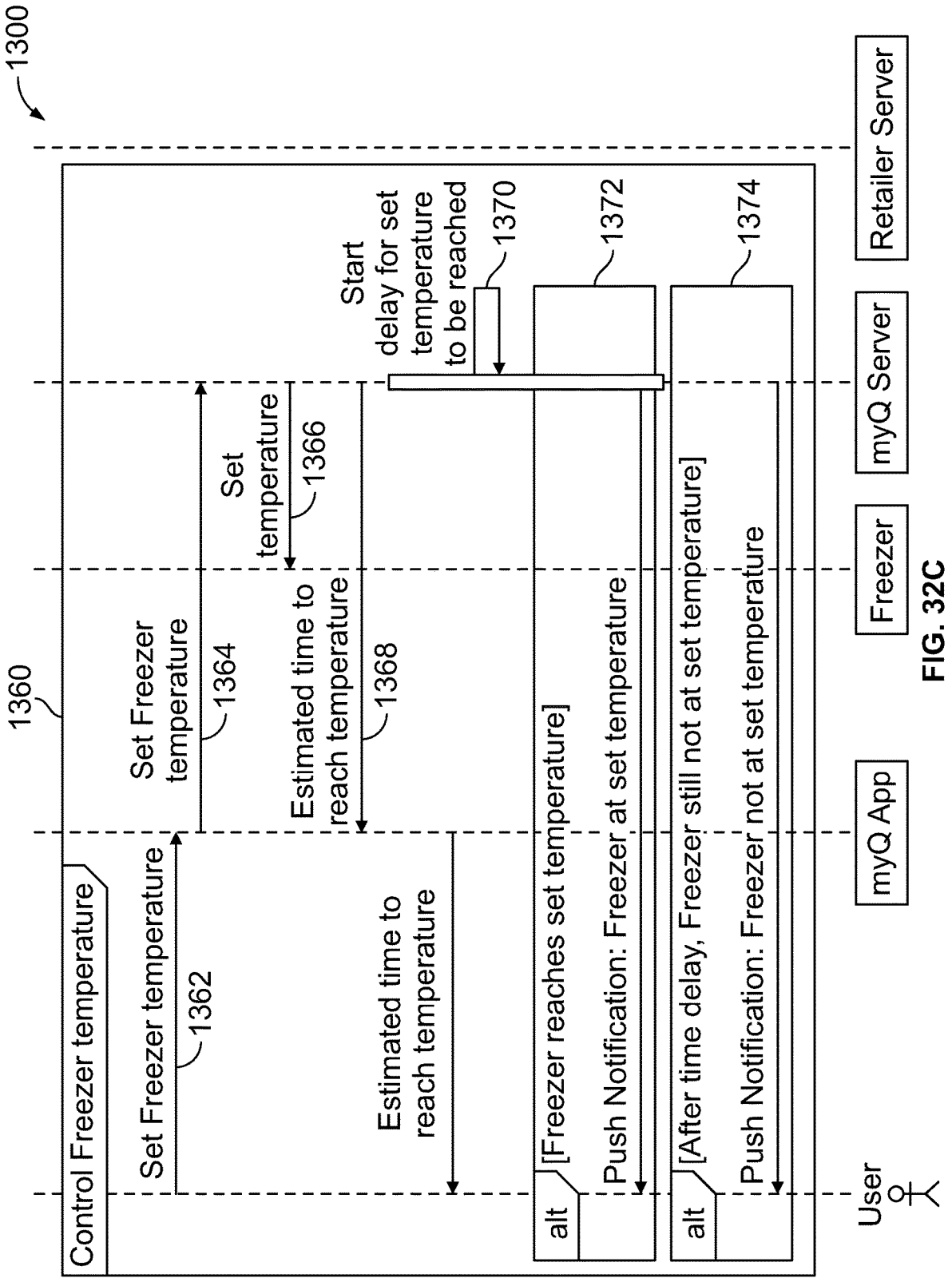

Regarding FIGS. 32A-32C, another example method 1300 is provided that facilitates a user 1302 utilizing a user device to monitor and control a temperature-controlled container 1304 via an application 1306 of the user device. The user device may also communicate with a movable barrier operator server 1308 and the retailer server 1310.

The method 1300 includes the freezer 1304 communicating 1312 freezer data to the movable barrier operator server 1308 which, in some embodiments, in turn communicates 1314 the freezer data to the retailer server 1310. The freezer data may include, for example, the temperature of the freezer 1304 as well as presence data regarding whether there are objects present in a compartment of the freezer 1304 and/or an indication of the available capacity of the freezer 1304 (e.g., the empty interior volume thereof). The movable barrier operator server 1308 communicates 1316 data to the application 1306 which in turn presents or communicates 1318 the freezer data to the user 1302. The freezer 1304 may communicate data to the application 1306 on a user device which in turn presents or communicates data to the user 1302 via a user interface of the user device. The method 1300 includes the freezer temperature control operation 1320. In one embodiment, the freezer 1304 provides 1322 its temperature to the server 1308 which sends 1324 the temperature to the application 1306. The user 1302 may observe the temperature provided 1322, 1324 via the application 1306. The user may then manually adjust the temperature of the freezer 1304. In another approach, the movable barrier operator server 1308 provides a notification 1326 whether the freezer 1304 is at the set temperature or not. The application 1306 provides the notification to the user 1302. If the freezer is not at the set temperature, the movable barrier operator server 1308 provides 1328 a notification to the application 1306 which is then communicated 1329 to the user 1302. The user 1302 may then manually adjust the temperature of the freezer 1304 to achieve the set temperature.

The method 1300 includes a freezer lid position operation 1330 that checks whether the lid is in a state that permits delivery of groceries to the freezer 1304. The operations 1330 include the freezer 1304 providing 1332 lid position data to the movable barrier operator server 1308. The movable barrier operator server 1308 determines whether the lid position data of communication 1332 indicates if the freezer lid is closed or open and sends a corresponding notification 1334, 1336 to the application 1306 which in turn communicates 1338, 1340 the notification to the user 1302.

If the lid is opened, the user may then close the lid. The operations 1330 may include a movable barrier operator server 1308 determining 1342 whether the lid is opened for greater than a predetermined time period, such as five minutes. If the lid is opened for greater than the predetermined time period, the movable barrier operator server 1308 communicates a notification 1344 that the lid has been open for more than the predetermined time period to the application 1306. The application 1306 then communicates or otherwise presents alerts, reminders or notifications 1346 to the user 1302 to suggest that the user 1302 close the lid. The method 1300 further includes a capacity determination operation 1350. The freezer 1304 communicates 1352 freezer information indicative of the capacity of the freezer 1304 to the movable barrier operator server 1308. The movable barrier operator server 1308 communicates 1354 capacity data to the retailer server 1310. In one embodiment, the capacity is communicated to the retail server 1310 by the freezer 1304. The retailer server 1310, the movable barrier operator server 1308, and/or the freezer 1304 may make a determination of whether the user 1302 may request a delivery to the freezer 1304 based on the capacity data received at operation 1354. In one embodiment, the user 1302 may request a delivery of a product to the freezer 1304 and the capacity may be determined in response to the delivery request. In this embodiment, the capacity determination operation 1350 occurs and communicates a signal to the user 1302 of an inhibition, a cancellation, a delay, a denial, or an alternative delivery method if there is inadequate capacity (e.g., the capacity of the freezer 1304 is less than information indicative of the product, such as a volume of the product(s). The movable barrier operator server 1308 may then communicate 1356 a notification to the application 1306 regarding the capacity of the freezer. In some embodiments, the retail server 1310 and/or the freezer 1304 may communicate the notification to the application 1306 regarding the capacity of the freezer 1304. If the movable barrier operator server 1308 determines the capacity data received in operation 1352 indicates the freezer 1304 is full (e.g., there is inadequate capacity of the freezer 1304), the movable barrier operator server 1308 may send a notification 1358 to the user, such as by the application 1306, text message, push notification or an email, indicating that the user should empty the freezer before the next delivery.

In some embodiments, the capacity of the freezer 1304 is compared to a product volume to enable a determination of inadequate capacity, and in turn, a determination regarding whether a product may be delivered to the freezer 1304. For example, the user 1302 requests a delivery to the freezer 1304. The retail server 1310, the movable barrier operator server 1308, and/or the application 1306 may determine information indicative of the product, such as a volume of the product(s). This may include a determination of the product volume of the ordered or requested product(s) within the order or delivery, the volume of the goods placed in delivery containers, for example, grocery bags or boxes, or some other volume calculations of the requested or ordered product(s).

Once the information indicative of the product is determined, one or more of the retail server 1310, the movable barrier operator server 1308, the application 1306, and/or the freezer 1304, alone or in conjunction with, may compare the capacity of the freezer 1304 to the information indicative of the product to generate a determination of inadequate capacity. If there is an inadequate capacity of the freezer 1304, the user will be notified indicating a denial of the request to order the product.

The comparison may include comparing the volume of the requested product to the volume of empty space in the freezer. Other approaches include comparing one or more dimensions of ordered product(s) to the internal dimensions of the freezer. For example, a height of a product may be compared to a height of an empty space within the freezer. As another example in this regard, the widths of several products in an order may be added together and compared to a width of an empty space in the freezer. As yet another example, the product information may include a value providing a rough estimate of the size of the product such as a "1" for a product that requires a 25 cubic inch volume, a "2" for a product that requires a 36 cubic inch volume, and so forth. The internal volume of the freezer may likewise be quantified with a value providing a rough estimate of the available space such as a "A" for 25 cubic inches of available volume and "B" for 36 cubic inches of available volume and so on. The comparison may deem the freezer has adequate capacity if the available capacity of the freezer is "B" and the requested product has an "A" size.

Additionally or alternatively, a product may be associated with a value indicative of whether the product is rigid or flexible, for example whether a product may be conformed to fit within a particular space such as, for example, an irregularly shaped volume. In one instance a flexible, conformable product such as a bag of rice or marshmallows is associated with a composite indicator "A-1" with the volume indicator "A" mentioned above for 25 cubic inches along with the additional indicator "1" representative of the product being conformable, e.g., bendable, compressible, or squishable, into an irregularly-shaped space/volume (e.g., non parallelepiped). In other instances, a single indicium may represent both of the product volume and conformability.

In some embodiments, the freezer 1304 may transmit freezer information at set intervals, for example every 10 minutes, in addition to or alternatively from providing the information when requested by the retail server 1310, the movable barrier operator server 1308, the application 1306, and/or from the internet. The user 1302 may remove stored goods within the freezer 1304 to increase the capacity of the freezer 1304. If, for example, the user 1302 removes or rearranges stored goods within the freezer 1304, the freezer 1304 may transmit an updated capacity to the retail server 1310, the movable barrier operator server 1308, and/or the application 1306. If the updated freezer information, such as the capacity of the freezer 1304, indicates an adequate capacity as compared to the information indicative of the product, the order may resume in response to the determination of adequate capacity of the freezer 1304. In some embodiments, the user 1302 may provide an input at a user interface of the user device instantiating the application 1106 that indicates an updated capacity. The user device may include a processor, a memory, and communication circuitry, to communicate with the freezer 1304, the retail server 1310, and/or the movable barrier operator server 1308.

The operations 1300 include freezer temperature control operation 1360. In some embodiments, the freezer 1304 may be controlled automatically by the movable barrier operator server 1308 and/or the retailer server 1310 based on a number of factors including, for example, temperature storage recommendations for an item or items that were ordered and are to be delivered. In other embodiments, such as shown, the freezer 1304 may be controlled using the user device 1302. In this embodiment, the user provides 1362 a set freezer temperature to the application 1306 which the application 1304 communicates 1364 to the movable barrier operator server 1308. The movable barrier operator server 1308 sends a temperature request 1366 to the freezer 1304. The movable barrier operator server 1308 also determines an estimated set time for the freezer 1304 to obtain the set temperature based at least in part on the current temperature of the freezer 1304 communicated at operation 1312. The movable barrier operator server 1308 communicates 1368 the estimated time for the freezer to reach the set temperature to the application 1306 at operation 1368. The application 1306 provides the estimated time to the user 1302. The movable barrier operator server 1308 monitors 1370 the temperature of the freezer 1304 as the freezer 1304 reaches the set temperature. The movable barrier operator then sends a notification 1372 to the user 1302 once the temperature has been reached or sends a notification 1374 if the freezer 1304 does not reach the set temperature within a predetermined time.

Figure 33A:
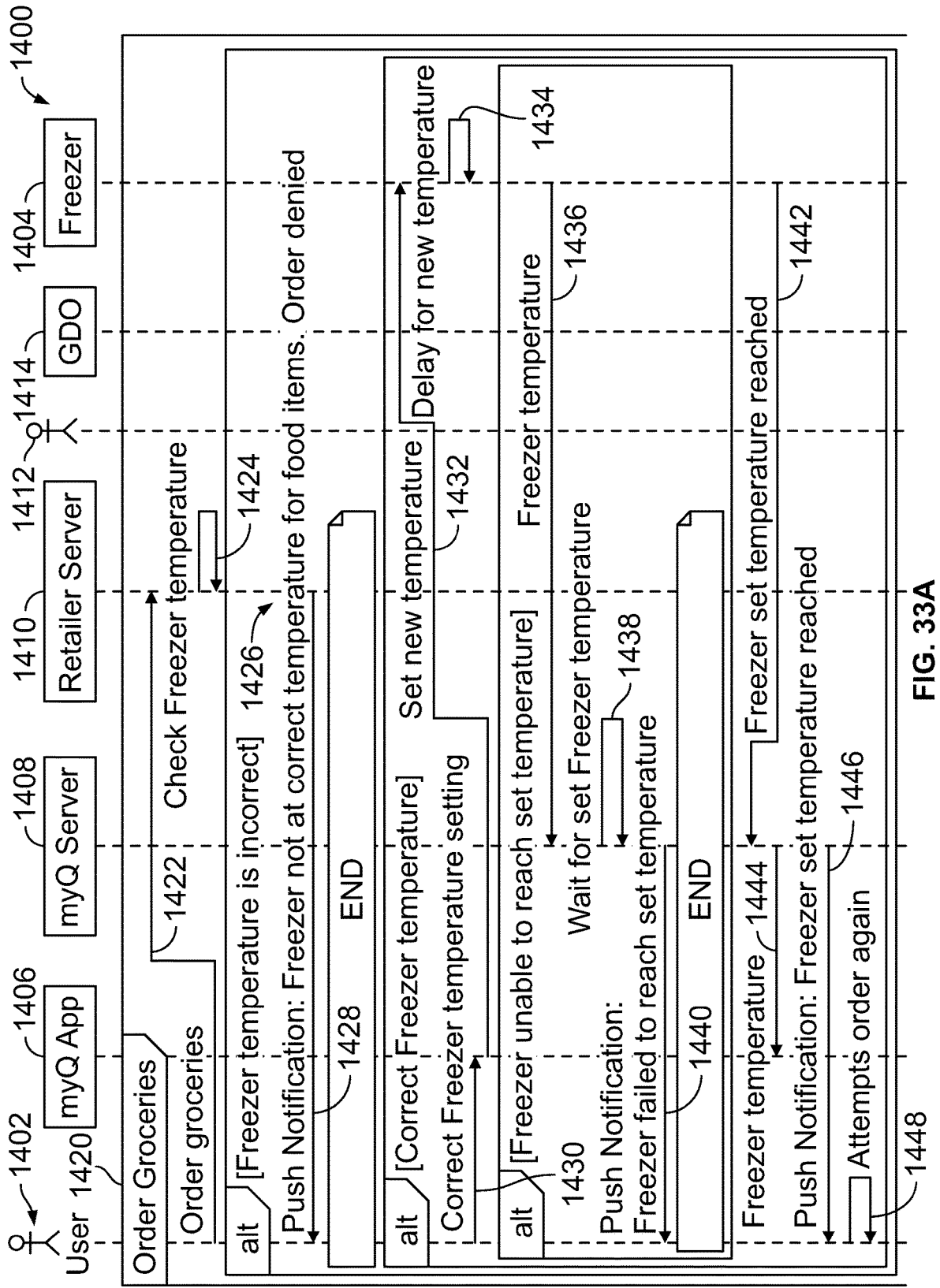
FIGS. 33A-33C illustrate example flowcharts regarding facilitating ordering of a product for delivery to a temperature-controlled container.
Figure 33B:
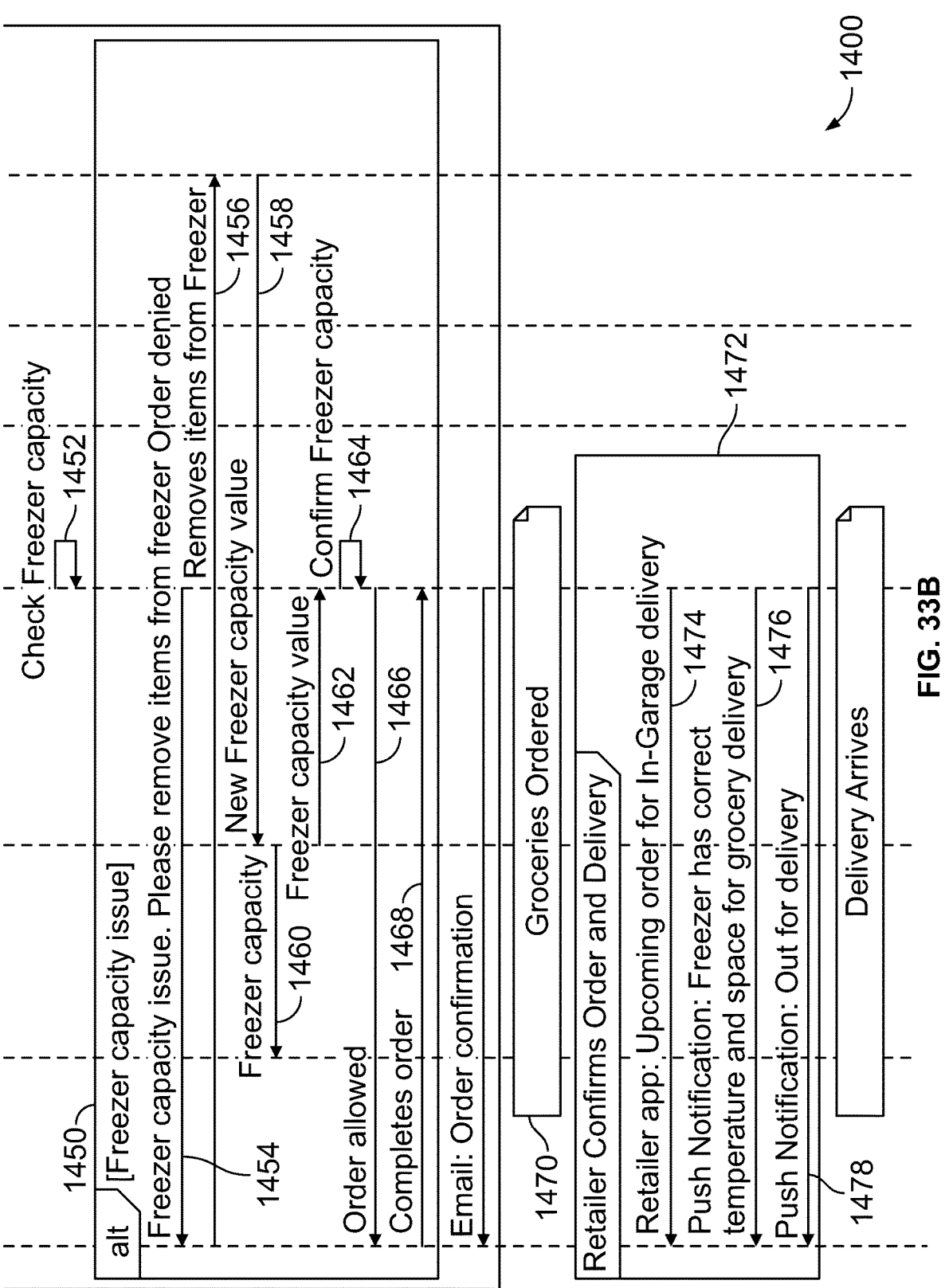
Figure 33C:
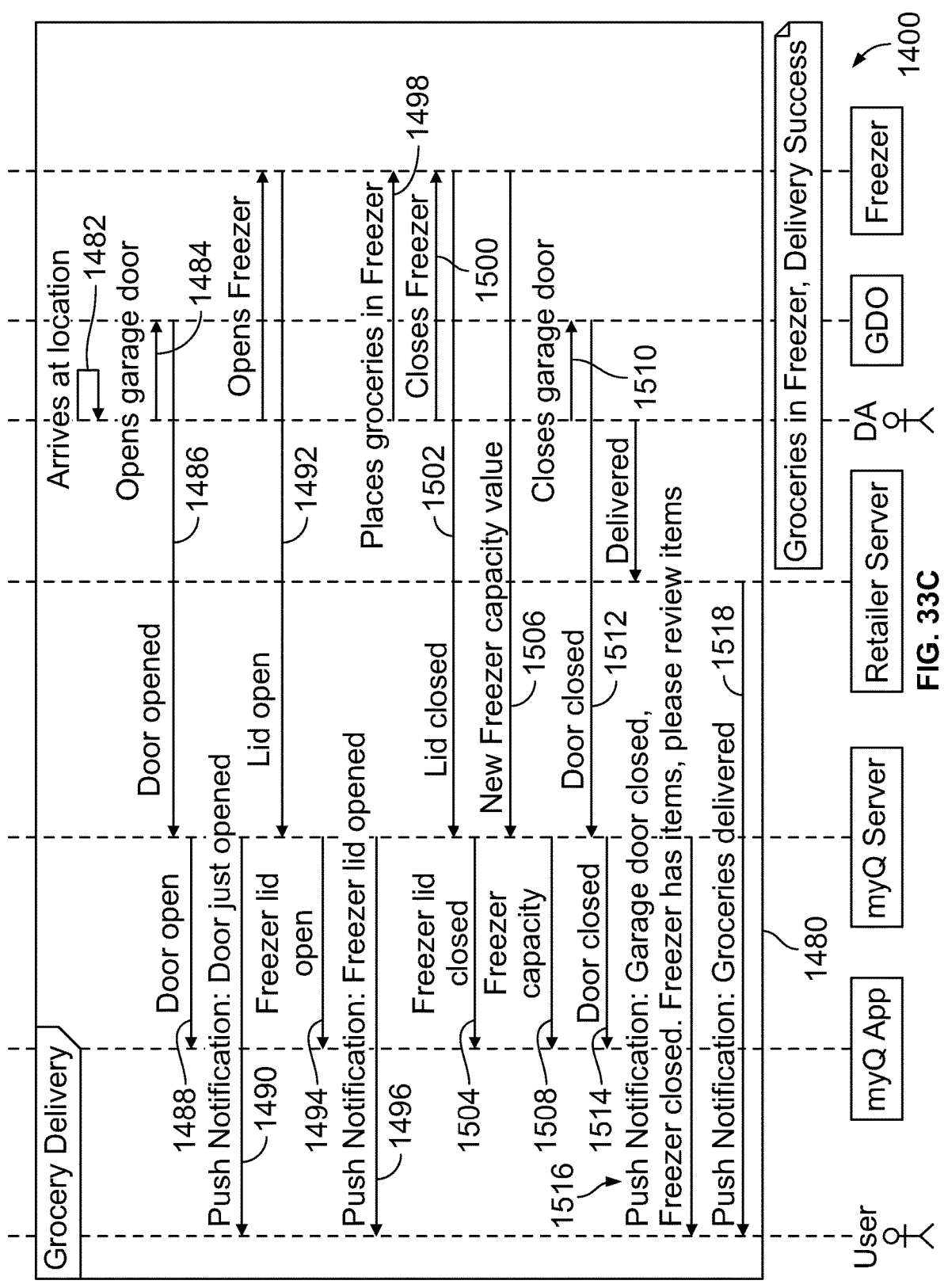

Regarding FIGS. 33A-33C, another example method 1400 is provided that facilitates the user 1402 to order a product for delivery to a temperature-controlled container such as a freezer 1404 of the user 1402 where the freezer 1404 is located, situated, or otherwise configured in a secure location such as a garage that is openable and closable by using a garage door opener/operator 'GDO' 1414. The method 1400 includes communications between an application 1406 of the user device of the user 1402, a movable barrier operator server 1408, a retailer server 1410, a delivery associate 1412, and a movable barrier operator such as a garage door operator 1414. The method 1400 includes a grocery ordering operation 1420 wherein the user 1402 orders 1422 groceries or other perishable item using the user device or another device such as a laptop computer. The retailer server 1410 checks 1424 the temperature of the freezer 1404 using freezer data received at the retailer server 1410 from the movable barrier operator server 1408. If the retailer server 1410 determines 1426 that the freezer 1404 is at an incorrect temperature, the retailer server 1410 sends a notification 1428 to the user 1402 that the temperature is incorrect and the order is denied.

In one approach, the user 1402 may correct the freezer temperature by providing 1430 a correct set temperature to the application 1406 which sends a new temperature request 1432 to the freezer 1404. The freezer 1404 starts a timer 1434 to give the freezer 1404 an opportunity to reach the desired temperature. The freezer 1404 then provides 1436 a freezer temperature to a movable barrier operator server 1408 which may wait 1438 until the temperature received from the freezer 1404 is the set temperature. If the movable barrier operator server 1408 determines the freezer 1404 is unable to reach the set temperature, the movable barrier operator server 1408 sends 1440 a notification to the user 1402. If the freezer 1404 sends 1442 a temperature of the requested set point, the movable barrier operator server communicates 1444 a temperature to the application 1406 and provides a notification 1446 to the user so that the user may attempt 1448 the order again.

The method 1400 includes a capacity checking operation 1450 wherein the retailer server 1410 utilizes freezer data to make a determination 1452 whether the freezer 1404 has capacity to receive the requested order from operation 1422. If there is inadequate capacity, in one embodiment, the retailer server 1410 communicates 1454 a notification to the user 1402 that the freezer has inadequate capacity and the order is denied. The user may then remove 1456 items from the freezer 1404 (and/or rearrange items to make a sufficient interior volume available), and the freezer 1404 provides 1458 a new updated capacity value. The movable barrier operator server 1408 provides 1460, 1462 the new updated capacity values to the application 1406 and the retailer server 1410. The retailer server 1410 confirms 1464 the capacity and allows 1466 the order. The user 1402 may then complete 1468 the order.

In some embodiments, the freezer 1404 or the movable barrier operator server 1408 communicates a notification to the user 1402 that the freezer has inadequate capacity, and the request for an order is denied. Similar to above, the user may then remove 1456 items from the freezer 1404 (and/or rearrange items to make a sufficient interior volume available), and the freezer 1404 may provide 1458 or determine a new updated capacity value.

At this juncture, the grocery order has been accepted at operation 1470. The method 1400 includes delivery update operations 1472 wherein the application 1406 or another application of the user device of the user 1402 receives a notification 1474 from the retailer server 1410 that there is an upcoming in-garage/in-freezer delivery. The retailer server 1410 may then provide a notification 1476 confirming that the freezer 1404 has a correct temperature and sufficient space for the grocery delivery. The retailer server 1410 may the provide a notification 1478 when the delivery associate 1412 has taken the groceries out for delivery.

The method 1400 further includes a delivery operation 1480. The delivery operation 1480 includes the delivery associate 1412 arriving 1482 at the secured location, such as a garage. The delivery associate 1412 opens 1484 the garage door such as by requesting entry using a user device of the delivery associate 1412 which is in communication with the retailer server 1410. The retailer server 1410 requests opening of the garage door from the movable barrier operator server 1408 which, in turn, sends a state change request to the garage door operator 1414. The garage door operator 1414 opens the garage door and provides 1486 a notification to the movable barrier operator server 1408 of the state change of the garage door. The movable barrier operator server 1408 provides 1488 a notification to the application 1406 that the door is opened and provides a notification 1490 to the user 1402.

The freezer 1404 detects a change in state of the lid of the freezer 1404 from a closed state to an open state and communicates 1492 to the movable barrier operator server 1408 that the lid is opened. The movable barrier operator server 1408 provides notifications 1494, 1496 regarding the opening of the lid. The delivery associate 1412 places 1498 groceries in the freezer 1404 and closes 1500 the freezer 1404. The freezer 1404 detects closing of the lid and communicates 1502 a state change to the movable barrier operator server 1408. The movable barrier operator server 1408 provides a notification 1504 that the lid has been closed. The freezer 1404 provides 1506 an updated capacity value to the movable barrier operator server 1408 which provides an updated freezer capacity notification 1508 to the application 1406. The delivery associate 1412 closes 1510 the garage door and the garage door operator 1414 provides 1512 a notification to the movable barrier operator server 1408. The movable barrier operator server 1408 notifies 1514 the application 1406 that the door has been closed. The movable barrier operator server and the retailer server 1408, 1410 provide notifications 1516, 1518 that the garage door has been closed, the freezer has closed, the freezer has items that should be retrieved, and that the groceries have been delivered.

The above-described methods refer to a freezer for keeping delivered goods frozen. The freezers may also include, or instead be, refrigerators for keeping delivered goods cool, insulated coolers with or without a fan to circulate airflow within the cooler to facilitate maintenance of an inserted item, and/or heaters for keeping delivered goods warm.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A computing system comprising:
a memory to store information indicative of a product;
communication circuitry configured to receive container information from a container enhancement system associated with a container, the container information including a capacity of the container detected by a sensor of the container enhancement system comprising a body mounted to an exterior of the container, a sensor assembly mounted to an interior of the container, and a wired connection that traverses a seal area or a wall of the container to connect the body and the sensor assembly together;
the communication circuitry configured to receive a request to order the product for delivery to the container;
a processor operably connected to the memory and the communication circuitry, the processor configured to:
accept the request to order the product in response to a determination of adequate capacity of the container, the determination of adequate capacity of the container based at least in part upon the container information and the information indicative of the product;
receive, from a user device associated with a delivery associate, a request to open a movable barrier to gain access to the container;
cause the communication circuitry to transmit a state change request to a movable barrier operator associated with the movable barrier in response to receiving the request from the user device associated with the delivery associate, the state change request causing the movable barrier to open; and
enable communication between the delivery associate and a resident via a camera, a speaker, and a microphone of the movable barrier operator.

2. The computing system of claim 1 wherein the container comprises a lock controllable via a wireless communication from the user device.

3. The computing system of claim 1 wherein the processor is configured to cause the communication circuitry to communicate a temperature control command to the container, the temperature control command configured to cause an internal temperature of the container to become suitable for the product upon the processor accepting the request to order the product.

4. The computing system of claim 1 wherein the sensor of the container enhancement system comprises a camera, and wherein the capacity of the container is detected by comparing a real time edge detection against a pre-learned edge geometry of a compartment of the container when empty.

5. The computing system of claim 1 wherein the computing system includes a partner server computer and a movable barrier operator server computer;
wherein the communication circuitry comprises first communication circuitry of the partner server computer and second communication circuitry of the movable barrier operator server computer;
wherein the processor comprises a first processor of the partner server computer and a second processor of the movable barrier operator server computer;
wherein the second communication circuitry of the movable barrier operator server computer is configured to receive the container information from the container; and
wherein the second processor is configured to cause the second communication circuitry of the movable barrier operator server computer to communicate the container information to the first communication circuitry of the partner server computer.

6. The computing system of claim 1 wherein the first communication circuitry is configured to receive the request to order the product for delivery to the container;
wherein the processor is configured to deny the request to order the product in response to a determination of inadequate capacity of the container, the determination of inadequate capacity of the container based at least in part upon the container information and the information indicative of the product.

7. The computing system of claim 1 wherein the processor is configured to determine inadequate capacity of the container based at least in part upon the container information and the information indicative of the product.

8. The computing system of claim 7 wherein the processor is configured to deny the request to order the product when container capacity is determined to be inadequate.

9. The computing system of claim 1 wherein the container comprises a lock controllable by a movable barrier operator cloud.

10. The computing system of claim 1 wherein the container enhancement system is configured to control operation of the container to increase or decrease a temperature in the interior of the container.

11. The computing system of claim 1 further comprising a movable barrier operator application including a menu with a history indicative of state changes of a lid of the container.

12. The computing system of claim 1 wherein the container enhancement system is retrofitted onto the container.

13. A computing system comprising:
a memory to store information indicative of a product;
communication circuitry configured to receive container information from a container enhancement system associated with a container, the container information including a capacity of the container detected by a sensor of the container enhancement system, wherein the sensor comprises a camera, and wherein the capacity of the container is detected by comparing a real time edge detection against a pre-learned edge geometry of a compartment of the container when empty;
the communication circuitry configured to receive a request to order the product for delivery to the container;

a processor operably connected to the memory and the communication circuitry, the processor configured to:

accept the request to order the product in response to a determination of adequate capacity of the container, the determination of adequate capacity of the container based at least in part upon the container information and the information indicative of the product;

receive, from a user device associated with a delivery associate, a request to open a movable barrier to gain access to the container;

cause the communication circuitry to transmit a state change request to a movable barrier operator associated with the movable barrier in response to receiving the request from the user device associated with the delivery associate, the state change request causing the movable barrier to open; and enable communication between the delivery associate and a resident via a camera, a speaker, and a microphone of the movable barrier operator.

14. The computing system of claim 13 wherein the container comprises a lock controllable via a wireless communication from the user device.

15. The computing system of claim 13 wherein the processor is configured to cause the communication circuitry to communicate a temperature control command to the container, the temperature control command configured to cause an internal temperature of the container to become suitable for the product upon the processor accepting the request to order the product.

16. The computing system of claim 13 wherein the container enhancement system comprises a body mounted to an exterior of the container, a sensor assembly mounted to an interior of the container, and a wired connection that traverses a seal area or a wall of the container to connect the body and the sensor assembly together.

17. The computing system of claim 13 wherein the container enhancement system comprises a body mounted to an exterior of the container, and a sensor assembly mounted to an interior of the container, and wherein the sensor assembly and the body are wirelessly coupled together.

18. The computing system of claim 13 wherein the refrigerated container enhancement system is configured to control operation of the temperature-controlled container to increase or decrease a temperature in the compartment of the container.

19. The computing system of claim 13 wherein the container enhancement system is retrofitted onto the container.

20. The computing system of claim 13 wherein the container enhancement system is configured to communicate a volume status of the container to a remote computer such that an e-commerce retailer or delivery partner can adjust a planned or scheduled delivery to the container.

\* \* \* \* \*